United States Patent [19]

Harris et al.

[11] Patent Number: 5,873,097
[45] Date of Patent: Feb. 16, 1999

[54] UPDATE MECHANISM FOR COMPUTER STORAGE CONTAINER MANAGER

[75] Inventors: Jared M. Harris, Berkeley; Ira L. Ruben, San Jose, both of Calif.

[73] Assignee: Apple Computer, Inc., Cupertino, Calif.

[21] Appl. No.: 768,339

[22] Filed: Dec. 17, 1996

Related U.S. Application Data

[63] Continuation of Ser. No. 177,853, Jan. 5, 1994, abandoned, which is a continuation-in-part of Ser. No. 60,809, May 12, 1993, and a continuation-in-part of Ser. No. 107,449, Aug. 16, 1993, Pat. No. 5,652,879.

[51] Int. Cl.$^6$ .................................................. G06F 17/30
[52] U.S. Cl. ............................................ 707/203; 707/103
[58] Field of Search .................................. 707/100, 103, 707/200–204

[56] References Cited

U.S. PATENT DOCUMENTS

| | | | |
|---|---|---|---|
| 4,853,843 | 8/1989 | Ecklund | 364/200 |
| 5,047,918 | 9/1991 | Schwartz et al. | 395/600 |
| 5,155,850 | 10/1992 | Janis et al. | 395/600 |
| 5,159,669 | 10/1992 | Trigg et al. | 395/159 |
| 5,206,951 | 4/1993 | Khoyi et al. | 395/261.9 |
| 5,278,982 | 1/1994 | Daniels et al. | 395/600 |
| 5,280,612 | 1/1994 | Lorie et al. | 395/600 |
| 5,317,731 | 5/1994 | Dias et al. | 395/600 |
| 5,317,733 | 5/1994 | Murdock | 395/600 |
| 5,347,653 | 9/1994 | Flynn et al. | 395/600 |
| 5,357,631 | 10/1994 | Howell et al. | 395/600 |
| 5,392,390 | 2/1995 | Crozier | 395/161 |

(List continued on next page.)

FOREIGN PATENT DOCUMENTS

| | | | |
|---|---|---|---|
| 0 425 420 A3 | 5/1991 | European Pat. Off. | G06F 9/44 |
| 0 458 495 A2 | 11/1991 | European Pat. Off. | G06F 9/44 |
| 0 520 924 A3 | 12/1992 | European Pat. Off. | G06F 9/44 |
| 0 578 204 A2 | 1/1994 | European Pat. Off. | G06F 15/413 |
| 0 578 209 A2 | 1/1994 | European Pat. Off. | G06F 15/403 |
| 5020151 | 1/1993 | Japan | G06F 12/00 |

OTHER PUBLICATIONS

Douglis, Fred; Ousterhout, John, "Log–Structured File Systems", Spring compcon89 of the IEEE Computer Society (Feb. 27–Mar. 3, 1989), pp. 124–129.

Harris, Jed, "Bento Specification", Revision 0.9, Apple Computer, Inc. (Nov. 4, 1991).

(List continued on next page.)

Primary Examiner—Maria N. Von Buhr
Attorney, Agent, or Firm—Fliesler, Dubb, Meyer & Lovejoy LLP

[57] ABSTRACT

Methods and data structures which permit information to be stored as objects in target containers and update containers. A target container defines a first state of the information, and the update container, which can point to the target container, identifies changes to the information in the first state which would be sufficient to update the first information state to a second information state. Update containers may be nested to any depth. When an application program opens an update container, the procedure searches down the chain until it finds the ultimate target container. It then creates in-memory structures for providing access to the objects and value data represented in such container. The procedure then works its way back up the chain, performing the changes on the in-memory structure, which are called for in each of the update containers. New modifications made after this process is complete, are recorded in memory, and when committed, are written out into a new update container which references the container that the application program originally opened. The changes which are identified in an update container, if they represent modifications to an object in an underlying container, refer to that object logically rather than physically. Multiple concurrent (parallel) updaters are supported, since more than one update container can refer to the same target container. Thus each updater has an independent view of the information being updated. The mechanism facilitates reconciliation of concurrent updates since it maintains a record of the changes made.

70 Claims, 17 Drawing Sheets

U.S. PATENT DOCUMENTS

| | | | |
|---|---|---|---|
| 5,434,994 | 7/1995 | Shaheen et al. | 395/500 |
| 5,440,730 | 8/1995 | Elmasri et al. | 395/600 |
| 5,463,696 | 10/1995 | Beernink et al. | 382/186 |
| 5,499,365 | 3/1996 | Anderson et al. | 395/600 |
| 5,513,352 | 4/1996 | Tozuka | 395/600 |
| 5,519,606 | 5/1996 | Frid-Nielsen et al. | 364/401 |
| 5,535,386 | 7/1996 | Wang | 395/600 |

OTHER PUBLICATIONS

Harris, Jed, "Bento Specification", Revision 0.95, Apple Computer, Inc. (Nov. 15, 1991).

Harris, Jed, "Bento Specification", Revision 1.0a1, Apple Computer, Inc. (Dec. 10, 1991).

Harris, Jed, "Bento Specification", Revision 1.0a2, Apple Computer, Inc. (Feb. 16, 1992).

Harris, Jed, "Bento Specification", Revision 1.0a3, Apple Computer, Inc. (Feb. 17, 1992).

Harris, Jed; Ruben, Ira, "Bento Specification", Revision 1.0d4, Apple Computer, Inc. (Aug. 17, 1992).

Harris, Jed; Ruben, Ira, "Bento Specification", Revision 1.0d4.1, Apple Computer, Inc. (Sep. 11, 1992).

Herlihy, M., "A Methodology for Implementing Highly Concurrent Data Structures", Assn. for Computing Machinery Symp. on Principles and Practice of Parallel Programming Conference (1990), pp. 197–206.

Kanner, H., "Projector, An Informal Tutorial", Apple Computer, Inc. (Dec., 1989).

ON Technology, Inc., "Instant Update, User's Guide" (1991).

ON Technology, Inc., "Instant Update, Administrator's Guide" (1991).

Simmel, Sergiu S., "Kala™—Main Concepts", Version 1.00, Samsung Software America, Inc. (1990).

Simmel, Sergiu S., "Kala—Interface Reference, Part I: Kala Facilities", Kala ed. 2.1, Penobscot Research Center, Inc. (1992).

D'Andrea, Robert J., et al., "Object–Oriented Programming: Concepts and Languages", Proceedings of the IEEE 1990 National Aerospace and Electronics Conference NAECON 1990 (May 21, 1990) vol. 2, pp. 634–639.

PART A

PART B

|   | OBJECT ID | PROPERTY ID | TYPE ID | VALUE OFFSET | VALUE LENGTH | GEN NO. | FLAGS |
|---|---|---|---|---|---|---|---|
| a | 268 | 18 | 22 | vo.1 | vl.1 | 0 | 0 |
| b | 400348 | 18 | 22 | vo.2 | vl.2 | 0 | 0 |
| c | 400563 | 18 | 22 | vo.3 | vl.3 | 0 | 0 |
| d | 723421 | 38 | 268 | vo.4 | vl.4 | 6 | 0 |
| e | 723655 | 38 | 400348 | vo.5 | vl.5 | 8 | 0 |
| f | 723655 | 38 | 400563 | vo.6 | vl.6 | 11 | 0 |

VALUE DATA

| | |
|---|---|
| vo.1: | "CM: Content Standards: Text: RTXT" |
| vo.2: | "AppleComputer: Imaging: PICT" |
| vo.3: | "Microsoft: Imaging: Windows Metafile" |
| vo.4: | <the actual RTXT stream...embedded ID 723655...> |
| vo.5: | <the actual PICT stream> |
| vo.6: | <the actual Windows metafile stream> |

*FIG. 9*

|   | OBJECT ID | PROPERTY ID | TYPE ID | VALUE OFFSET | VALUE LENGTH | GEN NO. | FLAGS |
|---|---|---|---|---|---|---|---|
| a | 1 | 38 | 5 | vo.1 | vl.1 | 11 | 0 |
| b | 1 | 2 | 6 | 723689 | – | 11 | 1 |
| c | 1 | 3 | 25 | 723421 | – | 6 | 1 |
| d | 2 | 20 | 22 | vo.2 | vl.2 | 0 | 0 |
| e | 3 | 20 | 22 | vo.3 | vl.3 | 0 | 0 |
| f | 5 | 18 | 22 | vo.4 | vl.4 | 0 | 0 |
| g | 6 | 18 | 22 | vo.5 | vl.5 | 0 | 0 |

VALUE DATA

| | |
|---|---|
| vo.1: | < the actual TOC itself > |
| vo.2: | "CM: Basic : TOC: IDSeed" |
| vo.3: | "CM: Basic : TOC: Root Content Object" |
| vo.4: | "CM: Basic : TOC: Absolute TOC Format" |
| vo.5: | "CM: Basic : TOC: Integer 4 Byte" |

*FIG. 10*

| | OBJECT ID | PROPERTY ID | TYPE ID | VALUE OFFSET | VALUE LENGTH | GEN NO. | FLAGS |
|---|---|---|---|---|---|---|---|
| a | 18 | 20 | 22 | vo.1 | vl.1 | 0 | 0 |
| b | 20 | 20 | 22 | vo.2 | vl.2 | 0 | 0 |
| c | 21 | 20 | 22 | vo.3 | vl.3 | 0 | 0 |
| d | 22 | 18 | 22 | vo.4 | vl.4 | 0 | 0 |
| e | 22 | 21 | 25 | 26 | – | 0 | 3 |
| f | 25 | 18 | 22 | vo.5 | vl.5 | 0 | 0 |
| g | 26 | 18 | 22 | vo.6 | vl.6 | 0 | 0 |
| h | 76 | 20 | 22 | vo.7 | vl.7 | 0 | 0 |
| i | 132 | 18 | 22 | vo.8 | vl.8 | 0 | 0 |
| j | 136 | 18 | 22 | vo.9 | vl.9 | 0 | 0 |
| k | 268 | 18 | 22 | vo.10 | vl.10 | 0 | 0 |
| l | 268 | 76 | 136 | vo.11 | vl.11 | 0 | 0 |
| m | 268 | 21 | 25 | 132 | – | 0 | 3 |

VALUE DATA

| | |
|---|---|
| vo.1: | "CM: Basic: Type Name" |
| vo.2: | "CM: Basic: Property Name" |
| vo.3: | "CM: Basic: Super Type" |
| vo.4: | "CM: Basic: Globally Unique Name" |
| vo.5: | "CM: Basic: LocalID Reference" |
| vo.6: | "CM: Formats: Printable 7 Bit Ascii" |
| vo.7: | "CM: Descriptions: Data Format" |
| vo.8: | "CM: Formats: COBJ: Generic Stream" |
| vo.9: | "CM: Formats: COBJ: Type Dictionary" |
| vo.10: | "CM: Content Standards: Text: RTXT" |
| vo.11: | \<the actual RTXT type dictionary\> |

*FIG. 11*

| "State" Current Location | CM Move Value (from current location to...) | | | |
|---|---|---|---|---|
| | Orig. O Orig. P | Orig. O Diff. P | Same O Diff. P | Diff. O |
| Initial State 0 | NOP/0 | A/1 | A/1 | B/2 |
| Orig. O, Diff. P 1 | C/0 | NOP/1 | NOP/1 | D/2 |
| Diff. O 2 | E/0 | F/1 | NOP/2 | G/2 |

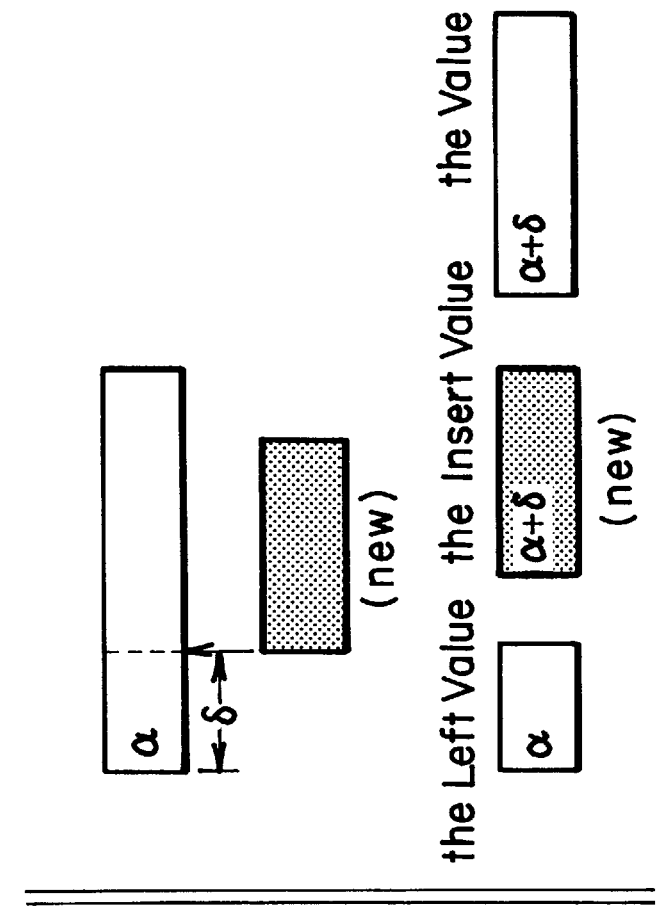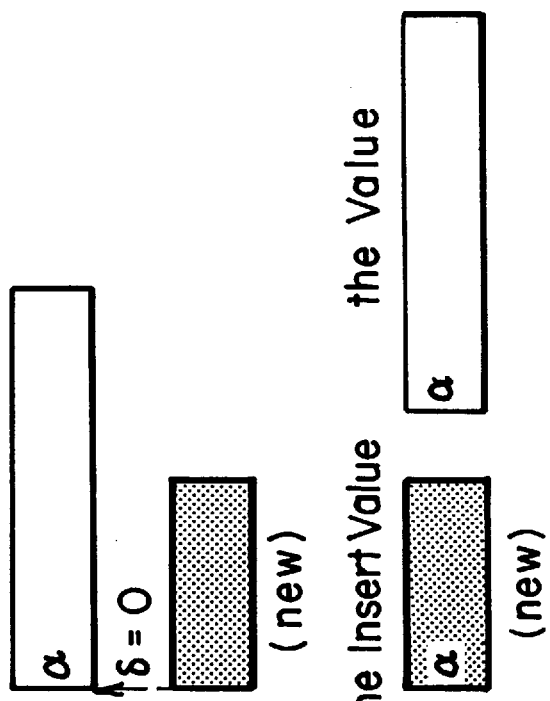
FIG. 17

UPDATE MECHANISM FOR COMPUTER STORAGE CONTAINER MANAGER

CROSS-REFERENCE TO RELATED APPLICATION

This application is a continuation of Ser. No. 08/177,853, filed Jan. 5, 1994, now abandoned, which is a continuation-in-part of Ser. No. 08/060,809, May 12, 1993, pending and a continuation-in-part of Ser. No. 08/107,449, filed Aug. 16, 1993, now U.S. Pat. No. 5,652,879, issued Jul. 29, 1997.

BACKGROUND

Application programs in a computer system typically need to manage data in a manner that permits frequent updating. Two broad examples of such application programs are a word processor and a database manager. Word processors need to be able to manipulate sections of text and other related information each time the user modifies a document, and a database program needs to insert, delete and modify entries in accordance with a user's requirements. Updating is an issue for computer manufacturers as well, for example to permit upgrades to operating system routines, including those which are provided in ROM.

The above two related patent applications set forth a variety of issues that often face software application developers. For example, as set forth in more detail in the above-mentioned STORAGE MANAGER FOR COMPUTER SYSTEM patent application, there is a trade-off between storage space and speed of execution. Reduction of the amount of wasted space in a database, for example, often detrimentally impacts the speed with which certain operations are performed, such as searching. Also as set forth in the STORAGE MANAGER FOR COMPUTER SYSTEM, for many types of application programs, the file structure offered by the operating system is not appropriate to the task. Since the smallest unit of information supported by the operating system typically is a file, and since file manipulation operating system calls are slow and inefficient for small pieces of data, many application programs tend to maintain their data in a proprietary format in only one or a few files each containing many small data items. The result is extensive duplication of effort to define and maintain such proprietary formats, efforts that could otherwise be directed toward enhanced functionality.

Also as set forth in the STORAGE MANAGER FOR COMPUTER SYSTEM patent application, software developers often face issues when data is stored in different parts of a data storage apparatus which have different protocols for access. There is a need in the industry to simplify the implementation of application programs by providing a common mechanism by which the application developer can access data regardless of how or where it is stored in the computer system's storage apparatus.

Many application program developers also face yet another issue if the data maintained by the program is intended to be accessible, and modifiable, by more than one user. As used herein, persistent storage of information refers to information which remains after an application program which references or creates it, terminates. Persistent storage is often nonvolatile in that it also survives shutdown of the computer system, but in some situations can be partially or completely volatile. In a word processor, it is often desirable to support the ability of two or more different users to update a single document at the same time. In a database system, it is often desirable to permit different users to update the database data concurrently. Most application programs implement a technique known as "pessimistic concurrency" which, while permitting many users to read and view the data concurrently, permits only one user to modify the data at a time. The system "locks out" all other users from write accesses when one user has the data open for updating.

Pessimistic concurrency can be implemented at a file level or, in sophisticated database programs for example, at a record level. That is, for file level locking, only one user may have the file open at a time for writing. This is the typical manner with which word processors implement concurrency. A database program can implement record level locking if, for example, a backend process is the only process which has the data file open for writing, and all other users issue their commands and queries through the backend process.

Some database programs have implemented "optimistic concurrency", in which two or more users can update data at the same time. To the extent the concurrent updates conflict, only one can successfully be committed. Optimistic concurrency is different from pessimistic concurrency in that users are permitted to make updates concurrently, subject to subsequent detection of conflicts and resulting inability to commit the updates.

These update techniques produce serializability of updates—the characteristic that for a set of committed updates to the data, at least one sequence exists in which those specific updates could have been performed to achieve the resulting state of the information. Optimistic concurrency permits increased performance in some circumstances, but still produces serializable committed updates.

A few programs implement an update model known as "Iversioning," which does challenge the requirement of serializable updates. In a versioning mechanism, several concurrent updaters can each have an independent yet internally consistent view of the information. The views are known as "configurations". The different updaters modify the information concurrently, and can write their updated configurations to persistent storage, all subject to subsequent reconciliation. One example of a program implementing a versioning update model is the Macintosh® Programming Workshop (MPW) Projector available from Apple Computer, Inc., Cupertino, Calif. MPW Projector is described in the MPW 3.1 Reference Manual, and in H. Kanner, "Projector, An Informal Tutorial", available from Apple Computer, Inc. (1989), incorporated herein by reference.

While MPW Projector is a good first step toward reducing the constraints imposed by strict serializability, significant additional flexibility is highly desirable. For example, Projector's finest level of granularity is still represented by a "file". It would be desirable to support much finer degrees of granularity. As another example, MPW Projector's provisions for reconciling two conflicting versions of a document is limited to a single procedure in which the computer identifies strict text differences, and a user indicates how each text difference should be resolved. Significant additional intelligence will be desirable in the comparison procedure, as would significant increased flexibility and automation in the resolution of conflicts, as well as support for comparisons between non-text information. Accordingly, there is a need for much greater flexibility in the support of non-serialized updates in the maintenance of data.

Increasingly, documents and other collections of stored information are made up of multiple content elements, such as text, tables, images, formatting information, mathematical equations and graphs. Often content is created using one application program and then included in documents created by other applications. Subsequently, content elements may be copied out of a document and used in yet another document, and so on.

In the past, different applications typically had no way to exchange multiple content elements, unless they had a "private contract" about the format to be used. Furthermore, one application typically had no way to find the content elements in another application's document, so typically it was not able to obtain content elements from the other application's documents even if it knew the format. Moreover, every application developer who wanted to store multiple content elements in a document typically had to develop a proprietary object storage mechanism.

The use of multiple content elements in a document implicates at least two difficult issues: where each element is located and what the format of the data is. Regarding the first of these issues, it would be desirable if the data in a particular element could be stored in memory, in a local persistent storage device, across the network, or even created dynamically, all in a manner which is transparent to the application program which is operating on element. In this way the limited resources available to application program developers can be directed toward enhancement of functionality rather than dealing with multiple types of storage devices.

Similarly, with regard to the second issue, it would be desirable if each different content element could have stored in association with it all of the routines which are needed to manipulate it, again, transparently to the application program. This, too, would free up developers' resources for more useful purposes.

In a general way, an individual developer might obtain some of the transparency described above by programming the application using an object-oriented programming language such as C++. Object-oriented rogramming is described in many references, including, for example, G. Booch, "Object-Oriented Design With Applications" (Benjamin/Cummings Publishing Company: 1991), incorporated herein by reference. While these languages can be used to address the problems described above for handling multiple content elements, it is not clear how that can be done. Certainly the languages themselves do not provide guidance on how they can be used for such purposes. For example, the inheritance mechanism in C++ is a compile-time mechanism.

The issues that software developers face regarding update techniques are worthy of additional attention. In particular, it would be desirable to address the following more specific updating issues. First, in the situation where an operating system (or other program) is provided at one time and an update is distributed subsequently, the update mechanism needs to have a way of locating specific portions of the base version to be changed. The problem is referred to herein as patching. One way this was handled in the past was to provide a series of patches, each of which identify a location in the base version, specify something about its expected existing contents (to improve confidence that the update is correct), and one or more operations to be performed at that location. Patches are very fragile and error prone, however. They are usually created by hand, thus requiring a person to generate them who knows the base operating system in extensive detail, often at the binary level. Patches will also fail, or even corrupt the user's system, if some aspect of the user's system configuration or prior update history was not taken into account when the patches were created. Patching can be performed also where the base version is provided in read-only memory, provided the system accesses such information using a level of indirection which is changeable. But this can be even more complicated than direct patches, and often creates additional problems of its own.

Accordingly, there is a need for an update mechanism which does not rely on the physical location of the base information which is to be updated.

Second, as mentioned above, it is often desirable to support the ability of two or more different users to update information at the same time. Most application programs implement pessimistic concurrency, while only a few implement optimistic concurrency. Still fewer implement versioning. As mentioned above, MPW projector is a good first step toward implementing versioning. MPW Projector is an integrated set of tools and scripts whose primary purpose is to maintain control of the development of source code. It preserves in an orderly manner the various revisions of a file, and through the versioning mechanism also prevents one programmer from inadvertently destroying changes made by another. If the underlying data is text, data compression is achieved by storing only one complete copy of a file and storing revisions only as files of differences. Different users of the same set of files can view them differently since each user is given independent control of the mapping between the user's local directory hierarchy, in which the user keeps the files, and the hierarchy used for their storage in the main Projector database. Projector also has a facility for associating a specific set of file revisions with a name, this name being usable as a designator for a particular version, or release, of a product. Thus the name alone can be used to trigger the selection of just those source files that are required to build the desired instance of the product.

MPW Projector maintains versions in a tree structure. When one user desires to modify a file in the main Projector database, the user "checks out" the file, thereby making a copy of the file in the user's own directory. The user can check out a file either as "read-only" or, if no one else has already done so, as "read/write". After modifying the file, the user can then "check in" the file back to the main Projector database, either as a new version in a new branch of the file version tree, or, only if the file was check out as read/write as a new version in the same branch of the version tree. When it is finally desirable to merge a branch of the revision tree back into the main trunk, MPW Projector performs a strict text-based comparison between the two versions of the file and displays the differences in a pair of windows on the computer system display. A user then cuts-and-pastes portions from one window into the other in order to merge them together.

As can be seen MPW projector's technique for reconciling different updates of a base version is useful only when the underlying data is text, and operates only by comparison of the two updates to be reconciled. No record is kept of the individual changes that were made from the base version to each of the updated versions. The reconciliation process for an implementation of version merging can be made significantly more intelligent if such a record was kept.

Third, inherent in the desirability to support multiple concurrent updaters, each updater should be provided with an independent "view" of the information. That is, if a work includes a plurality of modules, each updater should have his "current" view of the information include all of the modules which have not been changed in his or her current version, plus only his or her current version of the modules which have been changed. MPW projector accomplishes this, but only at the file level. Much finer granularity would be desirable. For example, if the information is a document, it would be desirable for the level of granularity to be as small as a paragraph, or even a sentence. If the information is in a database format, it would be desirable for the level of granularity to be possibly as small as a record or less.

Accordingly, it is desirable to have an update mechanism which supports fine degrees of granularity.

Fourth, when updates are made, the update mechanism should perform them atomically. That is, while the storage mechanism should be able to maintain partial updates in nonvolatile storage, so as to reduce memory requirements, the base document should always be recoverable in case of a system or power failure. Most application programs, such as word processors, open a temporary file in nonvolatile memory to store the partially edited version. Alternatively, in virtual memory machines, the partially edited version can remain in "virtual memory". When the user is ready to "commit" the updates, the application program copies any unedited portions of the base information into the temporary file so that the temporary file is complete, then renames the old base file to a second temporary name, then renames the first temporary file to the name of the prior name of the base file, and then deletes the old file. Thus there is never a time when a complete, internally consistent version of the information, does not exist in nonvolatile storage.

This technique becomes problematical, however, when the information file is extremely large. In particular, it can be seen that the technique requires twice as much available space in the nonvolatile storage medium as the ultimate file requires. In addition, the extensive amount of copying required by the mechanism can severely degrade performance.

Another conventional technique for handling atomic updates is sometimes referred to as the "shadow page technique". In this technique, the base file is divided into pages, and an index to the current version of the pages is maintained. Updates are managed atomically at the page level rather than the file level, and are accomplished by writing the new version of a page, then updating the index to point to the new version rather than the old version of that page, and then deleting the old version of the page. In some implementations, the index itself may also be shadowed. The set of old pages, identified by the old index, and the set of new pages identified by the new index, completely describe the base and updated states of the information, respectively.

The shadow page technique avoids the large file problem mentioned above, but can still be inadequate in many situations. For example, the minimum granularity of a page may still be too coarse. Additionally, like other update mechanisms described above, reconciliation of two or more concurrently created updates is difficult in the shadow page technique in part because no record is kept of the changes which were made from the base version to each update version to be reconciled.

The shadow page technique has yet another problem, which arises from the fact that different pages may end up at different places in the file. The indexing mechanism permits random placement of these pages. A consecutive read of the information in the file therefore can cause extensive jumping around inside the file, thereby degrading performance.

Yet another conventional update technique can combine shadow pages with the use of a log file. As changes are made in a temporary version of the information, for example in memory, the individual changes are recorded in a log which is written out to nonvolatile storage. Periodically, or at userspecified times, the current state of the information as represented in memory is written to persistent storage and a marker is written to the log file to indicate that persistent storage is consistent up to that point in the log file. The problem of randomly located pages is minimized in this technique since speed optimizations such as elevator algorithms can be used during the write.

There are many variations of log-enhanced update techniques, including some in which the change log identifies base pages logically rather than physically. An extreme example of log-enhanced updating techniques is set forth in Douglis and Osterhout, "Log Structured File Systems," Compcon '89 (1989), incorporated herein by reference. The Osterhout paper describes a log-structured file system which maintains only the change log in persistent storage. No complete set of the information exists in persistent storage. Rather, it is always merely reconstructed in memory, to the extent needed, by traversing the log file. Persistent storage also maintains a pointer to the last known valid change specified in the log file, and atomicity of updates is accomplished by redirecting that pointer to point to a subsequent position in the log file at the time of each "commit".

Neither the log-enhanced techniques nor the exclusively log-based technique, however, supports any concept of more than one valid consistent state of the information, and therefore does not support nonserialized concurrency well. They also fail to adequately handle situations like the operating system patch example set forth above, and do not permit different users to have independent views of the current state of the information being updated.

Accordingly, it is desirable to provide an update mechanism which can operate at fine granularity, support independent views of the information by multiple updaters, facilitate reconciliation of concurrent updates, and maintain atomicity of updates without requiring large amounts of free disk space or substantially degrading performance. Moreover, it would be desirable if the same update mechanism could be used for all different types of information, including operating systems, databases, documents and so on. Still further, it would be desirable for the update mechanism to be integrated with other container manager mechanisms intended to reduce storage space without degrading performance, handle fine granularity units of information, support a wide variety of different types of content elements, and unify the methods by which the application programs access different kinds of storage media.

SUMMARY OF THE INVENTION

The above-incorporated patent applications described object-oriented techniques for managing information in containers.

According to the invention, roughly described, methods and data structures are defined which permit information to be stored as objects in target containers and update containers. A target container defines a first state of the information, and the update container, which can point to the target container, identifies changes to the information in the first state which would be sufficient to update the first information state to a second information state. Update containers may be nested to any depth. When an application program opens an update container, the procedure searches down the chain until it finds the ultimate target container. In one embodiment, the procedure then creates in-memory structures for providing access to the objects and value data represented in such container. The procedure then works its way back up the chain, performing the changes on the in-memory structure, which are called for in each of the update containers. New modifications made after this process is complete, are recorded, and when committed, are written out into a new update container that the application program originally opened.

The changes which are identified in an update container, if they represent modifications to an object in an underlying container, refer to that object logically rather than physically. For example, they include a reference to a persistent object identifier which is unique within the underlying contianer and its own base containers. Thus certain changes are allowed on existing closed containers, such as rearranging information or deleting superfluous information, as long as the logical view of the closed container remains the same.

The update mechanism described herein supports multiple concurrent (parallel) updaters, since more than one update container can refer to the same target container. Thus each updater has an independent view of the information being updated. Also, the mechanism facilitates reconciliation of concurrent updates since it maintains a record of the changes that were made.

When an update container is committed to persistent storage, the application program can have it appended either to the end of the target container or can have it stored as a separate file. If it is stored as a separate file, then its reference to the target container can be stored as a dynamic value, thereby affording to the update mechanism all the flexibility of dynamic values described in the above mentioned DYNAMIC VALUE MECHANISM FOR COMPUTER STORAGE CONTAINER MANAGER patent application.

In the DYNAMIC VALUE MECHANISM FOR COMPUTER STORAGE CONTAINER MANAGER patent application, roughly described, a set of procedures are defined which permit substantially arbitrary composability of chains of handlers. The procedures follow rules which render them independent of the "type" of the value for which they are called, as viewed by the caller. Thus application programs can be written at only a high level of functionality, without needing to be concerned with the differences in the way different types of values need to be handled.

The procedures determine which handler to call to perform a given operation in dependence upon the type of the object for which the procedure was invoked. The handlers, too, are relatively easy to write because like the application program, the rules permit the handle rs to call the very s ame set of procedures (recursively if the very same procedure is called) as are available to the application program. Thus like the application program, handlers too can be written without knowledge of any characteristics of the object for which they are invoked other than the charact eristics defining the type for which the handler is specifically written. For example, a read handler for a type which defines a data compression/decompression algorithm need never know where the data is physically located since it merely calls the predefined read value procedure to obtain the data to decompress.

Types can be defined in a tree structure . This further simplifies the writing of handlers since the different characteristics of a type can be divided into many small components, each defined by a different sub-type on the tree. Thus each handler can be written to accomplish only a limited objective (for example an I/O redirection o r a data transformation). the predefined procedures automatically follow the chain of handlers defined by a type tree, by knowing where in the chain a given caller of the procedure is. Neither the application program nor the handlers themselves need keep track of this informa tion.

Additionally, the predefined procedures make no assumptions about the types in a type tree. An application developer can define novel types as required by dividing them into subtypes (if desired) and writing handlers for each subtype. As mentioned, the complexity of the handlers depend only on the complexity of the transformation or redirection which they are to individually perform, not on the complexity of either the type tree or the procedures which implement the present invention. So long as the handlers follow certain rules of good behavior, the predefined procedures will be able to follow any such user-defined type tree. Additional procedures are provided for associating the individual handlers to their corresponding types (subtypes), and for building the type trees themselves.

To implement the above procedures, computer apparatus stores a subject value and a chain of sequentially associated value handlers for the subject value. The chain includes a top value handler and a bottom value handler, each of the value handlers in the chain except the bottom value handler invoking the respective next value handler when invoked, the bottom value handler performing an operation on the subject value when invoked. The value operations can be data read operations, data write operations, etc., and the value handlers in the chain can perform data transformations and/or data redirections, transparently to its caller.

The dynamic value chain is not stored in persistent storage; rather it is created when an application program desires to perform a value operation on the subject value. The subject value has a type associated with it which determines the value handlers to be placed in the chain. The chain can have more than one value handler in it for a given value operation if the type associated with the subject value is made up of a hierarchy of sub-types.

Other aspects of the invention will become apparent from the Drawings, Detailed Description and Claims appended hereto.

BRIEF DESCRIPTION OF THE DRAWINGS

The invention will be described with respect to particular embodiments thereof, and reference will be made to the drawings, in which:

FIGS. 9, 10 and 11 are representations of information stored in a table of contents in persistent storage;

FIGS. 12 and 22 illustrate the structure of in-memory objects which are created to support an update mechanism;

FIGS. 17, 18 and 19 illustrate ways in which value data may be modified;

DETAILED DESCRIPTION

Figure 1:
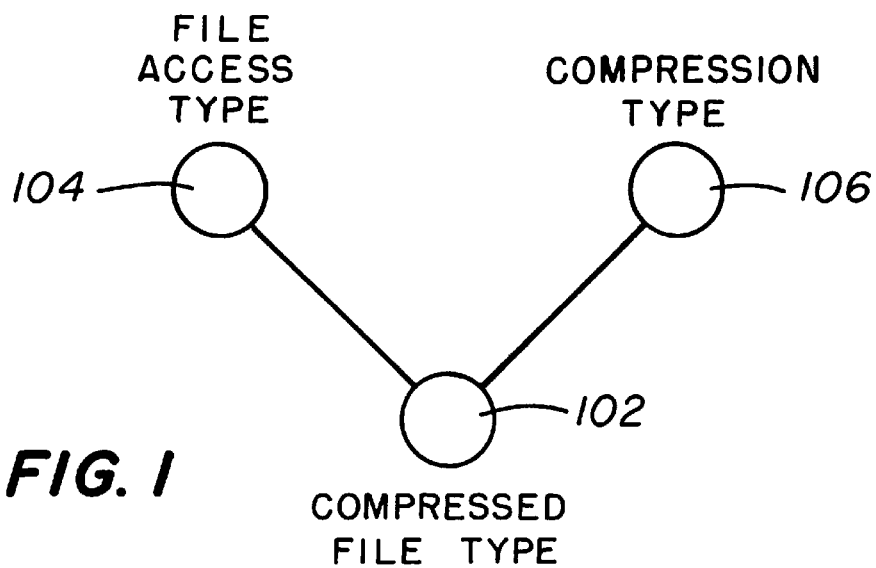
FIGS. 1 and 2 illustrate type trees.

The embodiment described herein takes the form of a Container Manager and its associated data structures which can be used by developers of a wide variety of types of application programs. The Container Manager includes a number of C language type definitions and a number of procedures for implementing the functionality provided by the Container Manager. Together they provide a common application program interface (API) for the different types of application programs.

The structures are described first with respect to their logical organization and subsequently their physical organization in the storage apparatus managed by the container manager. That is, they will be described first with respect to the view which the container manager software provides to an application programmer via the API, and subsequently with respect to the way that logical organization is actually implemented in the present embodiment. While many of the advantages of the present invention derive from the logical organization, it will be apparent that such logical organization implies certain physical structures which are required to maintain the metaphor as viewed by the application developer. The physical organization described hereinafter includes many inventive aspects of the invention, but it is by no means the only physical structure which can support the logical organization presented to the application developer.

TABLE OF CONTENTS
I. GENERAL OVERVIEW
  A. Overview of Container Manager Entities
  B. Overview of Types and Dynamic Values
  C. Format Overview
  D. Format Definition
  E. Format Usage Examples
II. IMPLEMENTATION
  A. Hardware
  B. In-Memory Data Structures
  C. Routines
    1. Session Operations
    2. Container Operations
    3. Object Operations
    4. Type and Property Operations
    5. Value Operations
III. DYNAMIC VALUE HANDLERS
  A. Sample Session Flow
  B. Sample Value Handlers
IV. UPDATING
  A. Updating Algorithm In-Memory Data Structures
  B. Criteria for Touching
  C. Close Time Processing
  D. Updating Container Layout in Persistent Storage
  E. Updating Instructions
  F. Updating Instruction Handlers
  G. Open Time Processing
  H. Open Time Processing for Multilayered Updates
  I. Other Routines, in the following non-printed appendices:
APPENDIX A—CMContainerops.c
APPENDIX B—Update.h
APPENDIX C—Update.c
APPENDIX D—TOCIO.h
APPENDIX E—TOCIO.c
APPENDIX F—TargetContainerHandlers.h
APPENDIX G—TargetContainerHandlers.c

I. GENERAL OVERVIEW

In the present embodiment, an object is a collection of data that "hangs together" and that can be referenced by other data. Objects can be simple or complex, small (a few bytes) or large (up to $2^{64}$ bytes). Compared with objects in languages such as C++, objects of the Container Manager are typically larger and more complex, because they represent user meaningful content elements, rather than the atoms and molecules used to build this content. For example, a sequence of bytes of data would not by itself be an object, because we can only understand the bytes if we know how they will be used. A paragraph, an image, etc. can be an object if it contains enough information so that we know how to interpret it. Typically an object contains information about what kind of object it is, and some data, which provides the content of the object. In this description, the information "about" the object is called metadata, and the content of the object is called its value.

The Container Manager groups objects in an object container, which is some form of data storage or transmission (such as a file, a piece of RAM, or an inter-application message) that is used to hold one or more objects (both their metadata and their values). These containers are defined by a set of rules for storing multiple objects in a such a container, so that software that understands the rules can find the objects, figure out what kind of objects they are, and use them correctly. The rules accommodate a wide variety of different kinds of objects, different ways that applications want to use objects, and system considerations about how data can be stored.

The Container Manager provides a container definition that can conveniently, efficiently, and reliably hold all the different kinds of objects that users and applications want to group together, store, and exchange. The Container Manager does not define how any given object is structured internally (within its value) so as not to limit the formats which an application developer may want to define. Objects stored in a container can have proprietary or standard formats, they can be designed to use the Container Manager mechanisms or they can be completely ignorant of the existence of the Container Manager.

A. Overview of Container Manager Entities

The Container Manager manipulates and stores data using primary and secondary entities. The primary entities used by the Container Manager are containers, objects, properties, values, and types.

Containers. Every object is in some container. An object consists of a set of properties. The properties are not in any particular order. Each property consists of a set of values with distinct types. The values are not in any particular order. Every object must have at least one property, and that property must have at least one value. Each value consists of a variable length sequence of bytes.

The Container Manager knows very little about a container beyond the objects in it. However, the container always contains a distinguished object, and applications can add arbitrary properties to that object, so applications can specify further information about the container if they wish.

Containers are often files, but they can also be many other forms of storage. For example, in various applications developers already support the following types of containers: blocks of memory, the clipboard, network messages, and Container Manager values. Undoubtedly other types of containers will be useful as well.

Objects. Each Container Manager object has a persistent ID which is unique within its container. Other than that, objects don't really exist independent of their properties. An object contains no information beyond what is stored in its properties.

Properties. A property defines a role for a value. Properties are like field names in a record or struct, with two differences. First, properties can be added freely to an object, so an application should never assume an object only has the properties it knows about. Second, property names are globally unique, so that they can never collide when various different applications add properties to the same object. This also means that the same property name always means the same thing, no matter what object it is in. Properties are distinct from types, just as field names are distinct from the data type of the field.

For example, different properties of an object might indicate the name of an object, the author of the object, a comment, a copyright notice, and so on. These different properties could all have values of the same type: string.

Conversely, a property indicating the date created might have a string, Julian day, or OSI standard date representation. These different formats would not be indicated by the property, but by the type (see below).

Values. Values are where the data is actually stored. In terms of physical location, this data might actually be stored anywhere in a container. In fact, it can be broken up into any number of separate pieces, and the pieces can be stored anywhere. (See the discussion of value segments below.)

Each value may range in size from 0 bytes to $2^{64}$ bytes, although that range can differ in a different embodiment. The overhead per value varies depending on the circumstances. For an object with a single value, the typical overhead will be 21 bytes. For a small value which is one of several values associated with a property, the overhead can be as low as five bytes.

Types. The type of a value describes the format of that value. Types record the structure of a value, whether it is compressed, what its byte ordering is, and so on. The Container Manager provides an open-ended mechanism, so that types can be extended to include whatever metadata is required.

To continue the example above, the type of a string value could indicate the alphabet, whether it was null terminated, and possibly other information (such as the intended language). It might also indicate that the string was stored in a compressed form, and could indicate the compression technique, and the dictionary if one was required. If the string used multi-byte characters, and the byte-ordering was not defined by the alphabet, the type could indicate the byte-ordering within the characters.

The Container Manager defines an inheritance mechanism to make building complex types like this efficient. The structure of types is tied into the mechanism for accessing values, so that the type associated with a value causes the appropriate code to be invoked to access the value, decompress it, byte-swap it, and so on. The specific mechanism for doing this is referred to herein as Dynamic Values.

Secondary Entities. In addition to the primary entities manipulated by the Container Manager, there are several additional entities that play supporting roles in the Container Manager design. These entities are important to fully understand how The Container Manager works, but they do not significantly change the picture given above.

Type and property descriptions. Each property associated with a value is actually a reference to a property description. Similarly, the type of a value is actually a reference to a type description. These type and property descriptions are objects, and their IDs are drawn from the same name-space as other object IDs.

Many type and property descriptions will simply consist of the globally unique name of the type or property. To continue the example above further, the type of a string of 7-bit ASCII, not compressed or otherwise transformed, would simply be described by a globally unique name. This would allow applications to recognize the type.

References to type and property descriptions are distinct from references to ordinary objects in the API to allow language type checking to catch errors in the manipulation of type and property references. However, type and property references can still be passed to the Container Manager routines which manipulate user-defined objects and values, so that value manipulation can be done on types and properties in the same manner as it can be done on user-defined objects.

Globally unique names. Globally unique names are public or private identifiers in a format defined by the ISO 9070 Public Text Identifier standard. They are simply strings written in a subset of 7 bit ASCII. They begin with a name that is assigned by a naming authority designated by ISO (companies can easily register as naming authorities). After this come additional segments, as determined by the naming authority, each of which is unique in the context of the previous segments.

The most common globally unique names will be generated by system vendors or commercial application developers, and may be registered. However, in many cases names will be generated by vertical application developers to record their local types and properties. To meet this need, the naming rules allow for local creation of unregistered unique names, for example by using a product serial number as one of the name segments.

IDs. The Container Manager assigns each object a persistent ID that is unique within the container in which the object is created. These IDs are never reused once they have been assigned, so even if an object is deleted, its ID will never be reassigned.

These IDs are obviously essential to the functioning of the Container Manager format, but they do not appear directly in the API. The only points at which an application actually deals with anything corresponding to an ID is when it needs to store an object reference into a value, or find the object corresponding to a reference retrieved from a value. Even in this case, however, the API does not give the application direct access to an object ID, but only to a token that corresponds to the ID in the context of that particular value. This hiding of actual IDs permits the Container Manager to perform reference tracking.

Refnums. In the API, types, properties, and objects are referred to using opaque reference numbers provided by the Container Manager. The refnums are much more convenient to use than IDs because they are unique within the session, while an ID would need to be used together with a container reference. Since they are opaque, they allow implementations of the API that support caching schemes in which only portions of the container metadata are in memory at any given time.

Refnums have no persistent meaning, so they cannot be stored in values as references to other values. The tokens provided by the reference calls must always be used for persistent references.

Dynamic values. As mentioned above in the discussion on "Types", a Container Manager value can be compressed, encrypted, byte-swapped, etc. during read/write. Furthermore, these transformations can be composed together to form a chain of transformations.

In addition to data transformation, the same mechanism also supports I/O redirection. In this case a value actually stored in a container is a description of how to find the data, rather than the data itself. Such descriptions can be as simple as references to files, or to objects in another container, or as complex as queries that cause data to be retrieved from a database.

Both I/O transformations and I/O redirection are carried out implicitly by the Container Manager library, using "handlers" determined by the type of the value. These handlers are attached to temporary entities called dynamic values created by the library. Dynamic values are never visible to the application, and have no persistent meaning. The Dynamic Value mechanism is described in more detail below.

Value segments. To support interleaving and other uses that require breaking a value up into pieces, The Container Manager allows a value to be stored as multiple segments stored at different locations in the container. These segments are not visible at the API, since the Container Manager routines concatenate them to create a single stream of bytes.

The Container Manager also takes advantage of value segments to represent insertions, deletions, and overwrites of contiguous bytes in a value. This allows the Container Manager to represent these operations directly in recording updates, rather than having to create a new copy of the value.

Handlers. The Container Manager makes use of dynamically linked handlers supplied by the execution environment for two reasons: portability and extensibility. The use of handlers means that the Container Manager library is almost trivially portable, since all the system dependencies are in the handlers. The Container Manager library is also easily extensible, with the addition of newly written handlers, since the handler interfaces are carefully designed to provide cleanly encapsulated abstractions.

The Container Manager employs session handlers, container handlers and value handlers. Session handlers are global to the session as a whole. These include allocating and de-allocating memory, and reporting errors. Container handlers perform all of the actual I/O to containers. These handlers map I/O to the underlying storage in a way that depends on the container type. Container handlers basically provide a stream I/O interface to the container storage.

Value handlers implement both I/O transformations and value indirection. These handlers are determined by the type of each value. New handlers to carry out new types of data transformations or support new types of indirect values can be written at any time.

These handlers are invoked entirely by the library. The accessing application does not need to know that it is using handlers to access the value.

B. Overview of Types and Dynamic Values

The Container Manager provides a very powerful mechanism for transforming values during I/O, and for following indirect references. The Container Manager type mechanisms are probably best explained in terms of some usage examples.

Usage example 1—External File. Suppose an application developer would like to have a value that represents a file. When the application calls the Container Manager's Write Value Data procedure (CMWriteValueData) for writing data to the value, we want to actually perform I/O to the file.

The mechanisms described herein allow us to store a reference to the file in a value. When the value is used, an I/O redirection is set up, without the application being aware of it.

Note that this raises the thorny problem of platform-independent file references. The Container Manager avoids this problem. It allows any number of different types of references, implemented by handlers.

Usage Example 2—Compressed Value. Suppose an application developer would like to compress data as it is written to the value, and decompress it as it is read out. In addition to maintaining the data in the value itself, this compression may depend on a dictionary associated with the type of value. Furthermore, the compression routine may need to maintain a state, since the compression at any point may depend on what has already been written.

The mechanisms described herein allow us to give the value a type that causes the compression/decompression handler to be transparently invoked when the application does I/O. Again, this is an extensible mechanism, so that new compression algorithms (or more generally, arbitrary transformations) can be added without modifying the library.

Usage Example 3—Compressed. Format Converted Array. Suppose the value which an application is dealing with is actually an array of pixels. In addition to decompressing it, on a given platform we want to convert each pixel to a different format.

The mechanisms described herein allow us to take two (or more) data transformations, such as compression and format conversion, and compose them together. Just as the application does not need to be aware of the underlying transformations, the individual transformations do not need to be aware of each other.

Usage Example 4—All of the Above. The next step is to put the compressed pixel array out in a file, and convert it to a different format when it is read in. This is all supported using exactly the same composition as used in the previous example. The interfaces to data transformations and I/O redirection are the same, so no special mechanism is required.

Other Usage Examples. To briefly illustrate further where this leads, here are some further examples:

A value contains a query that is used to look information up in a database. The "I/O redirection" provides access to a table retrieved from the database.

A value contains a file reference that is encrypted because it also holds the file-server password. A decryption stage is required before the I/O redirector can be applied to the file reference.

A value contains a query that is used to generate a file reference, which then becomes the basis for a second level of I/O redirection.

Numerous other usages can be developed which can take advantage of the mechanisms described herein.

All of the above examples are based on the types associated with the values involved. The examples depend on two aspects of Container Manager types.

First, every value handler is bound to values only indirectly through the name of a type. Handlers are associated with type names through the CMSetMetaHandler Container Manager operation. This association is session-wide. Then the handler is bound to a particular type in a given container through the name of that type. This binding is done when the container is opened.

Second, even in the simplest examples above, such as the value that is merely an indirection to a file, or the value that is merely compressed, the value essentially has two types: the type visible to the application, which encodes the format of the data from the application's point of view, and the type used to find the appropriate handler for compression, I/O redirection, etc.

As the more complex examples show, multiple types of a value need to be independent. This leads to a view of a value as having multiple, independent types. By analogy with C++ (an analogy which is not perfect, as described below) we call these "ebase types" of the value's type. Base types can be added to and removed from any Container Manager type using the Container Manager CMAddBaseType( ) and CMRemoveBaseType( ) operations.

Base types are normal types, and themselves may have base types. This could be useful, for example, when the combination of file access and decompression is used in a variety of different contexts. The two could be made base types of a new type, and then that new type could be used in various ways, including making it a base type of the "all of the above" type which adds format conversion.

To illustrate the concept of base types, FIG. 1 is a symbolic diagram of a tree having three types 102, 104 and 106. A value may have a "compressed file type" 102 associated with it, but the compressed file type 102 has two base types: a "file access type" 104 and a "compression type" 106. The complex "compressed file type" 102 can be created by first defining the compressed file type 102 object, than calling the Container Manager procedure to add a base type 104 to the type 102, and then by calling the procedure again to add the base type 106 to the compressed file type 102.

Figure 2:
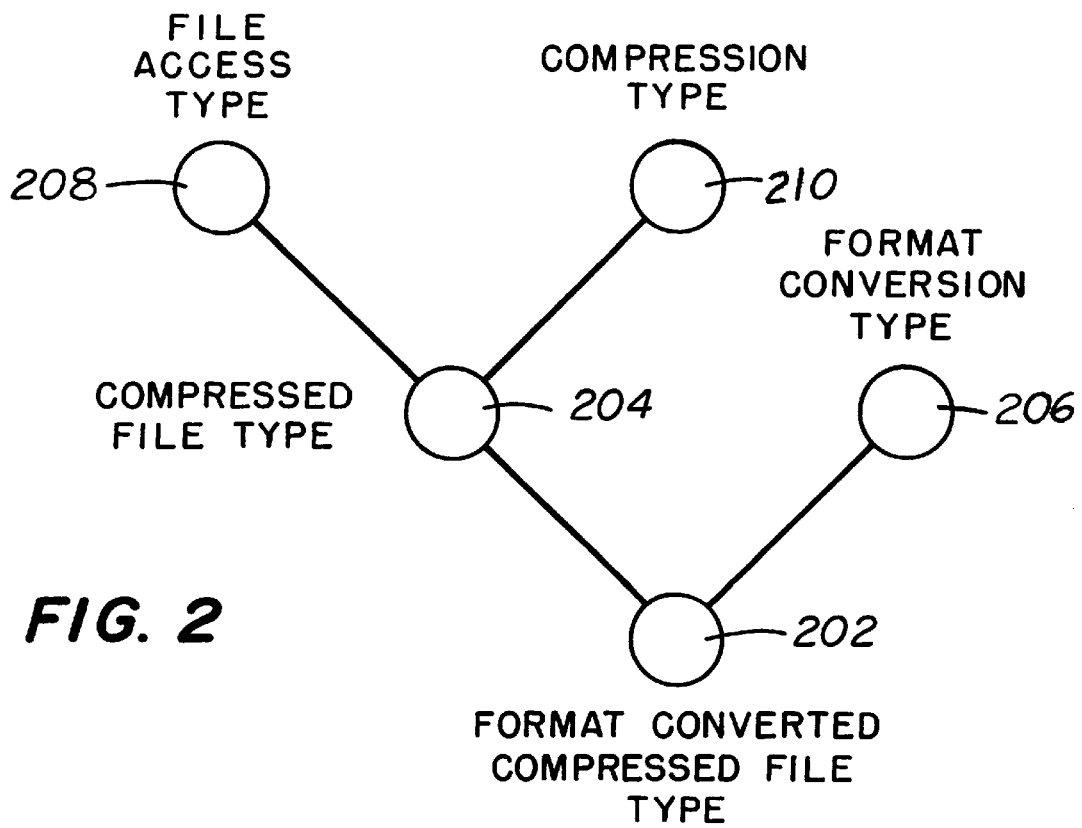

FIG. 2 illustrates a more complex type tree. As shown in FIG. 2, the type "format converted compressed file type" 202 has two base types, "compressed file type" 204 and "format conversion type" 206. As with compressed file type 102 in FIG. 1, compressed file type 204 has two base types, "file access type" 206 and "compression" 208.

The addition of base types will always form a tree routed in the original type. If the same type is used as a base type in more than one place in the tree, the separate uses are treated as entirely separate types.

To understand how a given tree of types will behave, the tree is flattened into a linear "chain" of types. In the present embodiment, this is done by performing a depth-first, post-order walk on the tree. Thus, in the case of FIG. 1, the resulting sequence is file access, compression, then compressed file. If an application program calls the Container Manager routine to read data from a value (CMReadValueData), and the value has the type, "compressed file", then the Container Manager will first call the read handler for the compressed file type 102. The read handler for the compressed file type 102 will then (through another call to CMReadValueData) call the read handler for the compression type 106, which in turn calls (through yet another call to CMReadValueData) the read handler for file access type 104. The read handler for file access type 104 obtains (through yet another call to CMReadValueData) the information which is stored in the container in the storage area allocated to the value which the application desires to read, and uses this information to access the actual data on, for example, a hard disk. This data, obtained from the hard disk, is the return value of the read handler for file access type 104. This data gets decompressed by the read handler for compression type 106, and then returned to the caller by the read handler for the compressed file type 102.

The chain formed by the flattened type tree is considered herein to have a "top" and a "bottom" type which are, respectively in FIG. 1, compressed file type 102 and file access type 104. This means that the first handler to be called for any value operation is the value handler associated with the "top" type on the chain. That handler invokes the next handler on the chain, which in turn invokes the next handler on the chain, and so on down to the "bottom" handler on the chain. The handlers then return one by one to their respective calling handlers, until the "top" handler returns to the application program.

In the type tree of FIG. 2, the depth-first, post-order walk of the tree flattens it into the following linear chain: file access type 206, compression type 208, compressed file type 204, format conversion type 206, and format converted compressed file type 202. Format converted compressed file type 202 is the "top" type on the chain, and "file access" type 206 is the "bottom" type on the chain. Note that compressed file type 204 and format converted compressed file type 202 do not have handlers associated with them (let us assume), they will not have any effect on the value.

In order to support the above examples, the present embodiment assumes two design constraints. First, the application, and each handler, must always think that it is dealing with a "normal" value (i.e. one without redirection or transformations); that is, any redirection or transformation must be completely transparent to the caller. Second, in several cases we saw that handlers might have a non-trivial amount of state to manage.

We address these constraints by giving each handler its own "private" value, called a dynamic value. Dynamic values are transient (i.e. not persistent); they are created just to provide an environment for the handlers, and they are never written to the container, saved in the container's Table Of Contents (TOC), etc. However, they do have refnums and from the "outside" (i.e. from any application code or handler code except the handler that "owns" them) they look exactly like normal values. It will be seen that dynamic values have the same "value header" as real values, except that instead of pointing to storage locations which contain actual value data, they point to a vector of "handlers", one for each of a predefined set of "value operations", to be called when a prior caller desires to use the value.

The following value operations are supported by the Container Manager. The Container Manager routines which implement these operations first check whether the specified value is real or dynamic. If real, then the routine simply operates on the real data. If dynamic, then the routine calls the handler which is associated with the specified value for the specified value operation. Thus for a given dynamic value, a handler can be provided to support each of the following value operations:
©1992 Apple Computer, Inc.

CMSize CMGetValueSize(CMValue value);
    CMSize CMReadValueData(CMvalue value, CMPtr buffer, CMCount offset, CMSize maxsize);
    void CMWriteValueData(CMValue value, CMPtr buffer, CMCount offset, CMSize size);
    void CMInsertValueData(CMValue value, CMPtr buffer, CMCount offset, CMSize size);
    void CMDeleteValueData(CMValue value, CMCount offset, CMSize size);

```
void CMGetValueInfo(CMValue value, CMContainer
    *container, CMObject *object, CMProperty *property,
    CMType *type, CMGeneration *generation);
void CMSetValueType(CMValue value, CMType type);
void CMSetValueGeneration(CMValue value, CMGen-
    eration generation);
void CMReleaseValue(CMValue);
```

As an aside, the present description often uses C-language notation as a shorthand way of describing the steps performed by, or other characteristics of, a Container Manager routine. In this notation, all module names and external data that can possibly be visible to an application programmer begin with the letters "CM" or "cm". The upper case "CM" prefixes all API visible routines and macros. The prefix "kCM" is used for constants. The lower case "cm" is used for all inter-module references within the Container Manager. All other data and modules have no other naming conventions and should not be visible outside of the file in which they occur. Macros used within the Container Manager do not follow these conventions since they are never visible in the generated object modules. Thus names beginning with "cm" or (upper or lower case) are reserved by the API and should not be used by the applications using the API.

Also as an aside, routines or code portions which are not described herein are considered self-documenting either due to commenting or due to the use of self-documenting symbol names. For example, it will be apparent to the reader without further explanations that the CMGetValueSize( ) operation mentioned above returns the size of the specified value.

Returning again to the above Container Manager value routines, none can be called for a particular value until one of the following preparatory routines are called for that value: CMNewValue( ) or CMUseValue( ). As described below, if the desired value is a dynamic value, these routines set up the chains of dynamic value handlers needed to support the above routines.

When a dynamic value is spawned by CMNewValue( ) or CMUseValue( ), the pointer to the top-most dynamic value header is returned as the refNum. Then, whenever the user passes a retnum to an API value routine, it checks to see if the refNum is a dynamic value. If it is, it initiates the call to the corresponding value handler. That may cause a search up the base value chain to look for an "inherited" value routine. In the limit, we end up using the original API value routine if no handler is supplied and we reach the "real" value in the chain. Thus the handler must be semantically identical to the corresponding API call.

These dynamic values only exist from creation during the CMUseValue( ) until they are released by CMReleaseValue( ). A dynamic value can have its own data, but this data is stored in the value's refcon rather than in the value data itself. Dynamic values do not have associated data in the normal sense.

A dynamic value is created when a value is created by CMNewValue( ) or used by CMUseValue( ), and the following two conditions occur:

1. The type of the value, or any of its base types, have metahandlers which have been registered by the Container Manager CMSetMetaHandler( ) routine in a session-wide metahandler symbol table (CMSetMetaHandler( ) is usually called when a container is first opened); and
2. The metahandlers support a Use Value Handler, and in addition for CMNewValue( ), a New Value Handler.

The New Value Handlers are used to save initialization data for the Use Value Handlers. The Use Value Handlers are called to set up and return a refCon. Another metahandler address is also returned. This is used to get the address of the value operation handlers corresponding to the standard API CM . . . value routines mentioned above.

When a CMNewValue( ) or CMUseValue( ) is almost done, a check is made on the value's type, and all of its base types (if any) to see if it has an associated registered metahandler. If it does it is called with a Use value operation type to see if a Use Value Handler exists for the type. If it does, we spawn the dynamic value.

The spawning is done by calling the Use Value Handler. The Use Value Handler is expected to set up a refCon to pass among the value handlers and a pointer to another metahandler. These are returned to CMNewValue( ) or CMUseValue( ) which does the actual creation of the dynamic value. The extensions are initialized, the metahandler pointer and refCon are saved. The pointer to the created dynamic value header is what CMNewValue( ) or CMUseValue( ) returns to the user as the refNum.

Now, when the user attempts to do a value operation using this refNum, we will use the corresponding handler routine in its place. The vector entries are set on first use of a value operation. If a handler for a particular operation is not defined for a value, its "base value" is used to get the "inherited" handler. This continues up the chain of base values, up to the original "real" value that spawned the base values from the CMNewValue( ) or CMUseValue( ). Once found, we save the handler in the top layer vector (associated with the refNum) so we don't have to do the search again. Thus, as in C++, dynamic values may be "subclassed" via their (base) types.

Note that if we indeed do have to search up the base value chain then we must save the dynamic value refNum (pointer) along with the handler address. This is very much like C++ classes, where inherited methods are called and the appropriate "this" must also be passed.

The Container Manager supports layering of dynamic values. The best way to describe layering is in terms of C++. Say we have the following class types (using a somewhat abbreviated notation):

```
© 1992 Apple Computer, Inc.
class Layer1 {                  // a base class
    <layer1 data>               // possible data (fields)
    Layer1 (<layer1 args>);     // constructor to init the data
    other methods . . .         // value operations in our case
    };
class Layer2 {                  // another base class
    <layer2 data>               // possible data (fields)
    Layer2 (<layer2 args>);     // constructor to init the data
    other methods . . .         // value operations in our case
    };
class T: Layer1, Layer2 {       // the class of interest!
    <T data>                    // possible data (fields)
    T(<T args>, <layer1 args>, <layer2 args>);
                                // constructor to init the data and bases
    other methods . . .         // value operations in our case
    };
```

In Container Manager terminology, T is to be a registered type with other registered types as base types (classes). All type objects are created using the standard API call CMRegisterType( ). Base types can be added to a type by using CMAddBaseType( ). This defines a form of inheritance like the C++ classes.

Type T would be registered with its base types as follows:

```
© 1992 Apple Computer, Inc.
layer1 = CMRegisterType(container, "Layer1");
layer2 = CMRegisterType(container, "Layer2");
t = CMRegisterType(container, "T");
CMAddBaseType(t, layer1);
CMAddBaseType(t, layer2);
```

For the t object, the global name property and value are created as usual by CMRegisterType(container, "T"). The CMAddBaseType( ) calls add the base types. These are recorded as the object ID's for each base type in the order created as separate value segments for a special "base type" property belonging to the type object.

As mentioned above, CMNewValue( ) or CMUseValue( ) spawn dynamic values if the original type or any of its base types have an associated Use Value Handler. Assume that was done for "T" in the above example. What happens is that CMNewValue( ) or CMUseValue( ) will look at its type object (t here) to see if the base type property is present. If it is, it will follow each type "down" to leaf types using a depth-first search.

In the example, "layer1" will be visited, then "layer2", and finally the original type "T" itself. If the "layer1" type object had base types of its own, they would be visited before using "layer1" itself. Hence the depth-first search down to the leaf types.

For each type processed, if it has a Use Value Handler of its own, it will be called to get a refCon and value handler metahandler.

Note that this scheme allows total freedom for the user to mix types. For example, type T1 could have base types T2 and T3. Alternatively, T1 could just have base type T2 and T2 have T3 as its base type!

In the C++ class types shown above, note that each class could have its own data along with its own constructor. The T class has a constructor that calls the constructors of all of its base classes. We can carry this analogy with the Container Manager just so far. Here is where it starts to break down.

The problem here is that C++ class types are declared statically. A C++ compiler can see all the base classes and can tell what data gets inherited and who goes with what class. In the Container Manager, all "classes" (i.e., our type objects) are created dynamically. So the problem is we need some way to tell what data "belongs" to what type.

The solution is yet another special handler, which returns a format specification called metadata. The handler is the Metadata Handler whose address is determined by the Container Manager from the same metahandler that returns the New Value and Use Value Handler addresses.

Metadata is very similar to C-language printf( ) format descriptions, and is used for similar purposes. The next section will describe the metadata in detail. For now, it is sufficient to know that it tells CMNewValue( ) how to interpret its ". . ." parameters. The rest of this section will discuss how this is done to dynamically create data.

As with C++ classes, the data is created when a new value is created, i.e., with a CMNewValue( ) call. The data will be saved in the container, so CMUseValue( ) uses the type format descriptions to extract the data for each dynamic value layer.

CMNewValue( ) is defined with the following prototype:
CMValue CMNewValue(CMObject object, CMProperty property, CMe type, . . . );
The ". . ." is an arbitrary number of parameters used to create the data. Metadata, accessed from the Metadata Handler, tells CMNewValue( ) how to interpret the parameters just like a printf( ) format tells printf( ) how to use its arguments.

The order of the parameters is important. Because base types are done with a depth-first search through the types down to their leaves, the CMNewValue( ) ". . ." parameters must be ordered with the parameters for the first type in the chain occurring first in the parameter list. Note what's happening here is that the user is supplying all the constructor data just like T constructor class example above.

The way the data gets written is with a special handler, called the New Value Handler. After CMNewValue( ) calls the Metadata Handler, it uses the metadata to extract the next set of CMNewValue( ) ". . ." parameters. CMNewValue( ) then passes the parameters along in the form of a data packet to the New Value Handler. The New Value Handler is then expected to use this data, which it can extract with the Container Manager CMScanDataPacket( ) routine. Once it has the data, it can compute initialization values to write to its base value. It is the data written by the New Value Handler that the Use Value Handler will read to create its refCon.

Only CMNewValue( ) does this. The New Value Handler is only for new values, but the Use Value Handler is used by both CMNewValue( ) and CMUseValue( ).

In the simplest case, with only one dynamic value, it can be seen that the data is written to the "real" value. Now if you layer another dynamic value on to this, the next chunk of data is written using that layer's base value and hence its handlers. The second layer will thus use the first layer's handlers. That may or may not end up writing to the "real" value depending on the kind of layer it is. If it's some sort of I/O redirection handler (i.e., it reads and writes somewhere else), the second layer data will probably not go to the "real" value.

The Use Value Handler is called both for CMNewValue( ) and CMUseValue( ). The Use Value Handler reads the data from its base value to create its refcon. If the user comes back the next day and does a CMUseValue( ), only the Use Value Handler is called. Again it reads the data from its base value to construct the refCon and we're back as we were before in the CMNewValue( ) case.

It should be pointed out here that the Metadata and New Value Handlers will always be executed with a Container Manager running on some particular hardware (obviously). The data packet built from the CMNewValue( ) ". . ." parameters is stored as a function of the hardware implementation on which it is run (i.e., whatever the sizes are for bytes, words, longs, etc.). How it is stored is a function of the metadata returned from the Metadata Handler. In other terms, the New Value Handler has a contract with both the Container Manager and the Metadata Handler on the meaning of the parameter data.

Note, however, it is not required that you be on the same hardware when you come back the next day and to the CMUseValue( ) that leads to the Use Value Handler call. The handler writer must keep this in mind. Specifically, the Use Value Handler must know the attributes (bytes size, big/little endian, etc.) of the data written out by the New Value Handler so it knows how to use that info. In other words, the Use Value Handler has a (separate) "contract" with its own New Value Handler on the meaning of the data written to the base value.

There is another, relatively minor, thing to keep in mind. That is that the value handlers for any one layer must take into account the size of its own data when manipulating additional data created by the handlers for CMReadValueData( ), CMWriteValueData( ), etc. This simply offsets the write and read value data operations by the proper amount. Remember all operations are on their base values. So if a New Value Handler writes data, this basically prefixes the "real" stuff being written by the handler operations.

The Metadata Handler is only needed for CMNewValue( ) so that the proper number of CMNewValue( ) ". . . " parameters can be placed into a data packet for the New Value Handler. The Metadata Handler must follow the prototype, CMMetaData metaData_Handler(CbType type); where "type" is the (base) type layer whose metadata is to be defined.

The Metadata Handler simply returns a C string containing the metadata using the format descriptions described above.

The type is passed as a convenience. It may or may not be needed. It is possible for a type object to contain other data for other properties. Types, after all, are ordinary objects. There is nothing prohibiting the creation of additional properties and their values. This fact could be used to add additional (static and private) information to a type to be used elsewhere. For example, the type could contain a compression dictionary.

The New Value Handler must follow the prototype,
CMBoolean newvalue_Handler(CMValue basevalue,
    cmType type,
    CMDataPacket datapacket);
where
    basevalue=the base value which is to be used to write the refCon data for the Use Value Handler
    type=the type corresponding to this New Value Handler
    dataPacket=the pointer to the data packet, created from the CMNewValue( ) ". . . "
    parameters according the types metadata format description.

The type is passed again as a convenience just as in the Metadata Handler. It can also be used here to pass to CMScanDataPacket( ) to extract the dataPacket back into variables that exactly correspond to that portion of the CMNewValue( ) ". . . " parameters that correspond to the type. It is not required, however that CMScanDataPacket( ) be used.

The Use Value Handler is called for both the CMUseValue( ) and CMNewValue( ) cases. If its companion New Value Handler wrote data to its base value, the Use Value Handler will probably read the data to create its refCon. The refCon will be passed to all value handlers. The Use Value Handler returns its refCon along with another metahandler address that is used to get the value handler addresses. These are used to create the dynamic value.

The Use Value Handler should follow the prototype,

CMBoolean useValue_Handler(CMValue baseValue,
    CMType type,
    CMMetaHandler *metahandler,
    CMRefCon *refCon);

where
    baseValue=the base value which is to be used to write the refCon data for the Use Value Handler
    type=the type corresponding to this New Value Handler
    metahandler=a pointer to the value operations metahandler which is returned by the Use Value Handler to its caller
    refcon=a reference constant built by the Use Value Handler and returned to its caller.

The basevalue and type are identical to the ones passed to the New Value Handler. The type may or may not be needed in the Use Value Handler. Like the Use Value Handler, it could be used to supply additional information from other properties.

It is expected that the Use Value Handler will read data from its base value to construct its refCon. The refCon is then returned along with a pointer to another metahandler that is used by the Container Manager to get the addresses of the value operations.

Note, both the New Value and Use Value Handlers return a CMBoolean to indicate success or failure. Failure means (or it is assumed) that the handlers reported some kind of error condition or failure. As documented, error reporters are not supposed to return. But in case they do, we use the CMBoolean to know what happened. It should return 0 to indicate failure and non-zero for success.

Value Operation Handlers. The value operation handler routines can do a Container Manager CMGetValueRefCon( ) call on the value which was passed, in order to get at the refCon set up by the Use Value Handler. This provides a communication path among the value handlers. Further, the value handler should usually do its operations in terms of their base value, which can be accessed using the Container Manager CMGetBaseValue( ) call.

The release handler is an exception to this rule. A set of one or more dynamic value layers are spawned as a result of a single CMUseValue( ) or CMNewValue( ). The layers result from the specified type having base types. From the caller's point of view s/he is doing one CMUseValue( ) or CMNewvalue( ) with no consideration of the base types. That implies that the returned dynamic value should have a single CMRelaseValue( ) done on it. The handlers have no business doing CMReleaseValue( ) on their base value. This is detected and treated as an error.

A count is kept by the Container Manager of every CMUseValue( ) and CMNewValue( ). Calling CMReleaseValue( ) reduces this count by one. When the last release is done on the dynamic value (its count goes to 0), the release handler will be called. It is the Container Manager who calls the release handler for all the layers, not the handler. The Container Manager created them as a result of the original type; it is therefore responsible for releasing them.

The reason the Container Manager is so insistent on forcing a release for every use of a dynamic value is mainly to enforce cleanup. Most value operation handlers will, at a minimum, use a refCon that was memory allocated by the Use Value Handler. Release handlers are responsible for freeing that memory. In another example, if any files were open by the Use Value Handler, the releases would close those files.

A trivial value handler might merely get its base value and use it to recursively call the Container Manager value procedure which initially invoked the handler to do its operation (again except for the release handler). In this case what it is basically doing is invoking the "inherited" value operation. In this case, the value operation could be omitted entirely by having the metahandler for the value's type return NULL when asked for that value operation. The Container Manager uses that as the signal to search up the dynamic value inheritance chain to find the first metahandler that does define the operation. In the limit, it will end up using the original "real" value.

Possible Limitations On Value Operations. Value I/O operations are basically stream operations. That is, you read or write information linearly from a specified offset. In addition, the Container Manager provides insert and delete value data API calls CMInsertValueData( ) and CMDeleteValueData( ).

Insert and delete can cause problems because base types may want to do certain transformations on their data that depend on what has occurred previously in that stream of data. For example, encryption using a cyclic key, or compression generally cannot be done simply by looking at a chunk of data starting at some random offset. A cyclic key encryption can be deterministic if you can always determine where to start in the key as a function of offset. But you can see that inserts and deletes will change the offsets of following data. You would not know where to start in the key.

What all this means is that certain data transformations only make sense if you are willing to refuse to support the insert/delete operations. Basically only data transformations that are position independent can be supported with the full set of value operations.

Even simple I/O to a file may create problems, since most file systems do not support inserts and deletes in the middle of a file. If you do want to support inserts and deletes, then you should consider the potential for data intensive and/or computationally intensive operations.

C. Format Overview

A conceptual description of the Container Manager data format in persistent storage is now presented. As an overview, certain caveats and tricks are omitted at this level which are covered in more detailed parts of this description.

Five key ideas underlie the Container Manager format:

1) everything in a container is an object,
2) objects have persistent IDs,
3) all the metadata lives in the TOC (Table of Contents),
4) objects consist entirely of values, and
5) each value knows its own property, type, and data location.

The five ideas will each be discussed in turn.

Everything is an object. In a Container Manager container, every accessible byte is part of a value of some object. Even the metadata that defines the structure of the container, and the label of the container, are values of an object. Type descriptions are objects, property descriptions are objects, etc. We will exploit this fact in various ways below.

Objects have persistent IDs. Every Container Manager object is designated by a persistent ID which is unique within the scope of its container. Objects may have additional IDs and/or names that are unique in larger scopes, but this is not required.

Object IDs provide a compact, convenient way to refer to an object. An efficient mechanism is provided to get from any object ID to information about that object.

All the metadata lives in the TOC. This is a difference between the Container Manager and most other container formats, such as ASN.1, formats derived from IFF (such as Microsoft/IBM's RIFF), etc. In these other formats, the metadata is associated with the chunks of data that it describes, a design approach that we call internally tagged. There are three reasons for this difference from other formats:

a) The Container Manager embodiment described herein is designed to support very flexible layouts, such as multi-media interleaving, and internal tags would be inconvenient and even harmful for this.
b) Applications inspecting an object can make decisions about it more efficiently if all of its metadata is concentrated in one place, rather than being spread out over the container with its values.
c) We want to be able to assimilate existing formats that contain collections of objects without forcing them to change. This implies that we must be able to designate regions within the existing structure as values, without forcing them to somehow retrofit internal tags.

This approach to metadata does impose one significant design constraint. A Container Manager container can only be read by starting with the TOC. This raises two questions: (1) how do we find the TOC, and (2) how do we access the TOC when we need information?

1) In standard Container Manager containers the container label points to the TOC. Possibly some non-standard containers will exist that require other mechanisms. However, these will be exotic cases.

2) Since we need to access the information in the TOC whenever we want to read a value, we have to have it available at all times. This normally means that the container needs to be on a random access device.

If a container needs to be read on a device that does not support efficient random access (such as a CD-ROM) the TOC can be split up into sub-TOCs that sit in front of the groups of objects they describe, and then the container can be accessed largely in stream order.

Objects consist entirely of values. In the Container Manager, an object has no value as such. Each object has properties, and each property has values. The Container Manager format provides no information about an object except its ID.

Of course, an object can have a single value; in that case the value of the property "is" the value of the object. Thus the Container Manager format can easily accommodate this "normal" case.

Each value knows its own property, type, and data location. Each value consists of a property ID (or role), a type (or format), and data. For example, a graphic object might have a value that describes its "clip mask"; the property ID would specify what role the value plays, but not what format it is stored in. The type would define how the mask is represented: rectangle, bit mask, path, Mac region, PostScript path, etc. The data would be the representation of the mask itself.

At the level of the container standard itself, there are no restrictions on what values an object can have, how many values it can have, etc. However, individual object formats may dictate rules in this area. In general, applications should be prepared to encounter additional values that they do not understand; these can be ignored. This allows other applications to annotate objects with additional values that may not be generally understood. Typically, these values will be associated with properties that are unknown to the application.

The data of a value is an uninterrupted sequence of bytes which may be from 0 to $2^{64}$ bytes long, although these limits may vary in a different embodiment. This sequence of bytes has no format requirements or restrictions. Furthermore, the byte sequences representing the data for various values of various objects can be placed anywhere in the container. Thus there are no strong data format requirements for the container as a whole, although it must contain the metadata to define its structure somewhere.

Special Cases. All of the mechanisms above are consistent across all the uses of objects. However, there are two special cases that need to be considered.

First, The Container Manager format allows a single object to have multiple values with the same property ID. All the values must have different types. Such multiple values are intended to be used as alternative representations of the same information.

Second, the table of contents can contain multiple entries for a single value. These entries mean that the value represented by the entry is actually stored in multiple segments. This permits values to be broken up into chunks and interleaved, without creating problems for applications that view them as single values. In addition, it allows an application to build TOC entries that "synthesize" a value out of separate parts, as is required in retrofitting some file formats.

Note that these two special cases can be mixed freely. A property can have multiple values, and one or more of the values can be composed of multiple segments.

Other Issues—Globally Unique Names. To fulfill the requirement for locally generated unique names for types and properties, the Container Manager embodiment described herein supports identifiers defined in ISO 9070. These are names that begin with a naming authority (assigned to a system vendor or an application vendor), and then continue with a series of more and more specific segments, until they end in a specific type or property name.

While another embodiment can use a different naming convention, names generated according to ISO 9070 are both unique and self-documenting. Individual users can generate unique names using this approach. For example, a user developing educational stackware might want to create properties, or even types, to use in scripts. The stackware development environment could automatically generate a unique prefix for the user, based on the serial number of the development tool, and then append the user generated property or type name.

This ensures that if that user's scripts and data are combined in a container with other information generated by other users, no naming conflicts can occur.

Note that globally unique names are not limited to property and type descriptions. Any object can be given a unique name using exactly the same mechanism, and such object names may be useful in some applications.

Note also that objects can be given short names that are only locally unique, as in the RIFF TOC. These would be a different type than Globally Unique Names.

Recall that type and property descriptions are objects as well. Since types and properties need to have globally unique names, so that applications can recognize them, type and property descriptions will typically have a globally unique name value. In many cases, this may be the only contents of a type or property description object.

In some situations, however, we may wish to put more information into a description. Here are some examples of useful information that can be attached to types or properties:

Base types. As previously mentioned, base types allow inheritance of semantics from other existing types for composition into more complex types. Such base type information is intended to include uses such as encryption, compression, I/O redirection, etc.

Encoding information. A type definition may indicate the default encoding of its values. Typically, all of the values with the same basic format in a container will have the same encoding, so this new subtype can be shared by all these values. In this case the encoding can be indicated directly in the type description for the format.

If values with the same basic format but multiple encodings exist in the same container, a more complex solution is required. In this case, a subtype may be created just to record the encoding. Such a subtype will typically not need a globally unique name.

Compression information. In addition to the compression technique, typically recorded via a base type, the type can record compression parameters, the codebook used (if applicable), etc. As with encoding information, a type that exists just to record compression information typically will not need a globally unique name. It will refer to the underlying format type and the compression technique, both of which will have globally unique names.

A template or grammar for a type. This allows applications that have never seen this type before to parse values of that type and potentially get some useful information out of them. Examples of description mechanisms that could be used in this way are ASN.1 and SGML. The more general type will be indicated as the super-type. For example, a given SGML DTD as a type will have a specific SGML definition of the DTD. The super-type of this type would be SGML itself, which defines the basic encoding conventions.

Method descriptions for a type. A type could have properties that provide method definitions. Providing methods in the container would allow fully encapsulated use of values.

Given the importance of the table of contents (TOC) to the structure of a Container Manager container, the first thing an application should to do when accessing a container is find the table of contents. A standard mechanism for locating the TOC makes this easy.

It might be thought natural to have a label at the beginning of the container (typically a file) that contains the offset to the table of contents. However, this turns out not to be quite the right approach. In many cases, developers want to convert their existing file formats into Container Manager containers. Ideally, they would like to keep the resulting files readable by their existing applications that do not understand the Container Manager format. For example, we may be wrapping the Container Manager format around a RIFF file, and we may want the result to still be readable by an application that only understands RIFF. If the file has to have a standard Container Manager label at the beginning, it will be unreadable, unless the Container Manager label is specially designed to be compatible with RIFF. In that case, the label will be incompatible with some other format. Other problems also arise.

Accordingly, we define the standard Container Manager format to have the label at the end of the container. This makes backward compatibility easy. In addition, a copy of the label can optionally be placed at the beginning of the container. This allows easy recognition of a Container Manager container if it is coming in from a stream-oriented I/O mechanism.

In exotic cases, this approach may not work. For example, transmission streams may depend on framing information, so that the stream can be read starting anywhere. The Container Manager supports such exotic cases by allowing the TOC to be found in non-standard ways when necessary. Finding the TOC is the responsibility of the I/O handler, which will depend on the system and the container type. The I/O handler can adopt a non-standard approach if required.

D. Format Definition

The concrete format of the container label and the table of contents (TOC) of a Container Manager container in persistent storage will now be described.

Container Label Format. As mentioned above, a standard Container Manager container has a label at the end. Exotic containers may have labels in other locations. However, the label will always provide the same information.

The label contains the smallest possible amount of information, because it has to be the most stable part of the standard. It consists of seven fields:

1. Magic byte sequence unsigned char magicBytes[8];

This identifies the container as a Container Manager container. It must be chosen to be unlikely to occur as the initial or final bytes in any existing file.

2. Label flags unsigned short flags;

These are currently unused.

3. Buffer size unsigned short blockSize;

This defines the size of the TOC blocks in this container, in multiples of 1024 bytes.

4. Container format major version number unsigned short majorversion;

The major format version number changes only on incompatible format changes.

5. Container format minor version number unsigned short minorversion;

The minor version number changes on upward compatible format changes. When the major version number changes, the minor version number is set to zero.

6. Offset to TOC unsigned long tocOffset;

This provides the offset of the top level TOC (Table of Contents) from the beginning of the container. The TOC describes the structure of the rest of the container.

7. Size of TOC unsigned long tocSize;

This provides the size of the TOC in bytes.

Because of the desire that the label format be stable, the container label format should not be changed in future versions to add additional information. Instead, it can be added as values of the distinguished object #1, which represents the container itself.

Table of Contents Format. The TOC as represented in persistent storage consists of a sequence of entries. Each entry corresponds to a single segment of a value of some object.

TOC entries are sorted by object ID, and within a single object they are sorted by property ID. Thus all the entries for a given object are contiguous in the TOC, and all the entries for a given property are contiguous within the object. Also, an object can be found within the TOC, or a property can be found within an object, by binary search. If an object ID or a property is not defined, we can quickly determine that it is not defined.

Thus, each object in the container is represented in the TOC by a sequence of entries, one for each segment of a value of the object. The Container Manager has no way to represent an object without at least one value.

Since each TOC entry defines a value, we know immediately that it must indicate the object ID, property, type, and data of the value. In addition, it indicates the generation number of the value in order to allow applications to check consistency between different properties. The TOC entry may also contain bookkeeping information for the value.

The object ID field in a TOC entry identifies the object that this value is part of. The property field identifies the value's property by the object ID of a property description. The type field indicates the value's type by the object ID of a type description.

The entry indicates the value's data by the offset and length of the sequence of bytes representing the value. The offset is a 0 origin byte offset from the beginning of the container. The length is a byte count, and may be 0, indicating a 0 length value. If the data is four bytes long or less, it may be included directly in the TOC as an immediate value, rather than being referenced by offset and length.

A TOC entry could simply be defined by putting all the information above in a record. This record would be relatively large, however, and would be very likely to contain redundant and/or unused information. The presently described Container Manager embodiment therefore uses an approach in which each TOC entry contains only the information that is new or different compared with the previous TOC entry. This results in a TOC that is organized as a stream rather than a table, and is parsed as it is read in.

The TOC stream format will be described at two levels: first, the logical structure of the stream, and second the actual physical representation.

Logical Stream Structure. The following grammar describes the set of stream elements and how they can be combined. Terminals are given in upper case; they are described in detail in the list following the grammar. '*' means repeated 0 or more times. '+' means repeated 1 or more times. Square brackets mean present 0 or 1 time.

TOC::=object+ object::=OBJECT-ID property+ property::=PROPERTY-ID value+ value TYPE-ID [GEN-NUM] [REF-OBJ-ID] value-data value-data::=initial-data continued-data* initial-data::=IMMEDIATE | SHORT-REFERENCE | LONG-REFERENCE continued-data::=CTD-IMMEDIATE | CTD-SHORT-REF | CTD-LONG-REF Object-ID, Property-ID, Type-ID, Ref-obj-ID. These are all object IDs. An object ID is a 32-bit persistent indentifier. The namespace for object IDs is local to the container. Object IDs are assigned sequentially as objects are allocated, and the last ID allocated in the container is maintain as a property of object #1.

Gen-num. This is a 32-bit generation number of the value. It can be set by default from the container, or explicitly for a given value. Generation numbers are intended to be assigned sequentially to each consistent update of the container. The generation number of the TOC value in object #1 is the default generation number of the container.

Immediate, Ctd-immediate. These are 0, 1, 2, 3 or 4 byte data values. They represent the actual data of the value. Except for the 0 byte case, they are all packaged in a 4 byte field. The ctd-immediate is exactly the same as the immediate, except that it is flagged to indicate that it is a value segment other than the first.

Short-ref, Ctd-short-ref. These are references to the data for a value segment using a 32-bit offset and a 32-bit length. The ctd-short-ref is exactly the same as the short-ref, except that it is flagged to indicate that it is a value segment other than the first.

Long-Ref, Ctd-long-ref. These are references to the data for a value segment using a 64-bit offset and a 32-bit length. The ctd-long-ref is exactly the same as the long-ref, except that it is flagged to indicate that it is a value segment other than the first.

Physical Stream Structure. To make the TOC readable without starting from the beginning, it is broken up into fixed size blocks. The block size in any given container is specified in its label, and can range from $2^{10}$ bytes to $2^{26}$ bytes. At the beginning of each block, there is assumed to be no previous information, and all information is written to the TOC. Thus a block can be read in and interpreted in isolation. The stream of elements in the TOC is annotated with format information to make it possible to parse it. This annotation is done by placing one-byte codes at each point where the stream is ambiguous. Each distinct code is followed by a specific sequence of fields.

The specific byte codes used in the TOC, and associated sequence of fields for each code are given in the following list. The fields correspond to the grammar terminals described above. All fields are four bytes long, except for long data offsets, which are eight bytes long. In the following, the 'U' suffix indicates an unsigned constant.

NewObject 1U
  Fields: object ID, property ID, type ID
  Meaning: Full specification of the identity of a value in the container. Found only at the beginning of an object or the beginning of a block.
NewProperty 2U
  Fields: property ID, type ID
  Meaning: Information required to begin a new property in an existing object.
NewType 3U
  Fields: type ID
  Meaning: Information required to begin a new value in an existing property.
ExplicitGen 4U
  Fields: generation number
  Meaning: Generation number of this value is different from preceeding value, or this is the first value in a block.
Offset4Len4 5U
  Fields: offset (4 bytes), length
  Meaning: Reference to value data; the first data segment for the value.
ContdOffset4Len4 6U
  Fields: continued offset (4 bytes), length
  Meaning: Reference to value data; not the first data segment for the value.
Offset8Len4 7U
  Fields: offset (8 bytes), length
  Meaning: Reference to value data; the first data segment for the value.
ContdOffset8Len4 8U
  Fields: continued offset (8 bytes), length
  Meaning: Reference to value data; not the first data segment for the value.
Immediate0 9U
  Fields: none
Immediate1 10U
  Fields: immediate data (1 byte) stored in a 4 byte field
Inmediate2 11U
  Fields: immediate data (2 bytes) stored in a 4 byte field
Immediate3 12U
  Fields: immediate data (3 bytes) stored in a 4 byte field
Immediate4 13U
  Fields: immediate data (4 bytes) stored in a 4 byte field
ContdImmediate4 14U
  Fields: continued immediate data (4 bytes) stored in a 4 byte field
  Meaning: Immediate data but not the first data segment for the value.
ReferenceListID 15U
  Fields: object ID
  Meaning: The ID of a bookkeeping object associated with this value. Occurs before any data references. Omitted if the value does not have a bookkeeping object.
EndOfBufr 24U
  Fields: none
  Meaning: end of current block, go to next
NOP 0xFFU
  Fields: none
  Meaning: NOP or filler; skipped.

Note that every TOC contains a standard object that is used to describe the TOC itself. In particular, it is object ID 1, so the TOC entries for the TOC itself always come at the beginning of the TOC. (Object ID 0 is never used). Additional TOC properties can be useful. For example, an index to speed access to the entries by ID could be attached to the TOC through another property. Potentially several such indexes, using different formats, could be attached.

Object IDs other than IDs of standard objects are generated by sequentially incrementing a counter from 0x00010000. Object IDs are never reused in later generations of a container if an object is deleted.

The last ID number generated is kept as a property of object #1 to allow generating further IDs without reuse.

E. Format Usage Examples

This section serves two purposes. First, it provides several examples of how the container format can be used. Second, the more advanced examples show how to use the built-in extensibility of the Container Manager to address additional needs, by defining the required properties and types. Thus these advanced examples provide examples of how to extend the basic format.

These usage examples are given in a relatively complete and literal form. Even the TOC entries for standard objects are given, although they are not required, to provide a complete picture of what is going on. The examples are given in a tabular form of the TOC, which is representative rather than physical, but which is much more human readable than the stream format.

Some of the details of the representation have been manufactured specifically for these examples, such as the actual ID values, details of the naming conventions used in the property and type names, etc. For example, the Global Unique Names in the examples have not been revised to conform to ISO structured name syntax, as is preferred.

Embedded Stream Files. Suppose we have a container that simply contains two objects, with references from the first stream to the second. For example, the first object could consist of a stream of rich text, and the second object could be an image that is logically embedded in the text. Let us further suppose that the image has two alternate representations in different formats, each of which is a stream. This example exercises much of the basic machinery of the Container Manager.

FIG. 9 illustrates relevant parts of the TOC. Each TOC entry is labeled with a lowercase letter to make it easier to refer to it; the letters are not actually part of the TOC contents. For the sake of this example we assume that the rich text type is a standard object that does not need to be in the TOC, but that an entry is provided anyway. We also assume that the types of the image streams are not standard objects, so that they must be provided.

Entry (a) is the only entry in the rich text type description. The local ID of the rich text type is 268. Note that since this is less than $2^{16}$ we know that it is a standard object. Thus this TOC entry is not really required, but it is provided for illustrative purposes. The value of the entry is simply the Globally Unique Name that identifies the type. The text of the Globally Unique Name is listed below the TOC entries, labeled "vo.1" (for "value offset 1"). The value of v1.1 is the length of the string, including the null at the end. The property ID (18) means "TypeName"; the type ID (22) means "GloballyUniqueName". The description object is immutable, so it has generation 0.

Entries (b) and (c) are very similar. Each one is a type description object, as indicated by the number 18 in the Property ID field. Because their Object IDs are greater than $2^{16}$, we know that they are not standard objects, and thus they are actually required in the TOC (this is mainly for illustrative reasons). The property and type IDs are the same as in entry (a).

Entry (d) is the single entry for the RTXT object. Its property ID (38) means "Primary Value". Its type ID (268) is the same as the Object ID of entry (a), indicating that its value is an RTXT value. Its offset (vo.4) points to the actual rich text data in the container, which contains an embedded ID (723655). Its generation number (6) means that its entry and value were last modified in the sixth generation (copy) of this container.

Entries (e) and (f) are also very similar, but in a different way than (b) and (c). Note that both entries have the same object ID, indicating that they are both properties of the same object. Furthermore, both entries have the same property ID (38) indicating that they are both primary values of the object. Thus, they are alternative representations of the primary value. Looking at their type IDs, we can see that one value is a PICT (400348) and the other is a Windows metafile (400563). Furthermore, looking at the generation numbers, we can see that both have been updated more recently than the text stream but that the Windows metafile was updated most recently.

The TOC Itself. A somewhat more recursive example is the description of the TOC by itself, illustrated in FIG. 10. Every TOC actually contains such a self-description, so reader code actually has to deal with some of this structure, but it will typically not be visible at the application level. The portion of the TOC illustrated in FIG. 10 is a portion of the same TOC as is illustrated in FIG. 9, so we will see some relationships between the content objects described above, and the properties of the TOC itself.

Entry (a) is an actual reference to the TOC as a value. The offset field (vo.1) will contain the offset of the TOC in the container (that is, the offset of the beginning of this entry). The length field (vl.1) will contain the length of the TOC in bytes. The property indicates that this is the primary value for the TOC object, and the type indicates that it is the normal top-level TOC format.

Entry (b) is also a property of the TOC object. It contains a value one larger than the last ID used. Note in this case that it is somewhat higher than highest ID that appeared in the previous example. This occurs if more objects were created, and then deleted. The seed prevents reuse of those IDs, in case some of them have been remembered (either within this container, or in external references to objects in this container). This prevents accidental aliasing.

Since the value of entry (b) is only four bytes long, it can be stored as an immediate value.

Entry (c) indicates the root object of the content in the container. Note that it contains the ID of the RTXT stream in the previous example, since that is the root content object. The ID is also an immediate value. Note that the generation numbers of the TOC entries correspond to generation numbers of the relevant content objects. The generation of the TOC value itself is the generation of its most recent object. The generation of the root reference, however, indicates when the root was set to that object. It is the same generation as the object itself, so probably that object has been the root since it was created.

The remaining entries, (d) through (g), would not actually appear in a normal TOC because they are standard objects. They would, however, be legal. They are shown for illustrative purposes. The first two are property descriptions, and the second two are type descriptions. Note that the only property of each description is the Globally Unique Name.

Types and Properties. Our third usage example is the most recursive, and would never occur in a real Container Manager container, but it documents the format, and it may be interesting as an extreme case. The example, illustrated in FIG. 11, shows the top of the type hierarchy, where the properties TypeName and PropertyName, and the type GloballyUniqueName are defined. Naturally these descriptions are all standard objects, and they are very unlikely to appear in any TOC. Furthermore, realistically, if they did, no reader would be able to use them. However, as an example, this may give some insight into both the more exotic uses of the Container Manager, and the structure of the type and property mechanism.

In addition, to tie the example to some of the concrete types we have already seen, we give a more complete derivation of the RTXT type, including its supertype COBJ, and a dictionary that describes RTXT in terms of COBJ.

In entries (a), (b), and (d) we finally see the definition of the previously used property IDs 18, 20, and 22. Aside from the fact that they use each other, and (b) and (d) use themselves, they are fairly normal property and type descriptions.

Entry (c) introduces the SuperType property, and it is used in entry (e). Entry (e) effectively says that a GloballyUniqueName is spelled in printable 7 bit ASCII. Note that it uses an immediate reference to the supertype. Entry (f) defines the local ID type we have been using, and entry (g) defines printable 7 bit ASCII. Entry (h) introduces a very general property that allows us to attach data format descriptions to objects. It is intended primarily for use in type descriptions. The interpretation of the data format description will depend on its type.

Entries (i) and (j) are parts of the description of a stream oriented data definition standard referred to herein as COBJ. (i) describes the type of actual COBJ values, while (j) describes the type of COBJ type dictionaries, which define the format of particular streams.

Finally, entries (k) and (l) and (m) describe RTXT (ID 268, as we saw in the first example). Here in addition to the Globally Unique Name of RTXT, we have the COBJ type dictionary, and the reference to COBJ as the supertype of RTXT.

II. IMPLEMENTATION

A. Hardware

The Container Manager of the present embodiment is implemented entirely as software instructions and data, to be executed on general purpose computer hardware. No specific hardware platform is required. For completeness, however, FIG. 3 illustrates a typical hardware computer system platform on which the Container Manager might run.

Figure 3:
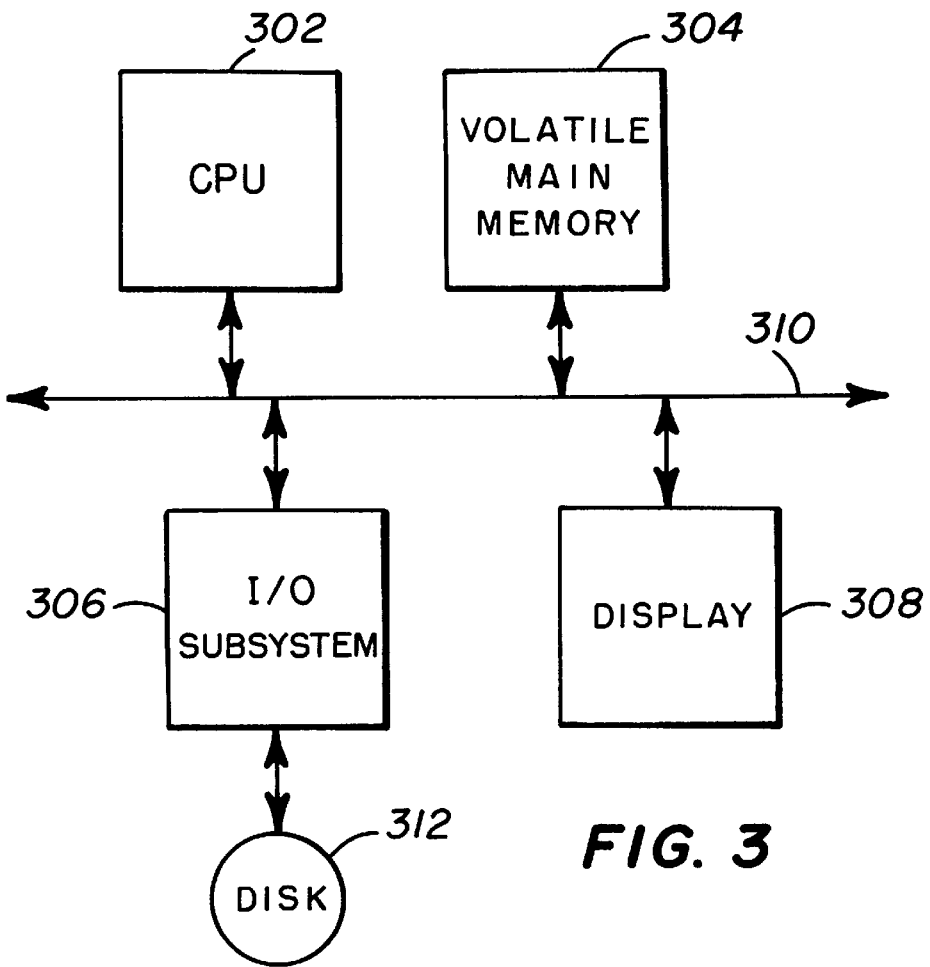
FIG. 3 is a block diagram of a hardware computer system platform.

The computer system of FIG. 3 comprises a CPU 302, main memory 304, which may be volatile, an I/O subsystem 306, and a display 308, all coupled to a CPU bus 310. The I/O subsystem 306 communicates with peripheral devices including nonvolatile storage devices, such as a disk 312. In typical operation, an application program, together with at least those Container Manager routines which are used by the application program, are retrieved from the disk 312 into main memory 304 for execution by the CPU 302. All of the data structures described below and specified as being "in-memory" data structures are also created in the main memory 304, in the sense that memory space is allocated for the information to be contained in the data structures, and all of the software routines which read or write to such memory locations do so according to some known definition of fields. In addition, pointers are written to certain of the allocated main memory storage areas, which pointers refer to other structures in memory in a known manner which is defined by the data structure. Thus a data structure, as used herein, is an abstract description of the organization of data in main memory 304; when the data structure is "created" in main memory 304, this description is imposed on regions of main memory 304 so that specific items of information can be found and/or interpreted according to the data structure. The term "pointer", as used herein, is a well-known shorthand for physical signals which are stored as charge, current or voltage levels in the memory cells which implement the main memory 304. These signals "identify" an item of information memory 304 in the sense that, when applied to the memory 304 as an address (either directly or via an address translation mechanism), they cause the memory 304 to read out data from the item pointed to or identified by such signals. Data structures in nonvolatile storage are similar.

Also, it will be understood that even though different types of computer systems implement schemes such as caching and virtual memory, in which some of the data may not actually be located in main memory 304 itself at various times, these mechanisms are transparent to the Container Manager embodiment described herein. Thus, the data in "in-memory" data structures is referred to herein as being located "in" main memory 304, even if it is actually, transparently, located elsewhere.

B. In-Memory Data Structures

Figure 4:
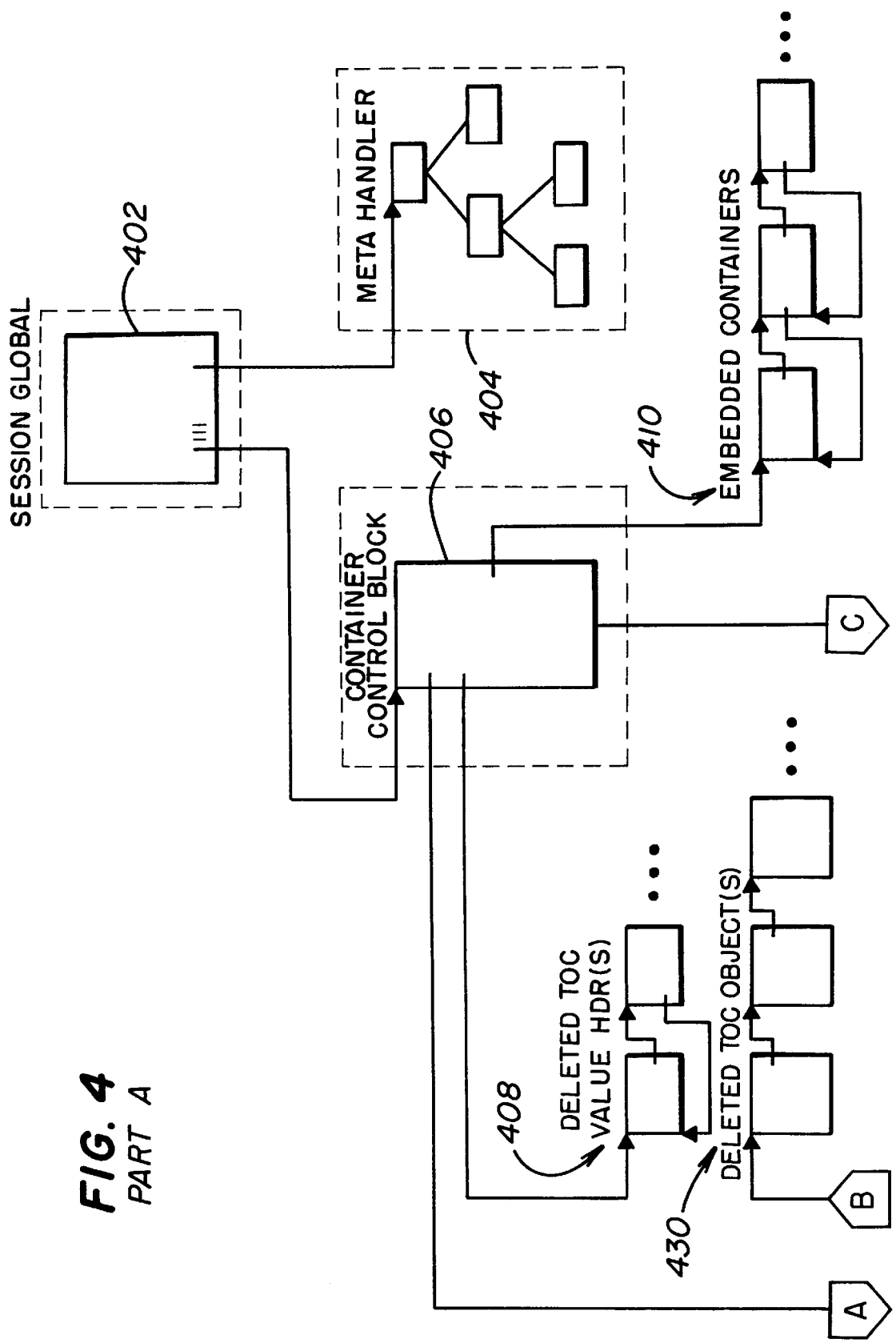
FIG. 4 is an overall block diagram of major data structures which are created in main memory of the computer system of FIG. 3 during the pendency of a session.
Figure 4:
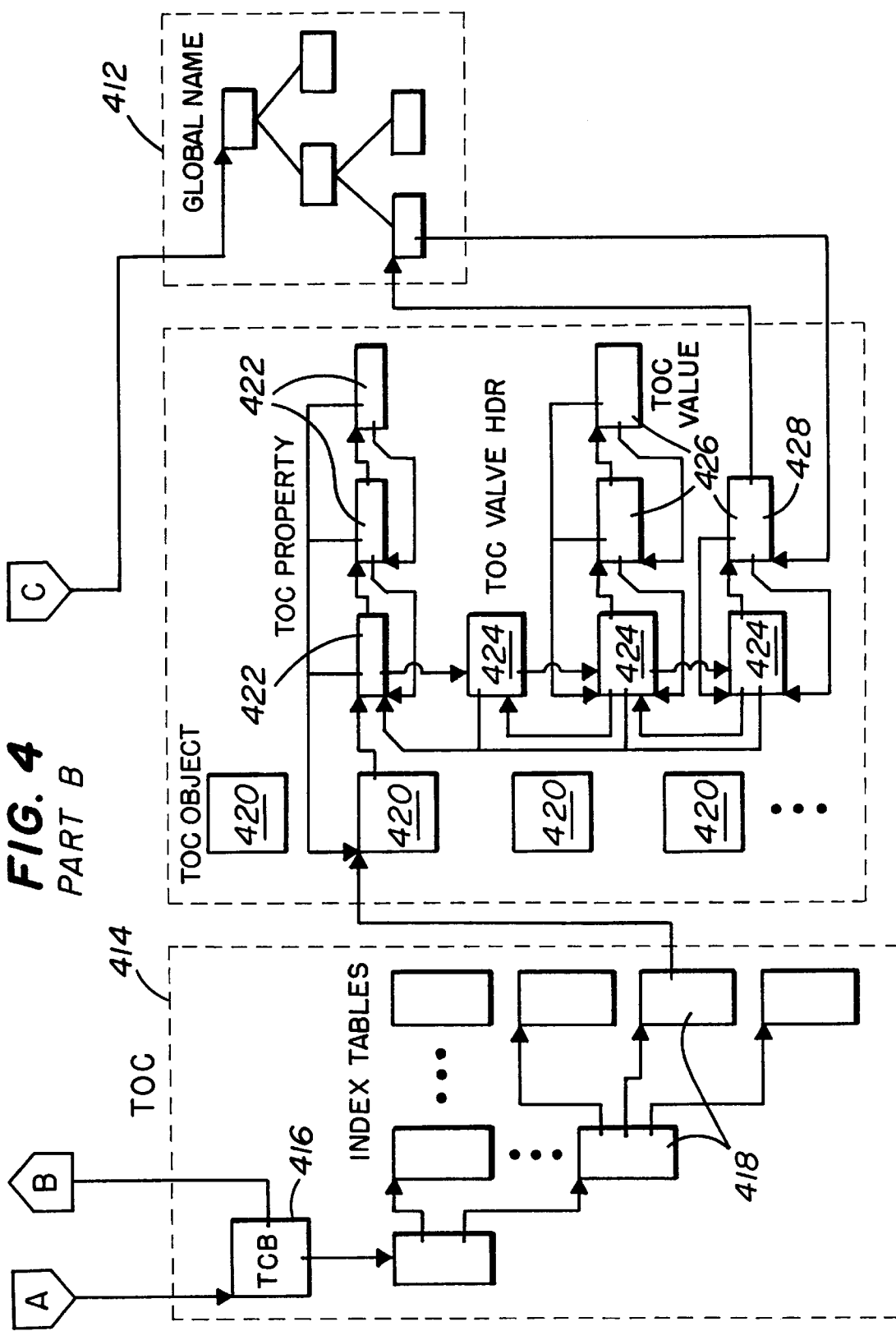

FIG. 4 is an overall block diagram of the major data structures which are created in main memory 304 during the pendency of a "session". Data block 402 is a "session global data" block containing all of the session-wide data for a given Container Manager session. There is no static global data in the code. All open containers are tied to the session on a doubly linked list whose head and tail pointers are contained in the session global data. The root of a metahandler table 404 (described below) is kept here as well along with the session handler pointers for malloc, free, and error reporting.

Containers are identified in the session global data block 402 by a pointer to the container's Container Control Block (CCB). Each time a container is opened with CMOpenContainer( ) or CMOpenNewContainer( ), a new container control block 406 is created. The pointer to the container control block 406 is what is returned to the user as a container "refNum" (reference number).

There are five primary data structures tied to the container. Four are shown in the diagram and the fifth is the "touched chain", used for recording updates. The "touched chain" is discussed with reference to FIG. 12.

The four shown main data structures pointed to from the container control block 406 are the list 408 of deleted values (TOCValueHdr(s)), a list 410 of embedded container pointers, the global name symbol table 412, and a pointer to a TOC 414 control block 416.

The table of contents (TOC) 414 is the set of related data structures that organize objects by object IDs. The requirement that objects be kept in sorted order (sorted by object ID) puts certain constraints on its organization. Further, the fact that the IDs are generated sequentially in new containers also must taken into account (for example, binary trees would not be a good choice in such a situation).

The method used in the Container Manager of the embodiment described herein is an index table algorithm. It is somewhat memory intensive but allows objects to be accessed linearly in time and keeps the objects in the required sorted order. The index tables correspond to "powers" of a chosen index table size. For example, if the table size is 256 and the maximum ID is 0xFFFFFFFF (32-bits unsigned on MC68XXX machines) the access depth will be 4 for any ID.

To illustrate this, if we had ID 0x00123456 we would have 4 indices: 0x00, 0x12, 0x34, and 0x56. Four index tables would exist each corresponding to the indices 00 to 0xFF, i.e., mod the size of an index table. Each index is used to index into its corresponding index table. Thus, in this example, the first table would have its 0x00'th entry pointing to the next table. That next table would have its 0x12 entry pointing to the third table. The third table would have its 0x34 entry pointing to the last table. The 0x56 entry in the last table would point to the actual object with ID 0x00123456.

Continuing with this example, if every ID possible were represented, then there would still be only one top level table. But there would be 256 second level tables corresponding to the 256 level-one indices. Each of those 256 level-two tables would have pointers to 256 level three tables and so on down to level 4.

Fortunately, new containers are generated with sequential IDs so that only the minimum number of tables is required. But if a new nonsequential number is needed the requisite new tables are generated as needed to go from the top level table to the lowest level table.

The routines that maintain this data structure are generalized to support any size table (within limits). There are trade-offs between table size and access time, which are apparent to a person of ordinary skill.

Because of this generalization, a TOC has associated with it all the variables that are needed to manipulate the index tables. This is kept in TOC control block 416, pointed to from the container control block. The TOC control block 416 is to TOC object access, what the container control block 406 is to the entire container.

The TOC control block points to another data structure not shown here to keep the drawings simple. It is a set of three head/tail list pointers to doubly linked lists of the TOCObject(s). The three lists are for all the objects, property objects, and type objects in the container. Thus the type and property lists are subsets of the object list. These lists are only just for the CMGetNextxxx( ) routines. These lists are kept as part of the TOC since, there can be only one TOC and one of these list sets. Note that for updating, there can be multiple containers using the same TOC, so putting these data structures here is the most convenient way to deal with them during updating.

Note, that since there can be multiple users of a TOC, a TOC requires a "use count" to prevent premature release of the TOC.

The lowest level of the TOC index tables 418 contain pointers to the container objects themselves instead of to other index tables. These objects are TOCObjects 420. The TOC entries for an object are linked off of their TOCObject. TOCObjects are returned to the user as object refNums (CMObject, CMType, and CMProperty).

The properties, TOCProperties 422, for an TOCObject are contained on a doubly linked list off the TOCObject. The values for each property are on a doubly linked list of value headers, TOCValueHdrs 424, off of each TOCProperty. Finally, a specific real (as opposed to dynamic) value, such as one of the TOCValues 426, is linked to its TOCValueHdr.

The reason the values are linked to a value header is because of continued (multi-segment) values. A multi-segment value can have more than one value entry. Hence the chain. Also, it is pointers to value headers that are returned to the user as value refNums (CMValue).

As used herein, a "header" for an item or items of information is a logical collection of information which applies generally to the item or items. The header need not be physically located in a contiguous region of memory, nor must it be contiguous with any of the items themselves.

Each TOCValue 426 can be either immediate, non-immediate, or a global name. Immediate values contain 1, 2, or 4-byte value data encoded directly in the entry. Non-immediates contain a container offset to the value data and its length. Non-immediates can also represent dynamic values (discussed below). Global name values, such as 428, are pointers to global name symbol table entries (discussed shortly) and once the value data has been written to the container, the container offset.

Note the diagram shows, in addition to the doubly linked list structures, a pointer for each TOCValue back to its value header. Similarly, each TOCValueHdr has a pointer back to its TOCProperty. Finally, each TOCProperty has a pointer back to its TOCObject. Not shown is a pointer from each TOCObject and each TOCValueHdr back to its container control block. The result is that anything can be accessed from almost anywhere and in any direction.

When a CMRegisterType( ) or CMRegisterProperty( ) is done, a check must be made to see if the specified global name already exists. For this, a simple binary tree symbol table 412 is used. Since a global name is itself a type or property object value, there is also a pointer from a TOCValue to the name in the global name symbol table. Each global name symbol table is unique to its container. Hence the container control block has the root to its tree of global names.

Whenever a container is opened a set of predefined global names is generated. Basically the equivalent of CMRegisterType( ) and CMRegisterProperty( ) is done but the object IDs are standard rather than user IDs.

TOC ID #1 of every container contains properties about that container as well as the TOC itself. Tables I and II summarize all the TOC #1 properties. Table I is in terms of property and value ID numbers and Table II is in terms of the property and value names. In all cases the values are shown as the macros defined for these entities. The left column in the tables is the actual property number subscripted with an "r" or "o" indicating whether it is required or optional. Required means that the TOC #1 object must have that property to be considered valid.

TABLE I

| # required | Property Name | Type | Value |
|---|---|---|---|
| 2r | CM_StdObjID_TOC_Seed | CM_StdObjID_TOC_Type | starting ID seed |
| 3r | CM_StdObjID_TOC_MinSeed | CM_StdObjID_TOC_Type | original starting seed |
| 4r | CM_StdObjID_TOC_Object | CM_StdObjID_TOC_Type | private TOC as an object |
| 5r | CM_StdObjID_TOC_Container | CM_StdObjID_TOC_Type | entire container as an object |
| 6r | CM_StdObjID_TOC_Deleted | CM_StdObjID_TOC_Type | total value data space deleted |
| 7o | CM_StdObjID_TOC_Free | CM_StdObjID_TOC_Type | free space list as value segments |
| 8o | CM_StdObjID_TOC_NewValuesTOC | CM_StdObjID_TOC_Type | new values for target container |
| 9o | CM_StdObjID_TOC_Target | CM_StdObjID_TOC_TargetContainer | offset/size to appended target |
| 10o | CM_StdObjID_TOC_DeleteList | CM_StdObjID_TOC_UpdatesData | object/property deletion updates |

Table II is similar to Table I, but in terms of property and type names, which is the way a user would access TOC #1 properties (using CMRegisterType( ) and CMRegisterProperty( )):

TABLE II

| # required | Property Name | Type | Value |
|---|---|---|---|
| 2r | CMTOCSeedGlobalName | CMTOCValueTypeGlobalName | starting ID seed |
| 3r | CMTOCMinSeedGlobalName | CMTOCValueTypeGlobalName | original starting seed |
| 4r | CMTOCObjectGlobalName | CMTOCValueTypeGlobalName | private TOC as an object |
| 5r | CMTOCContainerGlobalName | CMTOCValueTypeGlobalName | entire container as an object |
| 6r | CMTOCDeletedGlobalName | CMTOCValueTypeGlobalName | total value data space deleted |
| 7o | CMTOCTotalFreeGlobalName | CMTOCValueTypeGlobalName | free space list as value segments |
| 8o | CMTOCNewValuesTOCGlobalName | CMTOCValueTypeGlobalName | new values for target container |
| 9o | CMTOCTargetGlobalName | CMTargetContainerName | offset/size to appended target |
| 10o | CMTOCDeleteListGlobalName | CMUpdatesDataGlobalName | object/property deletion updates |

The following is a brief description of each of these property values. They are listed using the above property/type name macros:

CMTOCSeedGlobalName / CMTOCValueTypeGlobalName—starting seed

The starting object ID seed for the container. It is the next available ID seed at the time the container is closed.

CDTOCMinSeedGlobalName / CMTOCValueTypeGlobalName—original starting seed

The starting object ID seed for the container as a constant. For a new container it is equal to CMTOCSeedGlobalName. When updating, this is the initial seed for the updating container as derived from the CMTOCSeedGlobalName of the target. Thus CMTOCMinSeedGlobalName to CMTOCSeedGlobalName define the range of object IDs in a container at close time.

CMTOCObjectGlobalName / CDTOCValueTypeGlobalName—private TOC as an object

Defines the private TOC as an object and must agree with the size defined in the container label. This will be the entire TOC unless there is a non-private (updating) portion. For updating, the non-private TOC is defined by the CMTOCNewValuesTOCGlobalName (see below).

CMTOCContainerGlobalName / CMTOCValueTypeGlobalName—entire container as object

Defines the entire container as an object. Thus the size of this value is the size of the container. This includes the container label. For appended updating containers this includes all the appended container's targets (in other words, offset 0 to the offset of the last byte of this container's label).

CMTOCDeletedGlobalName / CMTOCValueTypeGlobalName—total space deleted

A CM_ULONG value representing all deleted value data space created by CMDeleteValueData( ).

CMTOCTotalFreeGlobalName / CMTOCValueTypeGlobalName—free space list

An internal list of immediate value data segments, each of whose offset and size represent available free space. Note, the total space represent here may be less than CMTOCDeletedGlobalName since not all space is recorded due to the cost of recording this information as TOC entries.

CMTOCNewValuesTOCGlobalName / CMTOCValueTypeGlobalName—new target values

Defines that portion of an updating TOC that contains new values for "old" properties and new values for new properties. This is used to distinguish the "private" TOC of an updating container from objects applied to its target. See below for further details.

CMTOCTargetGlobalName/CMTargetContainerName— "pointer" to target container

The "pointing" value to the target container when updating. For an appended target, the type is always CMTargetContainerName and the value's offset/size are to the appended target (including the label). This is similar to embedded containers. For separate updaters, the type is not CMTargetContainerName. Rather it's a dynamic value type as determined by a "return target type" handler. A CMUseValue( ) on such a value will spawn a dynamic value whose handlers will access the separate target.

CMTOCDeleteListGlobalName / CMUpdatesDataGlobalName—object and property deletions The object and property deletion update instructions for an updating container when applied to a target.

Returning to FIG. 4, note that global names are not written to the container at the time they are created. Instead they are kept in the global name symbol table. When a container that was open for writing is closed, the global name symbol table is "walked" and all user defined names written to persistent storage. At that point the TOCValues associated with global names are set with the container offsets for those names. This is done using the back pointer from each global name entry to its TOCValue. The TOC is then written followed by the label. Since the TOC is written after the global names, all the global name offsets will be set by that time. Thus everything is correct when the container is to be read.

The Container Manager of the presently described embodiment supports embedded containers. Embedded containers are treated just about like any other. The main difference is that they require a special handler that writes or reads (CMWriteValueData( ) and CMReadValueData( )) to a value that belongs to the parent container. The handlers keep track of offsets within the value that it is treating as a container.

The effect is to write or read a value in the parent container as if that value was itself a container. All the data for the parent container value is created as a container, complete with its own TOC and label. The offsets in the embedded container's TOC are relative to the start of the parent container value, offset 0, just as in the non-embedded case. This means that a parent container value could be read to copy the embedded container as is.

Aside from the special handlers, most of the other stuff needed to open and close a container is independent of whether it is embedded or not. There are a few wrinkles, however. First, a container can have any number of embedded containers open at the same time. Each of those could also, and so on. The result is essentially a tree of open embedded containers. Since the data for a parent container value is its embedded container, then if there are any more deeply embedded containers, they would also be part of the parent container's value. This gets very confusing if you try to think of it more than two levels deep.

In all cases, when a parent is closed, we want to close all of its descendants.

The embedded container list 410 pointed to from the container control block is used so that a parent container can keep track of all of its immediate descendants. Each entry in the list is simply a pointer to a descendent container control block. At open time an entry for the embedded container is created in its parent container's embedded container list. At close time CMCloseContainer( ) will go through its list of embedded containers (i.e., the list of its immediate descendants) and recursively call CMCloseContainer( ) to close those. The net result is the desired one of closing all the descendants of the parent container in the tree of embedded containers. An embedded container being closed is responsible for removing itself from its parent's embedded container list so that it won't be "seen" again if a parent further up the tree is closed subsequently.

Note, an application program can perform the functionality of embedded containers by using dynamic values. However, the Container Manager, not being aware of this use of dynamic values, will not maintain the embedded containers list for it. Thus the application program will be responsible for explicitly "closing" each dynamic value corresponding to an embedded container using CMReleaseValue( ).

When CMDeleteObject( ) is called, an object is to be deleted. When CMDeletevalue( ) is called, a value for a property of an object is to be deleted. As mentioned above, the refNums for objects (CMObject, CMProperty, and CMValue) are pointers to TOCObjects. Values (CMValue) are pointers to TOCValueHdrs. Thus we cannot truly delete the items (i.e., free their memory) these point to because there is no reliable way to verify that the pointers are valid.

The solution adopted is to put all deleted objects and values on a list of deleted items associated with the container. There are two lists: list 430 for objects pointed to from the TOC control block, and list 408 for deleted values pointed to from the container control block itself.

Note, since object refNums are TOCObjects, and value refNums are TOCValueHdrs, the only thing needed on these lists are those data structures. TOCProperties and TOCValues can be freed. The TOCObjects and TOCValues are flagged as "deleted". Whenever any object or value is passed to the API it is checked for the flag. It is an error to use a deleted item.

CMSetMetaHandler( ) is called by the user to record metahandler/type name associations. These are maintained in binary tree symbol table 404. The root of this tree is a "global" in the session data. It is not tied to any one container. When a container is opened, a type name is passed. This is used to look it up in the metahandler symbol table. This yields a metahandler function address which in turn is used to get actual handler routine addresses.

The following C-language struct defines the layout of all in-memory TOCObjects. The objects are accessed by their object ID.

Types, too, are described using objects of the TOCObject form set out above. The structures of TOCValueHdrs 424 and TOCValues are set forth hereinafter.

Figure 5:
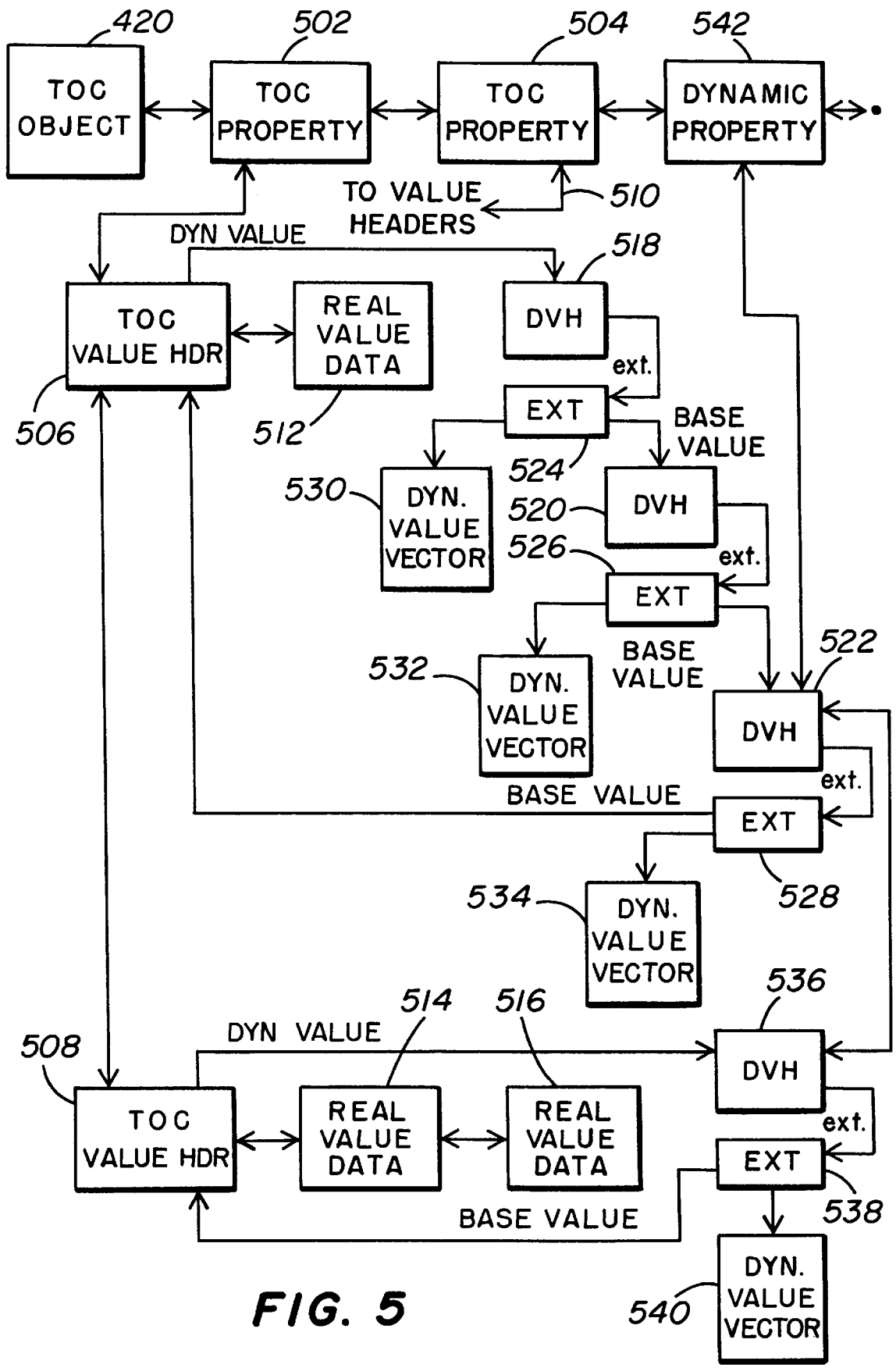
FIG. 5 illustrates the structure of in-memory objects which are created by dynamic value mechanism.

As previously mentioned, the Container Manager routines CMNewValue( ) and CMUseValue( ) create a dynamic value chain for each type that has a "UseValue" and a "NewValue" handler. FIG. 5 illustrates the structure of in-memory objects which are created by the dynamic value mechanism.

Referring to FIG. 5, it is assumed that one of the TOCObjects 420 (FIG. 4) has a series of properties 502, 504, and so on (corresponding to 422 in FIG. 4). It is assumed further that property 502 has two values associated with it, indicated by value headers 506 and 508 (424 in FIG. 4). These values are of different types, as will be seen from the fact that different dynamic value chains are created for these values. Property 504 also has values associated with it, but these are shown only in the abbreviated form of an arrow 510.

```
© 1992 Apple Computer, Inc.
struct TOCObject {                            /* Layout of a TOC object:    */
    CMObjectID    objectID;                   /* the object's ID (keep first for debugging) */
    ListHdr propertyList;                     /* list of object property entries */
    struct Container *container;              /* ptr to "owning" container control block */
    struct TOCObject *nextObject;             /* chain to next object by increasing ID    */
    struct TOCObject *prevObject;             /* chain to previous object by decreasing ID    */
    struct TOCObject *nextTypeProperty;       /* chain of next type/property by increasing ID*/
    struct TOCObject *prevTypeProperty;       /* chain of previous type/property by decr. ID */
    unsigned short objectFlags;               /* info flags about the object         */
    CMRefCon      objectRefCon;               /* user's object refCon    */
    unsigned long useCount;                   /* count of nbr of times "used" */
    struct TOCObject *nextTouchedObject;      /* link to next touched object    */
    ListHdr touchedList;                      /* values/properties touched IN this object    */
};
typedef struct TOCObject, *TOCObjectPtr;
```

The following objectFlags are defined:

```
© 1992 Apple Computer, Inc.
#define UndefinedObject    0x0001U     /*   1 ==> object created but undefined*/
#define ObjectObject       0x0002U     /*     ==> object is a base object */
#define PropertyObject     0x0004U     /*     ==> object is a property descriptor*/
#define TypeObject         0x0008U     /*     ==> object is a type descriptor*/
#define DeletedObject      0x0010U     /*     ==> object has been deleted */
#define DynamicValuesObject 0x0800U    /*     ==> object "owns" dynamic values*/
#define TouchedObject      0x1000U     /*     ==> object has been "touched" */
#define ProtectedObject    0x2000U     /*     ==> object is locked/protected */
#define LinkedObject       0x4000U     /*     ==> object linked to master lsts*/
#define UndefObjectCounted 0x8000U     /*     ==> object counted as undefined */
```

Note that the properties 502 and 504 in the object of FIG. 5 are described by property descriptors which are themselves objects which follow the above layout. The layout of each of the properties 502, 504 and 542 is defined as follows:

Associated with real value header 506 is a segment 512 of real value data, and associated with value header 508 are two segments 514 and 516 of real value data. If the values for the property 502 were not of types which require creation of

```
© 1992 Apple Computer, Inc.
struct TOCProperty {              /* Layout of a TOC object property: */
    ListLinks propertyLinks;      /* links to next/prev property (must be first) */
    TOCObjectPtr theObject;       /* ptr to "owning" object */
    CMObjectID    propertyID;     /* the property's ID */
    ListHdr       valueHdrList;   /* list of the property's values */
};
typedef struct TOCProperty TOCProperty, *TOCPropertyPtr;
``` dynamic values, then the actual data of the values would be stored in segments 512, 514 and 516. Since the type of these values call for dynamic value creation, however, the data stored in real value data segments 512, 514 and 516 may instead be transformed versions of the actual data and/or may contain only indirection information.

The value header structure includes a pointer to the top dynamic value header 518 in a chain of dynamic value headers 518, 520 and 522. Each of the dynamic value headers 518, 520 and 522 have a format which is identical to the value header (also called a "real value header") 506, except that the field in real value header 506 which pointed to dynamic value header 518, is redefined in dynamic value header 518 to point to a set of dynamic value header extensions 524. The extensions 524 include an entry which points to the base value of the dynamic value header 518, which in the case of this chain, merely points to the second dynamic value header 520 on the chain. Dynamic value header 520 in turn points to its own dynamic value header extensions 526, which in turn point, in the base value field, to dynamic value header 522. Dynamic value header 522 also points to its dynamic value header extensions 528. But since dynamic value header 522 is at the bottom of the chain, its base value is the real value data stored in segment 512. Thus, the "base value" field of extensions 528 points back to the real value header 506.

Recall that the purpose for creating a chain of dynamic value headers 518, 520 and 522 is to implement a complex value type which transparently handles data transformations and redirections. Each of the dynamic value headers 518, 520 and 522 corresponds to a respective one of the types on the tree defining the complex type of the value headed by real value header 506. Thus, each of the dynamic value headers 518, 520 and 522 maintains its own vector of value handlers to be used when a higher level caller desires to invoke a value operation. These dynamic value vectors are illustrated in FIG. 5 as 530, 532 and 534, pointed to respectively by extensions 524, 526 and 528. The dynamic value vectors 530, 532 and 534 contain a series of pointers to the respective value handlers to be called. The pointers are in predefined locations in the vector; for example, the third entry in each vector contains the pointer to the WriteValue-Data handler to be called for a value data write operation.

The value header 508 in FIG. 5 is for a value whose type spawned only a single dynamic value header 536. Thus, the value header 508 points to dynamic value header 536, which in turn points to its extensions 538, which in turn points both to a dynamic value vector 540 and, for the base value, back to the value header 508.

When a real value spawns dynamic values, a special dynamic value property 542 is created only to contain the dynamic value headers. Only the bottommost layer of each dynamic value chain (the layer whose base value is the "real" value) is on the dynamic property chain. All higher layers are not part of the dynamic property chain. The dynamic value property chain is used to simplify deletion of dynamic values, for example when the container is to be closed.

Dynamic value headers never have value segment lists. No data is ever written to a dynamic value because these headers are removed when the value is released using a CMReleaseValue( ). If there is any data, it must be associated with a "real" value—the real value associated with a dynamic value or some place else.

In each value header there is a pointer (a union called "dynValueData" with alternative fields called "dynvalue" and "extensions") that contains three possible values:
1. dynValueData is NULL for "real" value headers that don't have a corresponding dynamic value.
2. dynValueData.dynValue is a pointer to the top-most layer if it is a "real" value that does have a corresponding dynamic value header.
3. dynValueData.extensions is a pointer to the extensions if it is itself a dynamic value header.

The value header's flags determine how to interpret the pointer.

When a dynamic value is spawned by CMNewValue( ) or CMUseValue( ), the pointer to the top-most dynamic value header is returned as the refNum. That means whenever the user passes it to an API value routine, it will check to see if the refNum is a dynamic value. If it is, it initiates the call to the corresponding value handler using the vector in the extensions. That may cause a search up the base value chain to look for the inherited value routine. In the limit, the original API value routine is used if no handler is supplied and the "real" value in the chain is reached. That's how data could get in there.

Figure 6:
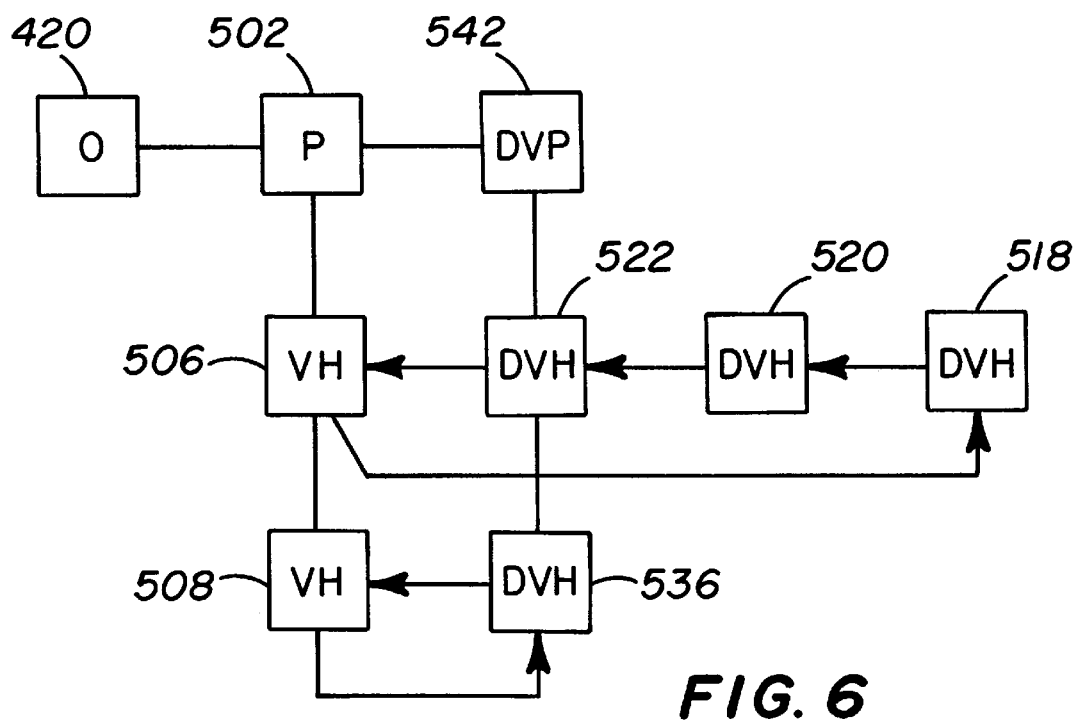
FIG. 6 illustrates the same structure as FIG. 5 using a simplified notation.

FIG. 6 illustrates the same structure as FIG. 5 using a simplified notation. This notation will make it easier to describe how dynamic values are spawned and layers created. Here "O" is object, "P" is property, "VH" real value header, "DVP" the dynamic value property, and "DVH" a dynamic value. The value segments are omitted.

As previously mentioned, when a CMNewValue( ) or CMUseValue( ) is almost done, a check is made on the value's type, and all of its base types (if any) to see if it has an associated registered metahandler. If it does, it is called with a "use value" operation type to see if a "use value" handler exists for the type. If it does, the dynamic value is spawned. Thus if CMNewValue( ) or CMUseValue( ) sees any (base) type that has an associated "use value" handler, it will spawn a dynamic value.

The spawning is done essentially by calling the "use value" handler. It is expected to set up a refCon to pass among the value handlers and a pointer to another metahandler. These are returned to CMNewValue( ) or CMUseValue( ) which uses newDynamicvalue( ) to do the actual creation of the dynamic value. The extensions are initialized, the metahandler pointer saved, and the refCon is also saved. The pointer to the created dynamic value header is what CMNewValue( ) or CMUseValue( ) returns to the user as the refNum.

When the user attempts to do a value operation using this refNum, a check is made that the refNum is for a dynamic value. If it is, the corresponding handler routine will be called. The vector entries are set on first use of a value operation. It may mean searching up the base value chain, but once found, the handler address is saved in the top layer vector (associated with the refNum) so the search doesn't have to be done again.

Note that if the search must be done up the base value chain, then the dynamic value refNum (pointer), in addition to the handler address, must be saved. This is very much like C++ classes, where inherited methods are called and the appropriate "this" must also be passed. The "this" in this case is the refNum.

Previously there was described a layered type T which was registered in the Container Manager with its two base types Layer1 and Layer2 as follows:

```
layer 1   = CMRegisterType(container, "Layer1");
layer2    = CMRegisterType(container, "Layer2");
t         = CMRegisterType(container, "T");
CMAddBaseType (t, layer1);
CMAddBaseType (t, layer2);
```

Figure 7:
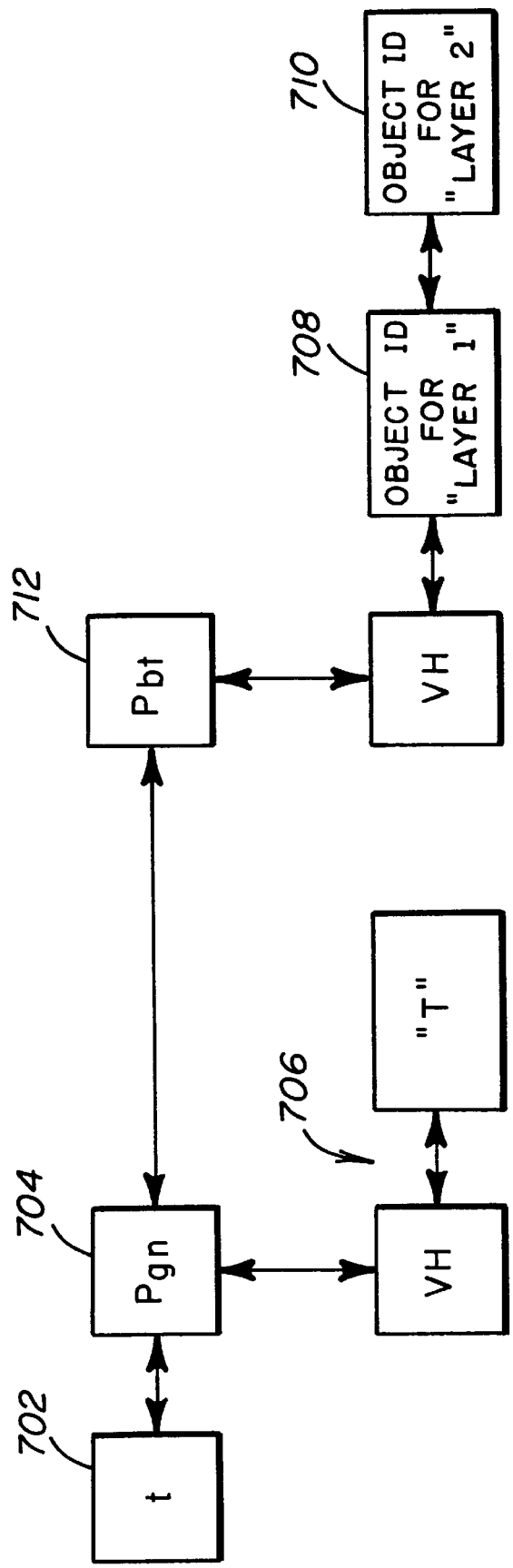
FIG. 7 illustrates a type object using the notation of FIG. 6.

Internally, the t object can be represented as shown in FIG. 7 (using the notation of FIG. 6). The value data segments are shown here with the data the segment will point to in the container.

For the t object 702, the global name property 704 and value 706 are created, as usual, by calling CMRegisterType( ). The CMAddBaseType( ) calls add the base types. These are recorded as the object IDs for each base type in the order created as separate value segments 708, 710 for a special "base type" property 712 belonging to the type object 702. The value segments 708, 710 store only the Object IDs of the base types; the global name of the base types are stored as values such as 706 in respective type objects similar to 702.

As mentioned above, CMNewValue( ) or CMUseValue( ) spawn dynamic values if the original type or any of its base types have an associated "use value" handler. Assume that was done for T in the above example. What happens is that CMNewValue( ) or CMUseValue( ) will look at its type object (t here) to see if the base type property is present. If it is, it will follow each type "down" to leaf types using a depth-first search.

In the example, layer1 will be visited, then layer2, and finally the original type T itself. If the layer1 type object had base types of its own, they would be visited before using layer1 itself. Hence the depth-first search down to the leaf types.

For each type processed, if it has a "use value" handler of its own, it will be called to get a refCon and value handler metahandler. These are passed to newDynamicValue( ) to create a dynamic value for the original "real" value. newDynamicvalue( ) always returns its refNum that will be the dynamic value it created. The first layer will create the dynamic value property and put the dynamic value header on its value header list. All further calls to newDynamicvalue( ) will pass the most recent refNum returned from it. newDynamicValue( ) then chains these off the first dynamic value header. This produces the desired layering result.

The following C-language code defines TOCValue, the format of one of the TOCValue data segments 426 (FIG. 4) or 512, 514, 516 (FIG. 5):

```
© 1992 Apple Computer, Inc.
union TOCValueBytes {                        /* Layout of value/length fields: */
    struct {                                 /* value if not immediate(not explicityly here): */
        CM_ULONG value;                      /* offset to value if not immediate */
        CM_ULONG valueLen;                   /* value length if not immediate */
    } notImm;
    struct {                                 /* value for a global name */
        CM_ULONG offset;                     /* offset to value in container */
        struct GlobalName *globalNameSymbol; /* ptr value for a global name (in memory) */
    } globalName;
    union {                                  /* actual value if immediate placed here: */
        CM_UCHAR ucharsValue[2*sizeof(CM_ULONG)];  /* value if immediate unsigned char(s) */
        CM_ULONG ulongValue;                 /* value if immediate unsigned long     */
        CM_USHORT ushortValue;               /* value if immediate unsigned short */
        CM_UCHAR  ubyteValue;                /* value if immediate unsigned byte */
        void *ptrValue;                      /* value if immediate pointer */
    } imm;
};
typedef union TOCValuesBytes TOCValueBytes, *TOCValueBytesPtr;
struct TOCValue {                            /* Layout of a TOC type's value: */
    ListLinks valueLinks;                    /* links to next/prev value (must be first) */
    struct TOCValueHdr *theValueHdr;         /* ptr back to ValueHdr "owning" this value */
    ContainerPtr container;                  /* ptr to "owning" container control block */
    CMValueFlags  flags;                     /* flags */
    TOCValueBytes value;                     /* value and length or immediate value */
    unsigned long logicalOffset;             /* original (unedited) logical offset */
};
typdef struct TOCValue TOCValue, *TOCValuePtr;
enum ConstValueType {                        /* Data types used to copy data into TOCValue's: */
    Value_NotImm,                            /* not immediate ==> value and valueLen */
    Value_GlobalName,                        /* global name ptr ==> in-memory str ptr    */
    Value_Imm_Chars,                         /* immediate, chars ==> ucharsValue */
    Value_Imm_Long,                          /* immediate, long ==> ulongValue */
    Value_Imm_Short,                         /* immediate, short ==> ushortValue */
    Value_Imm_Byte                           /* immediate, byte ==> ushortValue */
};
typedef enum ConstValueType ConstValueType;
```

The following C-language code defines the format of a Value Header (both real value headers and dynamic value headers).

```
© 1992 Apple Computer, Inc.
struct TOCValueHdr {                        /* Layout of a TOC property type: */
   ListLinks  valueHdrLinks;                /* links to next/prev value hdr (must be first) */
   struct TOCProperty *theProperty;         /* ptr to "owning" property         */
   ListHdr       valueList;                 /* list of actual values */
   CMObjectID    typeID;                    /* the value's type ID */
   ContainerPtr container;                  /* ptr to "owning" container control block */
   unsigned long size;                      /* total current size of the value data */
   unsigned long logicalSize;               /* original (unupdated) size of the value data */
   unsigned short valueFlags;               /* flags indicating stuff about the value */
   CMGeneration generation;                 /* generation number */
   unsigned long useCount;                  /* count of nbr of times "used" */
   CMRefCon valueRefCon;                    /* user's value refCon */
   TouchedListEntryPtr touch;               /* ptr to updating touched list entry */
   union {                                  /* this field depends on kind of value hdr: */
     struct TOCValueHdr *dynValue;          /* ptr to dynamic value hdr or NULL */
     struct DynValueHdrExt *extensions;     /* ptr to dynamic value hdr extensions */
   } dynValueData;                          /* [extensions only when it's a dynamic value]*/
   union {                                  /* references recorded by this value */
     TOCObjectPtr refDataObject;            /* associated ref object; NULL if no refs */
     ListHdrPtr refShadowList;              /* or shadow list of the actual data */
   } references;                            /* (refShadowList only in recording value) */
};
typedef struct TOCValueHdr TOCValueHdr, *TOCValueHdrPtr;
struct DynValueHdrExt {                     /* Extensions to TOCValueHdr for a dynamic value: */
   TOCValueHdrPtr   baseValue;              /* ptr to base value of this dynamic value */
   DynamicValueVector dynValueVector;       /* dynamic value handler vector */
   CMMetaHandler metaHandler;               /* metahandler to get handler addresses*/
}
typedef struct DynValueHdrExt DynValueHdrExt, *DynValueHdrExtPtr;
/* Some of following valueFlags echo the flags field a TOCValue entry. That is because a
CMValue "refNum" that an API user is given and in turn given back to us is a pointer to a
TOCValueHdr. It is sometimes more convenient therefore to check the kind of value we have
by looking at the header then "going out" to the value. In all but continued values there
is only one TOCValue entry on the valueList anyway. So echoing is more efficient than
always going after the tail or head (they're the of a valueList just to see the flags and
the kind of value. */
#define ValueDeleted 0x0001U       /* valueFlags: 1 ==> deleted value */
#define ValueContinued 0x0002U     /* ==> continued */
#define ValueGlobal   0x0004U      /* ==> global name */
#define ValueImmediate 0x0008U     /* ==> immediate value */
#define ValueOffPropChain 0x0800U  /* ==> dynamic value off prop chain */
#define ValueDynamic   0x1000U     /* ==> dynamic value */
#define ValueUndeletable 0x2000U   /* ==> can't be deleted */
#define ValueProtected 0x4000U     /* ==> locked/protected value */
#define ValueDefined   0x8000U     /* ==> fully defined (in read only) */
/* ValueUndeletable and ValueProtected are levels of protection bits. */
/* In order to make dealing with dynamic values easier, the following macros are provided.
IsDynamicValue(v) is a more self-documented test to see if a TOCValueHdr is indeed a
dynamic value, while DYNEXTENSIONS(v) allows simpler notational access to a dynamic value
header's extension fields. */
#define IsDynamicValue(v) ((((TOCValueHdrPtr)(v))—>valueFlags & ValueDynamic) != 0)
#define DYNEXTENSIONS(v)           /* to make access to extensions a "little" easier*/\
     (((TOCValueHdrPtr)(v))—>dynValueData.extensions)
/* The dynamic value vectors are defined as follows */
struct DynamicValueVectorEntries {  /* Layout of a dynamic value vector entry: /
   CMHandlerAddr handler;           /* the handler address */
   CMValue thisValue;               /* the handler's value (C++ "this") */
   Boolean active;                  /* true ==> handler is in calling chain */
};
typedef wstruct DynamicValueVectorEntries DynamicValueVectorEntries,
                *DynamicValueVectorEntriesPtr;
struct DynamicValueVector {
   DynamicValueVectorEntries cmGetValueSize;
   DynamicValueVectorEntries cmReadValueData;
   DynamicValueVectorEntries cmWriteValueData;
   DynamicValueVectorEntries cmInsertValueData;
   DynamicValueVectorEntries cmDeleteValueData;
   DynamicValueVectorEntries cmGetValueInfo;
   DynamicValueVectorEntries cmSetValueType;
   DynamicValueVectorEntries cmSetValueGen;
   DynamicValueVectorEntries cmReleaseValue;
};
typedef struct DynamicValueVector DynamicValueVector;
```

When a handler is called, it is expected to do its operations on the "base value" of the value passed to it. It gets its base value using CMGetBaseValue( ). However, we don't want to allow recursive use of the API for the same value. That would call the handler again and we would be in an infinite loop. Thus the active switch is provided to check for this so we can report an error.

The dynamic value vector is initialized with each handler address thisvalue set to NULL. On first use we use the metahandler which was returned from the "use value" handler (the metahandler address is saved in the value header extensions) to get the proper value handler address. It is saved in the handler field of the vector entry. Remember we may have to search up through a dynamic value chain to find an "inherited" value handler operation. Thus the handler used may correspond to a different dynamic value. We must therefore save the dynamic value refNum along with the handler address (in the thisvalue). It is similar to the C++ "this" pointer for the value handler operation).

Of course, in the simplest case, where the handler is provided for the original value, the thisvalue will point to its own dynamic value header. At the other extreme no handlers are supplied for the operation and we end up using the "real" value that spawned the dynamic value(s). In that case the handler pointer in the vector entry remains NULL and the thisvalue will be the "real" value refNum. With no handler we use the actual API routine to process the real value.

As with standard handlers, to simplify this description, some macros are defined for calling the dynamic value handlers. These macros will require the following typedefs as casts to convert the generic handler typedef, HandlerAddr (the type used to store the addresses in the vector), to the actual function type:

```
© 1992 Apple Computer, Inc.
CMSize (*TcmGetValueSize)(CMValue value);
typedef CMSize (*TcmReadValueData)(CMValue value, CMPtr buffer, CMCount offset, CMSize
       maxSize);
typedef void (*TcmWriteValueData)(CMValue value, CMPtr buffer, CMCount offset, CMSize
       size);
typedef void (*TcmInsertValueData)(CMValue value, CMPtr buffer, CMCount offset, CMSize
       size);
typedef void (*TcmDeleteValueData)(CMValue value, CMCount offset, CMSize size);
typedef void (*TcmGetValueInfo)(CMValue value, CMContainer *container, CMObject *object,
       CMProperty *property, CMType *type, CMGeneration *generation);
typedef void (*TcmSetValueType)(CMValue value, CMType type);
typedef void (*TcmSetValueGen)(CMValue value, CMGeneration generation);
typedef void (*TcmReleaseValue)(CMValue);
```

Here now are the macros used to do the calls using the vector.
©1992 Apple Computer, Inc.

```
#define CMDynGetValueSize(v)
(*(TcmGetValueSize)DYNEXTENSION(v)—>dynValueVector.cmGetValueSize.handler)((CMValue)(v))
#define CMDynReadValueData(v, b, x, m)
(*(TcmReadValueData)DYNEXTENSIONS(v)—>dynValueVector.cmReadValueData.handler)((CMValue)(v),
(CMPtr)(v), (CMCount)(x), (CMSize)(m))
#define CMDynWriteValueData(v, b, x, n)
(*(TcmWriteValueData)DYNEXTENSIONS(v)—>dynValueVector.cmWriteValueData.handler)((CMValue)(v),
(CMPtr)(v), (CMCount)(x), (CMSize)(n))
#define CMDynInsertValueData(v, b, x, n)
(*(TcmInsertValueData)DYNEXTENSIONS(v)—>dynValueVector.cmInsertValueData.handler)((CMValue)
(v), (CMPtr)(b), (CMCount)(x), (CMSize)(n))
#define CMDynDeleteValueData(v, x, n)
(*(TcmDeleteValueData)DYNEXTENSIONS(v)—>dynValueVector.cmDeleteValueData.handler)((CMValue)
(v), (CMCount)(x), (CMSize)(n))
#define CMDynGetValueInfo(v,c,obj,p,t, g)
(*(TcmGetValueInfo)DYNEXTENSIONS(v)—>dynValueVector.cmGetValueInfo.handler)((CMValue)(v),
(CMContainer*)(c), (CMObject*)(obj), (CMProperty*)(p), (CMType*)(t), (CMGeneration*)(g))
#define CMDynSetValueType(v, t)
(*(TcmSetValueType)DYNEXTENSIONS(v)—>dynValueVector.cmSetValueType.handler)((CMValue)(v),
(CMType)(t))
#define CMDynSetValueGen(v, g)
(*(TcmSetValueGen)DYNEXTENSIONS(v)—>dynValueVector.cmSetValueGen.handler)((CMValue)(v),
(CMGeneration)(g))
#define CMDynReleaseValue(v)
(*(TcmReleaseValue)DYNEXTENSIONS(v)—>dynValueVector.cmReleaseValue.handler)((CMValue)(v))
```

As mentioned earlier, each corresponding API value operation must check to see if it has a dynamic value and call the corresponding handler which does the operation. It must get the proper address on first use. It must set switches to mark the handler as active. It must also set a switch to allow CMGetBaseValue( ) calls which are only allowed from dynamic value handlers. Thus the algorithm for calling a value handler looks something like this (ignoring all errors for the moment):

```
© 1992 Apple Computer, Inc.
if (IsDynamicValue(v)) {
    v = GetDynHandlerAddress(v, h, g);
    if (IsDynamicValue(v)) {
        SignalDynHandlerInUse(v, h);
        AllowCMGetBaseValue(container);
            Call the proper dynamic value handler with one of the
            above macros definitions. The macro will pass the
            appropriate value corresponding to a possibly inherited
            handler. If the handler returns a value save it to be
            returned as the result.
        DisAllowCMGetBaseValue(container);
        SignalDynHandlerAvailable(v, h);
        return [result];
    }
}
```

In the above algorithm, v is a dynamic CMValue (note that GetDynHandlerAddress may CHANGE it); h is a pointer to a vector entry in the extensions; and g is the metahandlers operation type string.

The GetDynHandlerAddress( ) routine takes a vector entry and sets the handler address as a function of the "g" metahandler operation code. On first call it will search for inherited method if necessary. The vector is updated with the found handler address and the associated "this" value saved. This is the value returned and whose we set. We do the call and reset the switches, all using the same "this" value.

Note, in the limit, the search for the inherited handler may end up finding the original "real" value that spawned the dynamic values. Thus what is returned from GetDynHandlerAddress( ) in this case is a "real" value to be operated upon using the standard API routine itself. That is why a second IsDynamicvalue( ) must be done to bypass the handler call and switch setting/resetting. Since there is no guarantee the value coming back from the GetDynHandlerAddress( ) call is the one that went in, the code must reload any copies of the value sometime following the GetDynHandlerAddress( ) calls.

The following macros are defined. They basically mimic the above algorithm, but here take errors into account.
©1992 Apple Computer, Inc.
define GetDynHandLerAddress(v, h, g, s, x) if ((v= cmGetDynHandLerAddress((CMValue)(v), &DYNEXTENSIONS(v)-→dynVaLueVector.h, (CMGLobalName)(g), s))==NULL) return x
define SignalDynHandLerInUse(v, h) DYNEXTENSIONS (v)-→dynValueVector.h.active=true
define SignalDynHandlerAvailable(v, h) DYNEXTENSIONS(v)-→dynValueVector.h.active=false
define AlLowCMGetBaseValue(container) ++( (ContainerPtr)(container))-→getBaseValueOk
define DisAllowCMGetBaseVaLue(container) if (--( (ContainerPtr)(container))-→getBaseValueok<0) ((ContainerPtr)(container))-→getBaseValueok=0;

The IsDynamicvalue( ) call is defined above. The "h" in all these macros is the vector entry name, and the "x" parameter in GetDynHandlerAddress is used for error reporting. Also for GetDynHandlerAddress, the "s" is the name of the API routine doing the call. This is used by cmGetDynHandlerAddress( ) simply as an insert if it should report an error prior to returning NULL.

Note the AllowCMGetBaseValue and DisAllowCMGetBaseValue macros. As mentioned earlier, a CMGetBaseValue( ) is only allowed from value operation handlers. The two macros control a single switch, getBaseValueok, which the CMGetBaseValue( ) routine checks. The switch is actually a counter which, just to be safe, is never allowed to stay negative. 0 means CMGetBaseValue( ) is illegal. Greater than 0, it's legal. The reason the switch is a counter is because dynamic values use CMGetBaseValue( ) to do their operations in terms of their base values. If a dynamic value's base is also dynamic (i.e., we have layered dynamic values), then we have a nesting condition. Hence the counter.

C. Routines

The Application Program Interface includes a number of calls to Container Manager routines to perform session operations, container operations, type and property operations, object operations, value operations and reference operations. Only certain of the calls which are important for an understanding of the invention will be described herein.

1. Session Operations

CMHandlerAddr CMSetMetaHandler(const CMSession sessionData, const CMGlobalName typeName, CMMetaHandler metaHandler)

This routine records the association of Global Names with their metahandlers in metahandler table 404 (FIG. 4). The designated metahandler will be associated with the type-Name. The previous metahandler for this type name, if any, is returned. If there was no previous metahandler defined, NULL is returned. The association between handlers and type names is global within a session, rather than specific to a given container.

A metahandler will be called whenever the Container Manager or the application needs to find out how to perform a given operation on a container or value of this type. The metahandler can define specific handlers for any number of different operations, potentially with completely different interfaces. Metahandlers for values are required to support certain value operations, listed previously.

When called, a metahandler returns a procedure pointer to specific handlers that can carry out the desired operation. Typically, these procedure pointers will be cached and then used in the normal manner. Each metahandler may provide handlers for any number of operations, though it itself implements only the operation of obtaining and returning a requested handler pointer. A metahandler has the following prototype:
CMProcPtr CMMetaHandler(CMrype targetType, const CMGlobalName operationType);

This is the required prototype of any metahandler registered by the application using CMSetHandler( ). When a specific operation is required, the metahandler is called, and it must return a CMProcPtr for the operation, or return NULL to indicate that the operation is not available. Once retrieved, the CMProcPtrs may be cached indefinitely.

targetType is the refnum of the type to which the operation will be applied, and operationType is the name of the desired operation. targetType is required because in some cases the operation may be applied to values whose type has no global unique name.

This approach provides more flexibility than simply passing a vector of procPtrs, and allows each operation to have its own prototype for static type checking, which would be impossible if operations were indicated by passing a selector.

There are three varieties of metahandlers: session, container, and value, though this is not a fundamental distinction.

CMHandlerAddr CMGetMetaHandler(const CMSession sessionData, const CMGlobalName typeName)

This function searches the metaHandler symbol table 404 for the specified typeName and returns the associated metahandler address. If no metahandler is associated with that type name, it returns NULL.

CMHandlerAddr CMGetOperation(CMType targetType, const CMGlobalName operationType);

This routine takes a targetType which has a globally unique name and uses that name to find a metahandler. It then calls the metahandler to get the handler routine address for the specified operationType. The function returns the resulting address.

Metahandler proc addresses are given to the Container Manager by calls to CMSetMetaHandler. The global name for the input targetType is treated as the typeName to find the metahandler.

2. Container Operations

Containers (files and blocks of memory) are always accessed through handlers, to provide platform independence and support nested containers. Handlers are responsible for creating a container if necessary, opening and closing it, managing stream I/O to it, and reading and writing the container label (which provides such information as the location of the Table of Contents). The interfaces to container handlers are documented elsewhere herein.

The types of storage that can be used as containers are limited only by the types of handlers available.

CMContainer CMOpenContainer(CMSession sessionData, CMRefCon attributes, const CMGlobalName typeName, CMContainerUseMode useFlags);

This operation opens an existing Container Manager container. The attributes must designate management structures for the container storage. This attributes argument is not examined by the Container Manager, but is simply passed to the appropriate handler interfaces. It is intended to provide the information necessary for the handlers to locate a specific container. Thus attributes serves as a communication channel between the application and the Open handler. In its simplest form for a container file it would be a pathname. For an embedded container, it would be the parent value (CMValue), corresponding to the embedded container.

The typeName is used to find a metahandler defined for that same typeName. The metahandler, in turn, defines the handlers for the container and thus knows how to get at the physical container. These handers must understand the attributes provided.

The useFlags must be 0 or kCMReuseFreeSpace. 0 implies that the container is to be open for reading only. No writes may be done. If kCMReuseFreeSpace is specified, than both reading and writing may be done to update the container. Free space from deleted data will be reused and overwrites of existing data may be done to change it (subject to the container label flags, see below).

A container refnum is returned.

Note that an individual value can be opened as an embedded container. Through the attributes, the value is passed to the handlers. This value must be typed as an embedded container value. Embedded containers can have embedded containers which can also be opened and read. The effect is that a tree of nested containers can be opened and read without restriction. However, when a CMCloseContainer( ) is done on a parent container, all of its descendants will also be closed.

CMContainer CMOpenNewContainer(CMSession sessionData, CMRefCon attributes, const CMGlobalName typeName, CMContainerUseMode useFlags, CMGeneration generation, CMContainerFlags containerFlags, . . . );

This operation opens a new Container Manager container for writing. This is similar to opening for reading (see documentation above) except that here a new and empty container is opened. A minimum TOC is created along with the special TOC object 1 with its seed and offset properties.

The resulting container can be updated.

In addition to kCMReuseFreeSpace, the useFlags may be 0, kCMConverting, kCMUpdateByAppend, or kCMUpdateTarget.

"generation" is the generation number of the container; it must be $\geq 1$. If this container is a copy of a previous container, the generation number should be 1 greater than the generation number of the previous container.

"containerFlags" is the flag value that will be stored in the container label. No container flags are currently defined.

If the kCMConverting flag is set in CMContainerUseMode, the physical container is assumed to already contain a sequence of bytes that the caller wants to convert to container format. The application uses CMDefineValueData( ) to create values for objects in the bytes. All new stuff, including the TOC is written at the end of the existing stuff. The Container Manager will not modify the existing data.

If the kCMUpdateByAppend or kCMUpdateTarget flags are set, all updates to a "target" container are recorded in the container being opened. Future opens of this container, with CMOpenContainer( ) will apply the updates to the target to bring it "up-to-date" while it is open.

If kCMUpdateByAppend is specified, then the container is opened for update-by-append. All updates are appended to the existing container and an additional TOC is layered on to the end of the container when closed. Each time the container is opened and then closed for update-by-append, the new updates and a new TOC are appended. Whenever such a container is opened (in any mode), all the updates are applied appropriately to the original container.

Using kCMUpdateTarget is similar to kCMUpdateByAppend, but the updates are recorded in a new container.

In both cases the "target" container is specified in a type-dependent way, using the CMRefCon and the ". . . " parameters passed to CMOpenNewContainer( ). These parameters are interpreted in exactly the same way as the corresponding parameters of CMNewvalue( ); see the documentation of CMNewValue( ) for further details on the ". . . " parameters.

A container refnum is returned.

Just as in reading, any number of embedded containers can be opened. Also embedded containers can be opened within embedded containers to any depth. The effect is that a tree of nested containers can be opened and written without restriction. However, when a CMCloseContainer is done on a parent container, all of its descendants will also be closed.

It is an error to call CMOpenNewContainer with a value that belongs to a container that is not updatable, since that call would create an embedded container open for writing.

void CMGetContainerInfo(const CMContainer container, CMGeneration *generation, CMContainerFlags *containerFlags, CMGlobalName typeName);

The corresponding values for the designated container are returned. NULL may be passed for any reference; in that case the corresponding value is not returned.

CMSession CMGetSession(CMContainer container)

The session global data pointer returned from CMStartSession( ) is passed to most of the handler routines defined in this file. This routine is provided to make it easier to retrieve the pointer as a function of the container refNum.

VOID CMCloseContainer(CMContainer container);

If the container was open for writing, all I/O to the designated container is completed, and the table of contents and label are built and written out.

This call closes the specified container and all its currently opened embedded containers (if any).

This call destroys the association between the container refnum and the designated container. On return the specified container refNum and all the others corresponding to the embedded containers are invalid. All memory associated with a container's data structures is freed. After this call the container refNum may be returned by a subsequent CMOpenContainer call, designating another container.

VOID CMAbortContainer(CMconst_CMContainer container);

The container is closed without further writing to the container, i.e., as if it were opened for reading even when opened for writing. This is intended to be used to abort processing of the container from unrecoverable errors.

All memory allocated by the container data structures is freed (if possible) and the container close handler called to physically close the container. All dynamic values currently in use are released in an attempt to allow them to properly clean up any files and memory allocated by their handlers. No further API calls should be done on the container as it will be closed upon return.

Note, this routine will return to its caller. It is up to the user to actually abort execution if that is required.

C-language code to implement the above operations is set forth in Appendix A hereto.

3. Object Operations

CMObject CMNewObject(CMContainer targetcontainer);

A refnum to a new object in the designated container is returned. At this point the object has nothing but an identity.

CMObject CMGetNextObject(CMContainer targetcontainer, CMObject currobject);

A refnum for the next object defined in the same container is returned. currobject is generally a refNum previously returned from this routine. Successive calls to this routine will thus yield all the objects in the container.

Objects are returned in order of increasing ID. If there are no larger object IDs defined, NULL is returned. To begin the iteration, pass NULL as the object refnum.

Since type and property descriptions are objects, they will be returned in sequence as they are encountered. Only objects in the current container will be returned, not objects in any base containers.

CMProperty CMGetNextObjectProperty(CMObject theobject, CMProperty currProperty);

A refnum for the next property defined for this object is returned. currProperty is generally a refNum previously returned from this routine. Successive calls to this routine will thus yield all the properties for the given object.

This routine returns the refNum for the next property defined for the given object. If there are no more properties defined for this object, NULL is returned. If currproperty is NULL, the refNum for the first property for the object is returned.

CMGlobalName CMGetGlobalName(CMObject theObject);

The name of the designated object is returned. This operation is typically used on types and properties, but it can be applied to any object with a Globally Unique Name property. NULL is returned if the object does not have a Globally Unique Name.

5. Type and Property Operations

All types and properties must be registered before they can be used. The operations behave the same on standard types and properties as on normal types and properties. However, standard types and properties will not actually be given TOC entries for their descriptions just because they are registered. If additional, non-standard properties are added to the description of a standard type or property, they will be stored.

The refnum returned from registration can be used in exactly the same manner as an object refnum in the object and value operations.

Types and properties may be registered more than once; the refnum returned from all the different registrations of the same type is the same. Identity of types is defined by string equality of their names.

CMType CMRegisterType(CMContainer targetcontainer, const CMGlobalName name);

The designated type is registered in the designated container, and a refnum for it is returned. If a type with that name already exists, the refNum for it is returned. Standard types may be registered, but this is not required.

CMProperty CMRegisterProperty(CMContainer targetcontainer, const CMGlobalName name);

The designated property is registered in the designated container, and a refnum for it is returned. If a property with that name already exists, the refNum for it is returned. Standard properties may be registered, but this is not required.

CMBoolean CMIsType(CMObject theobject);
CMBoolean CMIsProperty(CMObject theobject);

These operations test the designated object and return non-zero if it is a type description or a property description, respectively, otherwise 0.

CMType CMGetNextType(CMContainer targetcontainer, CMType currType);

A refnum for the next type registered in the same container is returned. currType is generally a refNum previously returned from this routine. Successive calls to this routine will thus yield all the type descriptions in the container.

Types are returned in order of increasing ID. If there are no larger type IDs registered, NULL is returned. To begin the iteration, pass NULL as the type refnum.

CMProperty CMGetNextProperty(CMContainer targetContainer, CMProperty currProperty);

A refnum for the next property registered in the same container is returned. currproperty is generally a refNum previously returned from this routine. Successive calls to this routine will thus yield all the property descriptions in the container.

Properties are returned in order of increasing ID. If there are no larger property IDs registered, NULL is returned. To begin the iteration, pass NULL as the property refnum.

CMCount CMAdQBaseType(CMrype type, CMType baseType);

This routine defines base types for a given type so that layered dynamic values can be created. Base types essentially provide type inheritance. As previously described, the type trees created by CMAddBaseType( ) are stored in "type objects".

A base type is added to the specified type. For each call to CMAddBaseType( ) for the type a new base type is recorded. They are recorded in the order of the calls. The total number of base types recorded for the type is returned. In the embodiment described herein, it is an error to attempt to add the same base type more than once to the type.

CMCount CMRemoveBaseType(CMrype type, CMye baseType);

The specified base type previously added to the specified type by CMAddBaseType( ) is removed. If NULL is specified as the baseType, all base types are removed. The number of base types remaining for the type is returned.

4. Value Operations

All the I/O calls in the present embodiment do I/O to or from a buffer provided by the application.

CMVaLue CMUseValue(CMObject object, CMProperty property, CMType type);

This routine is used to get the refNum for the value of an object's property of the given type. NULL is returned if the value does not exist, or if or the object does not contain the property. If the type of the value corresponds to a global type name that has an associated "use value" handler, or if its base types (if any) have associated "use value" handlers, a dynamic value will be created and the refnum returned will refer to a dynamic value rather than the base value. (Normally, an application will never be aware of this difference.)

Note, if the value is used as an embedded container, then that embedded container must be opened and read using CMOpenContainer( ). The data, i.e, the embedded container for such a value can only be defined by using CMOpenNewContainer( ). The container type name must be associated with a special set of handlers that define a "return parent value" handler. This handler returns the parent value refNum whose data contains the embedded container.

There is no restriction on reading the data for an embedded container like any other value data using CMReadValueData( ). However, the data for an embedded container value includes a TOC. Unless a "blind" copy is being done, the TOC read this way is of not very much use.

The following C-language code implements the CMUseValue( ) routine.

```
© 1992 Apple Computer, Inc.
CMValue CM_FIXEDARGS CMUseValue(CMObject object, CMProperty property, CMType type)
{
                TOCPropertyPtr theProperty;
                TOCValueHdrPtr theValueHdr, baseValueHdr;
                ContainerPtr   container;
                ExitIfBadObject(object, NULL);      /* validate object */
                ExitIfBadProperty(property, NULL);  /* validate property */
                ExitIfBadType(type, NULL);          /* validate type */
                container = ((TOCObjectPtr)object)—>container;
                if (container—>targetContainer ! =
                        ((TOCObjectPtr)property)—>container—>targetContainer ||
                        container—>targetContainer ! =
                        ((TOCObjectPtr)type)—>container—>targetContainer) {
                        ERROR3(CM_err_3Containers, CONTAINERNAMEx(container),
                                CONTAINERNAMEx(((TOCOjbectPtr)property)—>container),
                                CONTAINERNAMEx(((TOCObjectPtr)type)—>container));
                        return (NULL);
                }
                /* Find the TOCProperty belonging to the object with the property ID of the
                specified property object */
                theProperty = cmGetObjectProperty((TOCObjectPtr)object,
                        ((TOCObjectPtr)property)—>objectID);
                if (theProperty == NULL)            /* if property not in object . . . */
                        return (NULL);              /* . . . tell user about it */
                /* If the resulting value is a dynamic value, just return it. If it isn't, this
                might be the first use of the value. In that case we must check to see if a
                dynamic value must be created. This is done by calling cmFollowBaseTypes( ) to do
                a depth-first search starting from the given type on all of that type's base
                types. Dynamic values are created for each type that has a "use value" handler
                ("new value" handlers are only required for CMNewValue( )). The resulting dynamic
                value is returned or the "real" value if there are no dynamic values. */
                theValueHdr = (TOCValueHdrPtr)cmGetPropertyType(theProperty,
                        ((TOCObjectPtr)type)—>objectID);
                if (theValueHdr) {        /* if we have a value header . . . */
                        if (theValueHdr—>dynValueData.dynValue != NULL){ /* . . . if dynamic value
                                                                exists . . . */
                                theValueHdr = theValueHdr—>dynValueData.dynValue; /* . . . just use it,
                                        but . . . */
                                ++theValueHdr—>useCount; /* . . . count dynamic value uses*/
                        } else {          /* . . . if no dynamic value yet . . . */
                                baseValueHdr = theValueHdr;
                                theValueHdr = cmFollowTypes(theValueHdr, (TOCObjectPtr)type, false,
                                        NULL);
                                ++baseValueHdr—>useCount; /* incr use count on base value */
                        }
                }
}
```

The cmFollowTypes( ) routine referred to in the above code creates a dynamic value layers for the passed type and all of its base types, if any of these types have a "use value" handler. This routine is only called by CMNewValue( ) or CMUseValue( ). For CMNewValue( ), "metadata" handler and "new value" handlers are also required. The top-most dynamic value header pointer is returned, and is in turn returned from CMUseValue( ) or CMNewValue( ). NULL is returned if an error is reported. The original "real" value is returned if no dynamic values are created.

For CMUseValue( ), the isNewValue parameter should be set to false. It should only be set to true for CMNewValue( ). Also for CMNewValue( ), the constructorData must point at the CMNewValue( ) ". . . " parameters. These are consumed as the base type metadata (returned from the "metadata" handler) describes how to create data packets from the ". . . " parameters. The packets, in turn, are passed to the "new value" handlers. A "new value" handler uses its data packet to write (possibly different) data to its base value. This written data will then be read and used by the "use value" handler.

The "use value" handler is called for both the CMUseValue( ) and CMNewValue( ) cases. If it's companion "new value" handler wrote data to its base value, the "use value" handler will probably read the data to create its refcon. The refCon will be passed to all value handlers. The "use value" handler returns its refCon along with another metahandler address that is used to get the value handler addresses. These are then used to create the dynamic value.

To produce all the required dynamic values, cmFollowTypes( ) recursively follows the types, looking for base types as defined by CMAddBaseType( ). Each type can have any number of base types. The recursion effectively produces a depth-first search of all the base types.

As each type is completed (i.e., no more base types for it), a dynamic value is created as described above. That is, for CMNewValue( ), a type's "metadata" handler instructs us on how many CMNewValue( ) ". . . " parameters to consume and how to construct their packet. That is passed to the "new value" handler so it can write some appropriate data to the base value. The "use value" is called in all cases which reads the data written by "new value" to construct its refCon. The refCon is returned here along with the metahandler address that will yield the value handler routine addresses.

The refcon and metahandler address are passed to newDynamicValue( ) to construct one dynamic value (layer). The resulting dynamic value is used as the base value for the next layer. This produces the desired data structures.

Note, because this routine searches through the types down to their leaves, and then generates the dynamic values on the way back "up", the CMNewValue( ) ". . . " parameters must be ordered for the "deepest" type first. For example, given a type tree in which T1 has base types T2 and T3, and T3 has base types T4 and T5 (read as T1 inherits from T2 and T3, and T3 inherits from T4 and T5, the depth-first search, starting at T1, yields the sequence: T2 T4 T5 T3 T1. Then this is the order the CMNewValue( ) ". . . " parameters must be in.

The following C-language code implements cmFollowTypes( ):

```
© 1992 Apple Computer, Inc.
TOCValueHdrPtr cmFollowTypes(TOCValueHdrPtr vaseValueHdr, TOCObjectPtr type,
            Boolean isNewValue, va_list *constructorData)
{
    ContainerPtr    container = baseValueHdr—>container;
    TOCObjectPtr    baseType;
    TOCPropertyPtr  baseTypeProperty;
    TOCValueHdrPtr  theValueHdr, baseValueHdr0;
    TOCValuePtr     theValue;
    CMHandlerAddr   useValueHandler, newValueHandler, metaDataHandler;
    unsigned char   *dataPacket;
    char            *newOrUseValueName, *metaData, *typeName;
    CMRefCon        refCon;
    CMMetaHandler   metaHandler;
    CMBoolean       success;
    /* If any errors are reported, and the error handler returns, we NULL out the base     */
    /* value. That essentially "puts the breaks" on the dynamic value generation. The      */
    /* NULL result will work ist way back to CMNewValue( ) or CMUseValue( ) which it will  */
    /* return.                                                                             */
    /* Note, as soon as we detect an error in here, we free all the dynamic values we      */
    /* created for the "real" value. That should put things back the way they were         */
    /* originally. Of course, error reporters are not suppose to return. We're being       */
    /* "kind" here just in case they do.                                                   */
    if (baseValueHdr == NULL) return (NULL);
    baseValueHdr0 = baseValueHdr;       /* save current baseValueHdr for errors            */
    /* If the current type has any base types, call cmFollowTypes( ) recursively for each  */
    /* of those base types. That brings us back to here where we will check each of        */
    /* those base types for base types of their own. This process continues down to the    */
    /* "bottom", i.e., leaf types, where we bypass this piece of code. The types are then  */
    /* processed as the recursion unwinds. It is this code, then the effects the depth-    */
    /* first processing of the base types.                                                 */
    baseTypeProperty = cmGetObjectProperty(type, CM_StdObjID_BaseTypes);
    if (baseTypeProperty != NULL) { /* process this type's base types                      */
        theValueHdr = TOCValueHdrPtr)cmGetListHead(&baseTypeProperty—>valueHdrList);
        if (theValueHdr != NULL) {      /* double check for value hdr                      */
            theValue = (TOCValuePtr)cmGetListHead(&theValueHdr—>valueList); /* 1st base ID */
            while (theValue != NULL) {
                baseType = cmFindObject(container—>toc, theValue—>value.imm.ulongValue);
                if (baseType) {
                    baseValueHdr = cmFollowTypes(baseValueHdr, baseType, isNewValue,
                            constructorData);
                    if (baseValueHdr == NULL) return (NULL);
                }
                theValue = (TOCValuePtr)cmGetNextListCell(theValue); /* look at next base type */
            } /* while */
        } /* theValueHdr */
    } /* baseTypeProperty */
    /* We are now at a type which has either has no base types or that had all of its base */
    /* types processed (again through here). This is where we determine whether the type   */
    /* will spawn a dynamic value. We call hasUseValueHandler( ) that checks for the       */
    /* the "use value" handler for the type. It also checks for the "metadata" and "new    */
    /* value" handlers if we were originally called from CMNewValue( ). If it doesn't pass */
```

-continued

```
/* the tests we return the original base value unchanged. If it does pass the tests,    */
/* we create a new dynamic value (layer).                                                */
/* As described in the documentation at front of this file, we call the "metadata" and   */
/* "new value" handlers first only for CMNewValue( ). For CMNewValue( ) or CMUseValue( ) */
/* we then call the "use value handler. For the "new value" call we must first build     */
/* the data packet from the CMNewValue( ) ". . ." parameters using the metadata returned */
/* from the "metadata" handler. The packet is sent to the "new value" handler. There     */
/* it can use CMScanDataPacket( ) to extract the packet back into variables.             */
/* Note, as the packets for the layers are created, the constructorData parameter        */
/* pointer marches across the CMNewValue( ) ". . ." parameters. Since we are building    */
/* the layers as we move up the inheritance hierarchy, from bottom to top, that is       */
/* what determines the parameter specifications discussed above. Further, it is also     */
/* why the constructorData is a va_list*. The higher layers must know what the           */
/* current parameter pointer is. If we had built the hierarchy from top to bottom we     */
/* wouldn't have needed the "*".                                                         */
/* And speaking of layers—the newDynamicValue( ) call is the one responsible for         */
/* creating a layer. It builds upon the current baseValueHdr and returns a new one.      */
/* they are passed up the recursive calls as the function result to build the layer      */
/* chain. The final, top-most layer, is the one eventually returned to CMNewValue( )     */
/* or CMUseValue( ), who then returns it to the user.                                    */
useValueHandler = hasUseValueHandler(baseValueHdr, type, isNewValue ?
        &newValueHandler : NULL, &metaDataHandler);
if (!SessionSuccess) return (NULL);
if (useValueHandler) {    /* if dynamic value layer is to be created                     */
    if (isNewValue) {     /* extra stuff for CMNewValue( ) . . .                         */
        /* Here we're doing a CMNewValue( )—call the "metadata" handler to get this      */
        /* type's metadata. We can then use that to build a data packet.                 */
        metaData = (*(char *(*)(CMType))metaDataHandler)((CMType)type);
        dataPacket = createDataPacket(type,metaData,constructorData); /*create data pkt . . . */
        if (!SessionSuccess) {                                 /* . . . if it failed . . .    */
            cmpDeleteAllDynamicValueLayers(baseValueHdr0,isNewValue);/* . . . delete all layers */
            return (NULL);                                     /* . . . abort creation        */
        }
        /* Call the "new value" handler. It should use the data packet to write data to  */
        /* its base value. */
        success = (*(CMBoolean (*)(CMValue, CMType, CMDataPacket))newValueHandler)
            ((CMValue)baseValueHdr, (CMType)type, (CMDataPacket)dataPacket);
        if (dataPacket != NULL) CMfree(dataPacket);     /* free the packet               */
        newOrUseValueName = "CMNewValue";
    } else {
        newOrUseValueName = "CMUseValue";
        success = true;
    }
    /* In all cases we call the "use value" handler. It should read the data written by  */
    /* the "new value" handler to create its refCon. It returns the refCon and a         */
    /* methandler pointer that we will use to get the value operation handler addresses. */
    /* This is then passed to newDynamicValue( ) to build the new dynamic value (layer). */
    if (success) {
        metaHandler = NULL; /* "use value" must set this or error                         */
        success = (*(CMBoolean (*)(CMValue, CMType, CMMetaHandler*,
            CMRefCon*))useValueHandler)((CMValue)baseValueHdr, (CMType)type,
                &metaHandler, &refCon);
        if (success) {
            if (metaHandler == NULL) {         /* we must get a methandler back!          */
                typeName = cmIsGlobalNameObject(type, CM_StdObjID_GlobalTypeName);
                ERROR2(CM_err_NoDynMetahandler, typeName, CONTAINERNAME);
                success = false;
            } else
                baseValueHdr = newDynamicValue(baseValueHdr, type, metaHandler,
                    refCon, newOrUseValueName);
        }
    }
    If (!success || baseValueHdr == NULL) { /* if something went wrong . . .              */
        cmDeleteAllDynamicValueLayers(baseValueHdr0, isNewValue); /* . . . free the layers */
        baseValueHdr = NULL; /* this will abort the recursion                             */
    }
}
return (baseValueHdr); /* return dynamic value layer                                      */
}
```

The newDynamicValue routine referred to above is called only by cmFollowTypes( ) to do the actual construction of the dynamic value for the specified base value. The type is the type that is causing this dynamic value to be created. If the base value is a "real" value, then the dynamic value is added to a "dynamic values" property for the object who owns the value. The "dynamic value"s property is created for the first dynamic value for that object. All further dynamic values with "real" value bases are simply added as values (headers) to that property. If the base value is itself a dynamic value, then the newly created dynamic value is chained to the base (dynamic) value. It is only a backward link from the new dynamic value.

The pointer to the new dynamic value is returned. NULL is returned if any errors are reported. Note, the newOrUseValueName parameter is the string "CMNewValue" or "CMUseValue" and only used for some of the error inserts.

By passing the returned dynamic value pointer as the base value to succeeding newDynamicValue( ) calls, layers of dynamic values are constructed.

The following C-language code implements newDynamicvalue( ).

```
© 1992 Apple Computer, Inc.
static TOCValueHdrPtr CM_NEAR newDynamicValue(TOCValueHdrPtr baseValueHdr,
         TOCObjectPtr type, CMMetaHandler metaHandler, CMRefCon refCon,
         char *newOrUseValueName)
{
    ContainerPtr         container = baseValueHdr—>container;
    TOCObjectPtr         theObject;
    TOCValueHdrPtr       theDynamicValueHdr, theRealValueHdr;
    DynValueHdrExtPtr    extensions;
    Boolean              firstDynamicValue;
    char                 *typeName;
    if (metaHandler == NULL) {                           /* we must have a metahandler!    */
        typeName = cmIsGlobalNameObject(type, CM_StdObjID_GlobalTypeName);
        ERROR2(CM_err_NoMetahandler, typeName, CONTAINERNAME);
        return (NULL);
    }
    /* It is an error for layered dynamic values to pass as the base value any other      */
    /* value header other than the most recent. The code near the end of this routine     */
    /* chains layered dynamic values together with each value pointing back to its base.  */
    /* The original "real" value gets a pointer to the last one (in the dynValue union    */
    /* field of the value header). So by searching back up the chain to the "real" value  */
    /* we can get at this pointer to see if the base value passed is equal to it and      */
    /* report an error if it is not. Of course, the first time the "real" value is passed */
    /* and the dynValue will be NULL. So we will know this case too.                      */
    theRealValueHdr = baseValueHdr;                      /* start with the current base    */
    while (IsDynamicValue(theRealValueHdr))              /* loop back till we find 1st value */
        theRealValueHdr = DYNEXTENSIONS(theRealValueHdr)—>baseValue;/*that not dynamic value */
    firstDynamicValue = (Boolean)(theRealValueHdr—>dynValueData.dynValue == NULL);
    if (!firstDynamicValue &&                            /* do the base check . . .        */
            theRealValueHdr—>dynValueData.dynValue != baseValueHdr) {
        ERROR2(CM_err_BadRealValue, newOrUseValueName, CONTAINERNAME);   /* . . . oops! */
        return (NULL);
    }
    /* Create the dynamic value, i.e., a value (header) that is belongs to a special      */
    /* property of the caller's object that owns the base value. The object "owning" the  */
    /* dynamic value is flagged to indicate there are dynamic values present in that      */
    /* object. This protects it from premature deletion. The flag is cleared when the     */
    /* last dynamic value for for the object is released. We don't use the "protected"    */
    /* flag, which is used for similar purposes, just to be general. Maybe we could       */
    /* someday have a protected object with dynamic values!                               */
    /* Note, the type we give the dynamic value is that of the type that caused this      */
    /* dynamic value to be generated. We never use that fact. But we got to give it       */
    /* something and it could aid in debugging this turkey! Do you really think I am      */
    /* going to get all this right the first time? Want to buy a bridge?                  */
    theObject = cmDefineObject(container, baseValueHdr—>theProperty—>theObject—>objectID,
                    CM_StdObjID_DynamicValues
                    0, /* 0 stops dup checks, was "type—>objectID"                         */
                    NULL, container—>generation, kCMDynValue,
                    ObjectObject, &theDynamicValueHdr);
    if (theObject == NULL) return (NULL);
    theDynamicValueHdr—>typeID = type—>objectID;         /* give the type ID something valid */
    theObject—>objectFlags |= DynamicValuesObject;       /* make sure object is flagged      */
    /* The dynValueData field in the value header is a union with two alternatives. The   */
    /* "dynValue" alternative is a pointer from the base value header to its dynamic      */
    /* value. The "extensions" alternative is for the dynamic value header itself and     */
    /* points to the additional information, i.e., extensions, needed to accompany a      */
    /* dynamic value header. A cmDefineObject( ) call always initializes the union field  */
    /* to NULL on the assumption a "normal" value header is being created. Only in here   */
    /* do we create dynamic value headers. Thus only in here do we fill in these fields.  */
    /* We just got done creating the dynamic value header. So the first thing to do is    */
    /* to allocate its extensions data. So here goes . . .                                */
    if ((extensions = (DynValueHdrExtPtr)CMmalloc(sizeof(DynValueHdrExt))) == NULL) {
        typeName = cmIsGlobalNameObject(type, CM_StdObjID_GlobalTypeName);
        ERROR2(CM_err_NoDynExtensions, typeName, CONTAINERNAME);
        return (NULL);
    }
    /* Point the extensions union alternative at the extensions space we just allocated.  */
    /* Also, while we're screwing around in the dynamic value save the refCon passed in.  */
    /* The valueRefCon field is convenient so that CMGetValueRefCon( ) will be able to be  */
    /* used by the dynamic value handlers just as it would with normal values.            */
```

-continued

```
DYNEXTENSIONS(theDynamicValueHdr)    = extensions;   /* point at the extensions data      */
theDynamicValueHdr—>valueRefCon       = refCon;      /* remember the refCon               */
theDynamicValueHdr—>useCount          = 1;           /* set use count to 1st use          */
/* We now must init the extensions fields. Among the fields are the dynamic value         */
/* handler pointer vector (our "v-table"). It consists of the pointers to the             */
/* corresponding value operation handler, a "protect-from-recursvie-use" flag, and        */
/* the value "this" pointer. We init all this stuff to NULL and "not called". The         */
/* metahandler passed to this routine will be used to fill in the handler pointers on     */
/* first use (see cmGetDynHandlerAddress( )). It will set the "this" pointer too.         */
/* To make it easier to init in the vector, the following macro is used:                  */
#define initDynVector(h)  extensions—>dynValueVector.h.handler   = NULL; \
                          extensions—>dynValueVector.h.thisValue = NULL; \
                          extensions—>dynValueVector.h.active    = false;
InitDynVector(cmGetValueSize);                       /* prepare handler vector . . .      */
InitDynVector(cmReadValueData);
InitDynVector(cmWriteValueData);
InitDynVector(cmInsertValueData);
InitDynVector(cmDeleteValueData);
InitDynVector(cmGetValueInfo);
InitDynVector(cmSetValueType);
InitDynVector(cmSetValueGen):
InitDynVector(cmReleaseValue);
extensions—>metaHandler = metaHandler;               /* remember metahandler address      */
extensions—>baseValue   = baseValueHdr;              /* point dyn value hdr to its base   */
/* For layering dynamic values, a backward chain of dynamic value headers is formed       */
/* from the new dynamic value header back to the original "real" value header. The        */
/* link is the baseValue extensions field set above. It always points to its base         */
/* value (it is also used by CMGetBaseValue( )). As mentioned above, the dynValue         */
/* union alternative in a "real" value header always points to the last dynamic           */
/* value of the chain. A CMUseValue( ) or CMNewValue( ) will always return the pointer    */
/* to the dynamic value at the end of the chain. So, we always want to set the            */
/* dynValue pointer to the new dynamic value header we created above. Note also we        */
/* use this pointer to make sure the value passed as a base to us here is indeed the      */
/* pointer to the end of the chain. We did this check near the start of this routine.     */
/* From that check we get the pointer to the original "real" value. So now we can         */
/* set that pointer to the new end of chain.                                              */
theRealValueHdr—>dynValueData.dynValue = theDynamicValueHdr;
/* Layered dynamic values, i.e., dynamic values that have a dynamic value base are        */
/* NOT treated as distinct values for special property whose chain we put them on when    */
/* we did the cmDefineObject( ) above. This means we must take such a value OFF the       */
/* special property chain. It's not getting lost through. Remember we just got done       */
/* pointing the "real" value dynValue at it. Note, we flag this value header as           */
/* being off the chain. This makes it a simple test later when we want to delete          */
/* these puppies off the layering chain (done by CMReleaseValue( )).                      */
if (!firstDynamicValue) {                            /* do only if not the first time     */
    cmDeleteListCell(&theDynamicValueHdr—>theProperty—>valueHdrList, theDynamicValueHdr);
    cmNullListLinks(theDynamicValueHdr);
    theDynamicValueHdr—>valueFlags |= ValueOffPropChain; /* mark as off the prop. chain   */
} else                                               /* if we have a NEW dynamic value . . . */
    ++container—>targetContainer—>nbrOfDynValues;    /* . . . keep count in targetContainer */
return (theDynamicValueHdr);                         /* give caller the dynamic value     */
}
```

Returning to the API calls, CMGetNextValue( ) is defined next:

CMValue CMGetNextValue(CMobject object, CMProperty property, CMValue currvalue);

This routine returns the refNum for the next value (according to the current value order) in the objects property following currValue. If currvalue is NULL, the refNum for the first value for that object's property is returned. If currvalue is not NULL, the next value for that object's property is returned. NULL is returned if there are no more type values following currvalue or the object does not contain the property.

currvalue is generally a refNum previously returned from this routine. Successive calls to this routine will thus yield all the values for the specified property of the specified object as long as no other operations change the value order.

CMValue CMNewValue(CMObject object, CMProperty property, cMTe type, . . . );

A new entry is created for the designated object, with the designated property and type and a refnum to the entry is returned. The generation number of the value defaults to the generation number of the container, but it may be set with CMSetValueGeneration.

An object's properties can have more than one value. However, the all the types for the values belonging to a given object property must be unique. It is an error to attempt to create a value for a property when there is already a value of the same type for that property.

If the specified type corresponds to a global type name that has an associated "use value" handler, or if its base types (if any) have associated "use value" handlers, a dynamic value will be created and returned. The value will be initialized using the dataInitParams arguments, which must correspond to the initialization arguments for a value of that type.

Note that the value refnum at this point has no associated data. The value data is set with CMWriteValueData or CMOpenNewContainer (to write an embedded container). If the value will be used as an embedded container it must have the embedded container type. Using CMWriteValueData on a value of this type is an error.

The value is created at an unspecified location in the sequence of values for the specified property. Creating a new value may cause the order of the values for that property to change.

The CMNewValue( ) routine is implemented merely as a wrap around the CMVNewValue( ) routine, described below. The CMNewValue( ) routine merely does what a user would do to use CMVNewValue( ):

```
CMValue CM_VARARGS CMNewValue(CMObject object, CMProperty property, CMType type, . . . )
{
        CMValue value;
        va_list dataInitParams;
        va_start(dataInitParams, type);    /* get ptr to the ". . ." parameters */
        value = CMVNewValue(object, property, type, dataInitParams);
        va_end(dataInitParams);
        return (value);
}
```

CMVNewValue( ) does the same as CMNewValue( ) above, except that the dynamic value data initialization (i.e., ". . .") parameters are given as a variable argument list as defined by the "stdarg" facility. It assumes that the caller has set up and terminated the variable arg list in the manner shown above for CMNewValue( ). CMVNewValue( ) is implemented as follows:

```
© 1992 Apple Computer, Inc.
CMValue CM_FIXEDARGS CMVNewValue(CMObject object, CMProperty property, CMType type,
                                                va_list dataInitParams)
{
        TOCObjectPtr    theObject;
        TOCValueHdrPtr theValueHdr, baseValueHdr;
        ContainerPtr    container;
        ExitIfBadObject(object, NULL);                  /* validate object */
        ExitIfBadProperty(property, NULL);              /* validate property */
        ExitIfBadType(type, NULL);                      /* validate type */
        container = ((TOCObjectPtr)object)—>container;
        if (container—>targetContainer !=
                ((TOCObjectPtr)property)—>container—>targetContainer ||
                container—>targetContainer !=
                ((TOCObjectPtr)type)—>container—>targetContainer) {
                ERROR3(CM_err_3Containers, CONTAINERNAMEx(container),
                        CONTAINERNAMEx(((TOCObjectPtr)property)—>container),
                        CONTAINERNAMEx(((TOCObjectPtr)type)—>container));
                return (NULL);
        }
        container = container—>updatingContainer; /* use updating container from here on
                */
        /* This will create a value header for an existing object or a new object with a
        value header but no value. Other "CM . . ." calls will create the actual value(s).
        */
        theObject = cmDefineObject(container, ((TOCObjectPtr) object)—>objectID,
                ((TOCObjectPtr)property)—>objectID, ((TOCObjectPtr)type)—>objectID, NULL,
                container—>generation, 0, ObjectObject, &theValueHdr);
        if (theObject == NULL) return (NULL);
        /* Check to see if a dynamic value must be created. This is done by calling
        cmFollowBaseTypes( ) to do a depth-first search starting from the given type on
        all of that type's base types. Dynamic values are created for each type that has
        a "use value" and "new value" handler. The resulting dynamic value is returned
        or the "real" value we created above if there are no dynamic values. */
        baseValueHdr = theValueHdr;
        theValueHdr = cmFollowTypes(theValueHdr, (TOCObjectPtr)type, true,
                &dataInitParams);
        baseValueHdr—>useCount = 1; /* set use count of "real" value */
        return ((CMValue)theValueHdr);        /* return real or dynamic value*/
}
```

The cmDefineObject( ) routine, used in the above code, is called to define a new TOC entry for an object. We may have either a new object (id) or a preexisting one for which a new property and value are to be defined. All the fields for a TOC entry are passed. The objectFlags indicate the type of the object.

Note, the value associated with the property is appended to the end of the property's value list. The caller has the option of getting the pointer to the value header (theValueHdr) when theValueHdr is not passed as NULL.

The format of the cmDefineObject( ) function call is:

TOCObjectPtr cniefineObJect(ContainerPtr container, unsigned Long objectID, const unsigned Long propertyID, const unsigned Long typeID, TOCValueBytesPtr value, const unsigned long generation, const unsigned short flags, const unsigned short objectFlags, TOCValueHdrPtr *theValueHdr);

The function returns a pointer to the object if it was successfully created and NULL if it wasn't. An error is reported if NULL is returned.

The objectFlags determine how the function treats the object and all the object fields (the other parameters). There are four possible objectFlags:

(1). UndefinedObject. Set if the object is to be created, but we don't yet know what its TOC entries are. Basically a null object (or placeholder) is created. It is an incomplete object in that there are no properties or types chained to the object (yet). This flag may be used in combination with the others if we know that the object ID corresponds to a property, type, or neither.

(2). ObjectObject. This flags is used when we don't know the type of the object but we know a property and type for it. If the object already exists and it's undefined (UndefinedObject) it is now considered as defined. If it was an undefined property or type, it now becomes a defined property or type. Of course, duplicate definitions are an error.

(3). PropertyObject. This is similar to ObjectObject, but here we know the object is for a property. It has to either not exist previously, or was previously flagged as UndefinedObject and PropertyObject.

(4). TypeObject. Same as PropertyObject, but for type objects.

Returning again to the Value Operations, value data can be read using the following API call:
CMSize CMReadValueData(CMValue value, CMPtr buffer, CMCount offset, CMsize maxSize);

The data, starting at the offset, for the value is read into the buffer. The size of the data read is returned. Up to maxsize characters will be read (can be 0).

The data is read starting at the offset, up to the end of the data, or maxSize characters, whichever comes first. Offsets are relative to 0. If the starting offset is greater than or equal to the current data size, no data is read and 0 returned.

It is an error to attempt to read a value which has no data, i.e., a value where only a CMNewValue has been done.

Figure 8:
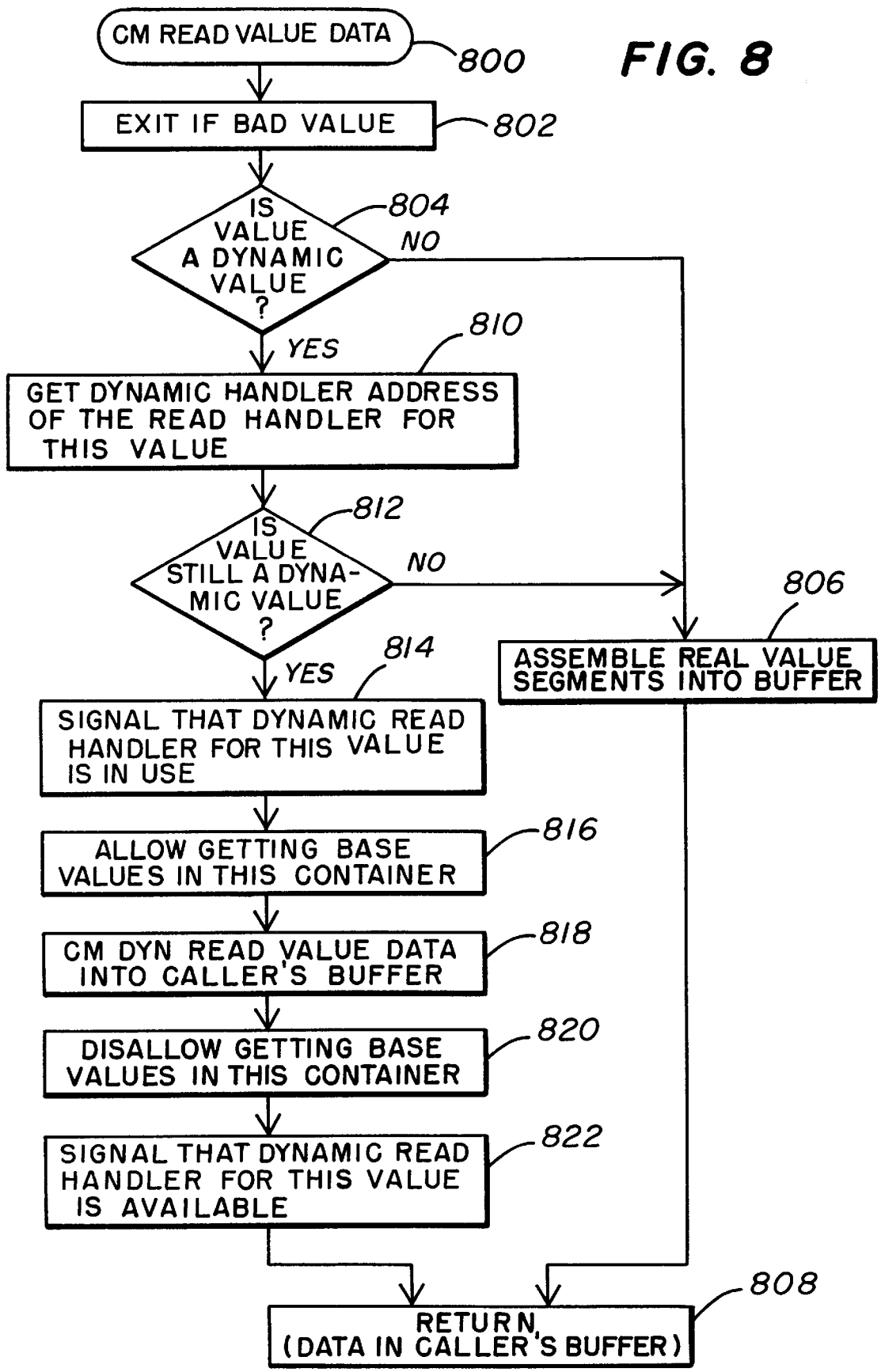
FIG. 8 is a flowchart of a CMReadValueData( ) routine.

FIG. 8 is a flowchart of a CMReadValueData( ) routine 800. In a step 802, the routine first determines whether the value designation which was passed to it is a valid value, and if not, it exits. In a step 804, the routine determines whether the value is a dynamic value or not. If it is not a dynamic value, then the routine merely obtains the real value from the real value segments (e.g. 426) and assembles them into the caller's buffer (step 806). It then returns to the caller (step 808).

If the value is a dynamic value, then in a step 810, the routine obtains the dynamic handler address of the read handler associated with this value. To obtain the dynamic handler address, the routine calls a cmGetDynHandlerAddress( ) function (described below), passing the value, a pointer to the dynamic handler vector entry for the desired read handler, and an indication that it is a read handler which is being sought. If this was not the first use of the handler, the cmGetDynHandlerAddress( ) function returns the desired handler address from the vector entry specified in the calling parameters. If it is the first use, then the function finds the inherited handler address and returns it.

In either case, the value may have changed, so in a step 812, the CMReadValueData( ) routine 800 checks again whether the value is still a dynamic value. If not, then the real value is assembled (step 806) as previously described, and returned in the caller's buffer (step 808).

If the value is still a dynamic value, then the routine signals that the dynamic read handler for this value is in use (step 814). This step sets a flag specific to the value and the read handler of that value, which is used to detect an error by recursion.

In step 816, another flag is set which allows getting base values in the present container. Only dynamic value handlers are permitted to get base values, since base values are not defined for real values.

In step 818, the actual read handler routine is called as a procedure. The address of that routine was placed in the value's dynamic value extensions vector previously in step 810.

In step 820, the routine disallows getting of base values in this container, and in step 822, it signals that the dynamic read handler for this value is once again available. The routine than returns with the requested data in the caller's buffer (step 808), as placed there by step 818.

The following C-language code implements CMReadValueData( ):

```
© 1992 Apple Computer, Inc.
CMSize CM_FIXEDARGS CMReadValueData(CMValue value, CMPtr buffer, CMCount offset, CMSize
          maxSize)
{
          TOCValueHdrPtr  theValueHdr;
          TOCValuePtr     theValue;
          ContainerPtr    container;
          unsigned char   *p;
          unsigned long   len, remaining, totalRead, amountRead;
          ExitIfBadValue(value, 0);      /* validate value */
          container = ((TOCValueHdrPtr)value)—>container; /* NEVER use updatingContainer
               here! */
          if (IsDynamicValue(value)) {   /* process dynamic value . . . */
               GetDynHandlerAddress(value, cmReadValueData, CMReadValueDataOpType,
                    "CMReadValueData", 0);
               if (IsDynamicValue(value)) {
                    SignalDynHandlerInUse(value, cmReadValueData);
                    AllowCMGetBaseValue(container);
                    totalRead = (unsigned long)CMDynReadValueData(value, buffer,
                         offset, maxSize);
                    DisAllowCMGetBaseValue(container);
```

-continued

```
                    SignalDynHandlerAvailable(value, cmReadValueData);
                    return (totalRead);
                }
        }
        theValueHdr = (TOCValueHdrPtr)value;    /* ("this") value may have changed! */
        if (maxSize == 0 || buffer == NULL) return (0);
        /* Scan across the value list for the value header and concat data into buffer.
        A value list will exist for continued values. The user views the data as one
        contiguous chunk of stuff. But a continued value is actually a set of
        non-contiguous smaller chunks that we concat into the user's buffer. The user
        specifies a starting offset with respect to his or her view of the contiguous
        data. We must map that offset into an offset within the proper starting
        continued value segment. The mapping is done by cmGetStartingValue( ). */
        if (cmIsEmptyList(&theValueHdr—>valueList)) {/* must have a value */
                ERROR1(CM_err_HasNoValue, CONTAINERNAME);
                return (0);
        }
        theValue = cmGetStartingValue(theValueHdr, offset, &offset); /* get start
                seg/offset */
        if (theValue == NULL) return (0);           /* offset out of range */
        P       = (unsigned char *)buffer;          /* p points to next byte to read to */
        remaining = (unsigned long)maxSize;         /* remaining bytes to read */
        totalRead = 0;                              /* how much we actually do read */
        while (theValue && remaining) {             /* read value (segments) ... */
                len = cmGet1ValueSize(theValue) - offset; /* (note, immediates work here)
                        */
                if (len > remaining) len = remaining; /* (note, so do global names) */
                if (len) {                          /* if more is wanted ... */
                        amountRead = cmRead1ValueData(theValue, p, offset, len); /* read 1
                                value segment */
                        totalRead += amountRead;    /* keep track of how much we read */
                        if (amountRead < len) break; /* if end of total value, we're done
                                */
                        p += len;                   /* point at next free byte in buffer */
                }
                offset = 0;                         /* full segments from now on */
                remaining -= len;                   /* adjust what's remaining to read */
                theValue = (TOCValuePtr)cmGetNextListCell(theValue); /* point to next
                                                                        value seg */
        }
        return (totalRead);                         /* return total amount concatenated */
}
```

The IsDynamicValue( ) call made by the above CMReadValueData( ) routine is the macro defined previously which merely checks the appropriate flags for the value. The GetDynHandlerAddress( ) call is also a macro defined previously, which calls a cmGetDynHandlerAddress( ) routine.

The call to cmGetDynHandlerAddress( ) is of the form:

```
        CMValue cmGetDynHandlerAddress (CMValue value,
                DynamicValueVectorEntriesPtr vectorEntry,
                CMconst_CMGlobalName operationType,
                char *routineName) ;
```

A dynamic value handler is callable if it exists (of course) and it is not being used recursively. The vectorEntry points to the dynamic value entry in its vector belonging to the extensions of the passed dynamic value. If this is not the first use of the handler, the vector entry contains the handler address and its associated ("this") value (discussed below). If it is first use, cmGetDynHandlerAddress( ) must find the ("inherited") handler address and its associated "this" value. In either case, the "this" value is returned as the function result. NULL is returned if an error is reported.

The returned value, and the one saved in the vector entry may not be the same. They are the same if the passed value already has a handler. If it doesn't, an "inherited" handler, from one of the dynamic value's base values is used. The value associated for whoever has the handler is the "owning" value. In C++ terms, it is the "this" pointer. In the limit, we could end up using the original "real" value that spawned the dynamic value(s). If that is indeed the case, we end up using the calling routine which will always be an API value operation.

The found handler address and "this" pointer are saved in the passed dynamic value's vector entry so we don't have to do the search on successive uses. The "this" pointer and handler address are also saved in the vector entry corresponding to "this" (unless, of course, it is the "real" value).

In the vector entry there is also a boolean flag that tells us whether the handler is currently active, i.e., in the call chain. If it is we have a recursion attempt. This causes an error report and NULL to be returned. Since we will always find the handler or use the "real" value, we can never get an error from that. The recursion is the only error condition.

cmGetDynHandlerAddress( ) can be implemented as follows:

© 1992 Apple Computer, Inc.
```
CMValue cmGetDynHandlerAddress(CMValue value, DynamicValueVectorEntriesPtr vectorEntry,
                               CMconst_CMGlobalName operationType, char *routineName)
{
    Long            entryOffset;
    CMValue         origValue;
    ContainerPtr    container;
    CMHandlerAddr   handler;
    /* It's an error to attempt a recursive call ...                                        */
    if (vectorEntry—>active) { /* error if recursing ...                                    */
        container = ((TOCValueHdrPtr)value)—>container;
        ERROR2(CM_err_HandlerRecursed, routineName, CONTAINERNAME);
        return (NULL);
    }
    /* We are not recursing and this is not the first time we're using this handler, just   */
    /* return the "this" pointer associated with the handler we found on an earlier call.   */
    /* They were initialized to NULL when the vector was allocated. We cannot test the      */
    /* handler pointer because it will not be set if the "this" pointer is for a base       */
    /* "real" value.                                                                        */
    if (vectorEntry—>thisValue != NULL) return (vectorEntry—>thisValue);
    /* This is the first call to the handler. We now must search up the dynamic value       */
    /* chain, starting with the passed dynamic value, looking for the first dynamic value   */
    /* that supplies the handler. The handler is accessed in the usual way via its dynamic  */
    /* value metahandler.                                                                   */
    origValue = value;                          /* remember starting dynamic value          */
    for (;;) {                                  /* loop till we find the handler ...        */
        handler = (CMHandlerAddr)(*DYNEXTENSIONS(value)—>metaHandler)(NULL, operationType);
        if (handler != NULL) break;             /* break when we find the handler           */
        /* If not found, we must get the current value's base value. We can do this until   */
        /* we reach the original "real" value. If we do reach it, then that stops the search*/
        /* and it is the "real" value we return. In that case, there is no handler because  */
        /* the calling API value routine will directly operate on the value. Thus we leave  */
        /* the handler address in the original value alone. Of course we set the "this"     */
        /* pointer. The next time the dynamic value is used, we will return the "real"      */
        /* value. As discussed in DynamicValues.h, the caller tests the returned value      */
        /* to see if it is still a dynamic value. If it isn't, the handler use is bypassed. */
        value = (CMValue)(DYNEXTENSIDNS(value)—>baseValue);/* basically a CMGetBaseValue( ) */
        if (!IsDynamicValue(value)) {           /* if we reached the "real" value ...       */
            vectorEntry—>thisValue = value;     /* save "this" value for next time          */
            return (value);                     /* return the "real" value as "this"        */
        }
    } /* for */
    /* Set the "this" pointer and handler address in the original vector entry for the      */
    /* next time we use it. Note that we can only exit the above "for" loop if we find      */
    /* the handler. If we loop up to the "real" value without finding it, we exit the       */
    /* routine from inside the loop after saving the "this" pointer as we do here.          */
    vectorEntry—>thisValue  = value;            /* remember "this"                          */
    vectorEntry—>handler = handler;             /* remember its handler address             */
    /* Just to be safe, we want to copy the "this" pointer and handler address in the       */
    /* vector entry corresponding to "this". Of course we only need to do this if we        */
    /* "inherited" a handler (i.e., we looped up to a base dynamic (but not real) value.    */
    /* Note, this is where we do the struct offset relocation warned about earlier.         */
    if (value != origValue) {                   /* if "inherited" ...                       */
        entryOffset = (char *)vectorEntry - (char *)DYNEXTENSIONS(origValue); /* relocate ...*/
        vectorEntry = (DynamicValueVectorEntriesPtr)((char *)DYNEXTENSIONS(value) +
    entryOffset);
        vectorEntry—>thisValue = value;         /* set "this"'s vector entry                */
        vectorEntry—>handler = handler;
    }
    return (value);                             /* return "this"                            */
}
```

Returning again to the Value Operations, the complement of CMReadValueData( ) is CMWriteValueData( ).

In CMWriteValueData( ), the buffer specified by the caller is written to the container and defined as the data for the value. If the value already has data associated with it, the buffer overwrites the "old" data starting at the offset character position. Size bytes are written. Size can be 0.

If the current size of the value data is S (it will be 0 for a new value created by CMNewValue( )), then the offset passed by the caller may be any value from 0 to S. That is, existing data may be overwritten or the value extended with new data. The value of S can be obtained using CMGetValueSize( ). Note, no "holes" can be created. An offset cannot be greater than S.

Once data has been written to the container, it may be read using CMReadValueData( ). Note that CMReadValueData( ) is also used for containers opened for input using CMOpenContainer( ). It thus can be used for all kinds of opens. The converse is not true. CMWriteValueData( ) may only be used for a container opened for writing (or converting) using CMOpenNewContainer( ).

CMWriteValueData( ) calls for a particular value do not have to be contiguous. Writes for other values can be done. The API, specifically, this routine here, takes care of generating "continued" value data (segments) for a value. The data is physically not contiguous in the container with such a case. CMWriteValueData( ) hides this by allowing the user to view the data as contiguous. The input offset is mapped into the proper starting segment and offset within that.

The following routine implements CMWriteValueData( ):

© 1992 Apple Computer, Inc.
```c
void CM_FIXEDARGS CMWriteValueData(CMValue value, CMPtr buffer, CMCount offset,
        CMSize size)
{
        TOCValueHdrPtr theValueHdr;
        TOCValuePtr theValue, theNextValue;
        ContainerPtr container;
        unsigned char *p;
        char offsetStr[15];
        unsigned long len, remaining, amountWritten, nextFree, valueSize;
        TOCValueBytes valueBytes;
        ExitIfBadValue(value, CM_NOVALUE);      /* validate value */
        if (buffer == NULL) return;
        theValueHdr = (TOCValueHdrPtr)value;
        container   = theValueHdr—>container—>updatingContainer;
        if ((container—>useFlags & kCMWriting) == 0) { /* make sure opened for writing */
                ERROR1(CM_err_WriteIllegal1, CONTAINERNAME);
                return;
        }
        if ((theValueHdr—>valueFlags & ValueProtected) != 0){ /* can't write if
                protected! */
                ERROR1(CM_err_WriteIllegal2, CONTAINERNAME);
                return;
        }
        if ((theValueHdr—>valueFlags & ValueGlobal) != 0) { /* can't write to global
                names */
                ERROR1(CM_err_CantWriteGlbl, CONTAINERNAME);
                return;
        }
        if (IsDynamicValue(value)) {                   /* process dynamic value . . . */
                GetDynHandlerAddress(value, cmWriteValueData, CMWriteValueDataOpType,
                        "CMWriteValueData", CM_NOVALUE);
                if (IsDynamicValue(value)) {
                        SignalDynHandlerInUse(value, cmWriteValueData);
                        AllowCMGetBaseValue(container);
                        CMDynWriteValueData(value, buffer, offset, size);
                        DisAllowCMGetBaseValue(container);
                        SignalDynHandlerAvailable(value, cmWriteValueData);
                        return;
                }
                theValueHdr = (TOCValueHdrPtr)value; /* ("this") value may have changed!
                        */
        }
        /* If the value list is empty, create the first or only value for this value
        header. An immediate value is created if the value size is less than or equal to
        the sizeof(CM_ULONG). Otherwise we write the data to the container and set the
        TOC info with the offset to it. */
        if (cmIsEmptyList(&theValueHdr—>valueList)) { /* if we have a empty value list . . .
                */
                if (offset > 0) {                      /* . . . create initial value */
                        ERROR2(CM_err_Offset2Big, cmltostr(offset, 1, false, offsetStr),
                                CONTAINERNAME);
                        return;
                }
                if (size <= sizeof(CM_ULONG)) {    /* we can make value immediate . . . */
                        (void)cmSetValueBytes(container, &valueBytes, Value_Imm_Chars,
                                (unsigned long)buffer, size);
                        cmAppendValue(theValueHdr, &valueBytes, kCMImmediate);
                ) else if (size != 0) {                 /* value must be written . . . */
                        #if 0
                        nextFree = CMgetContainerSize(container);
                        CMfseek(container, 0, kCMSeekEnd); /* position to current eof */
                        if (CMfWrite(container, buffer, sizeof(unsigned char), size) !=
                                size) {
                                ERROR1(CM_err_BadWrite, CONTAINERNAME);
                                return;
                        }
                        (void)cmSetValueBytes(container, &valueBytes, Value_NotImm,
                                nextFree, size);
                        cmAppendValue(theValueHdr, &valueBytes, 0);
                        container—>physicalEOF = nextFree + size; /* update next free
                                container byte */
                        SetLogicalEOF(container—>physicalEOF); /* Logical EOF == physical
                                EOF */
                        #endif
                        if ((CMSize)cmWriteData(theValueHdr, (unsigned char *)buffer,
                                (unsigned long)size) != size)
                                ERROR1(CM_err_BadWrite, CONTAINERNAME);
                }
                return; /* exit */
```

```
} /* end of 1st value */
/* At this point we have EXISTING data (possibly already continued). If the
offset says that we are NOT writing to the end of the data, then we MUST be
overwriting some of the existing data. In other words, the offset must be less
than the total size or we have an error. We can only overwrite or append (i.e.,
concat). We cannot create a "hole". In the code that follows we consume enough
of the input buffer to do the overwriting staring at the offset. If we consume
it all, we're done. If not, we have reached the end of the existing value and we
degenerate into the concat case. */
valueSize = CMGetValueSize((CMValue)theValueHdr); /* get current size of value */
if (valueSize != offset) { /* here we must be overwriting . . . */
        if (TouchIt(container, theValueHdr—>container)){/* if recording updates . . .
                */
                CMDeleteValueData(value, offset, size); /* . . . do overwrites this
                        way! */
                CMInsertValueData(value, buffer, offset, size);
                return; /* we're through */
        }
        theValue =        cmGetStartingValue(theValueHdr, offset, &offset);
        if (theValue == NULL) { /* offset MUST be IN the value */
                ERROR2(CM_err_Offset2Big, cmltostr(offset, 1, false, offsetStr),
                        CONTAINERNAME);
                return;
        }
        p        = (unsigned char *)buffer; /* p points to next byte to write */
        remaining = (unsigned long)size; /* remaining bytes to write */
        while (theValue && remaining) { /* overwrite existing value data */
                theNextValue = (TOCValuePtr)cmGetNextListCell(theValue); /* get
                        next value seg */
                len = cmGet1ValueSize(theValue) - offset; /* (note, immediates work
                        here!) */
                if (len > remaining) len = remaining;
                amountWritten = cmOverwrite1ValueData(theValue, p, offset, len); /*
                        write 1 seg. */
                if (amountWritten == 0) return;
                p += amountWritten;
                offset = 0; /* full segments from now on */
                remaining -= amountWritten; /* adjust what's remaining to write */
                theValue = theNextValue; /* point to next value seg */
        }
        if (remaining == 0) return; /* yikes!   all of it was written! */
        size = (CMSize)remaining; /* prepare to write rest at end */
        buffer = (CMPtr)p; /* simply fall through to next case */
} /* end of overwriting existing value data */
/* At this point we want to concat the new data on to the end of the existing
data. We are doing this because the input offset was equal to the data size or we
fell through from above because there are still more bytes to write in an
overwrite and these bytes "stick" off the end of the current data. Again this is
a concat case. Neat isn't it?
Well, actually no! Unlike the code above here we must handle immediate data
explicitly. It's sort of a hassle. That's because the amount of new data to
concat to an immediate might mean that it can't be immediate any more. Immediate
data is limited in size to less than or equal to sizeof(CM_ULONG). If we can
cram the new data we do it. If we can't, then we must convert the immediate to a
non-immediate by writing the data to the container and changing its TOC info to
be and offset. We then have a non-immediate which falls through to the standard
concat code for non-immediates. The way all these cases "fall" into one another
is the "neat" thing here. */
theValue = (TOCValuePtr)cmGetListTail(&theValueHdr—>valueList); /* use tail of
        list. */
If (theValue—>flags & kCMImmediate) { /* if current value immediate . . . */
        if (valueSize + size <= sizeof(CM_ULONG))  { /*cram new data if we can . . . */
                if (size > 0) { /* there must be some data to write */
                        memcpy(theValue—>value.imm.ucharsValue + valueSize,
                                        (char *)buffer, (size_t)size);
                        theValue—>value.notImm.valueLen = valueSize + size;
                        theValueHdr—>size += size;
                        cmTouchImmediateValue(theValueHdr); /* touch for
                                        updating if necessary */
                }
                return; /* that's all we need to do! */
        }
        if (!cmConvertImmediate(theValue)) /* convert the immediate . . . */
                return;
} /* end of immediate */
/* We are now ready to concat the new data on to the end of the existing data.
Here too life is not simple. A "concat" means here means a physical concat if
the old data was the last thing written to the SAME container. If it wasn't we
must create a new value entry on the valueHdr's value list to represent a
continued value. Note the emphasis on "SAME" container. We could be writing
```

```
                updates for an "old" container to be recorded in a new updating container. */
        nextFree = CMgetContainerSize(container);
        if (theValue—>value.notImm.value + theValue—>value.notImm.valueLen == nextFree &&
                theValue—>container == container) { /* remember, must be SAME container!
                */
                if (size > 0) { /* there must be some data to write */
                        CMfseek(container, 0, kCMSeekEnd); /* make sure of container
                                position */
                        if (CMfwrite(container, buffer, sizeof(unsigned char), size) !=
                                size) {
                                ERROR1(CM_err_BadWrite, CONTAINERNAME);
                                return;
                        }
                        container—>physicalEOF = nextFree + size; /* update next free
                                container byte */
                        SetLogicalEOF(container—>physicalEOF); /* Logical EOF == physical
                                EOF */
                        theValue—>value.notImm.valueLen += size; /* update total size */
                        theValueHdr—>size += size; /* keep size in valueHdr in sync */
                        cmTouchEditedValue(theValueHdr);/*touch for updating if necessary */
                }
                return;
        }
        /* Too bad! We couldn't really do a concat. We must create a continued value . . . */
        #if 0
        theValue—>flags |= kCMContinued; /* flag the current value as cont'd */
        theValueHdr—>valueFlags |= ValueContinued; /* also set a more convenient flag */
        CMfseek(container, 0, kCMSeekEnd);
        if (CMfwrite(container, buffer, sizeof(unsigned char), size) != size) {
                ERROR1(CM_err_BadWrite, CONTAINERNAME);
                return;
        }
        container—>physicalEOF = nextFree + size; /* update next free container byte */
        SetLogicalEOF(container—>physicalEOF); /* logical EOF == physical EOF */
        (void)cmSetValueBytes(container, &valueBytes, Value_NotImm, nextFree, size);
        cmAppendValue(theValueHdr, &valueBytes, 0);
        #endif
        if ((CMSize)cmWriteData(theValueHdr, (unsigned char *)buffer, (unsigned
                long)size) != size)
                ERROR1(CM_err_BadWrite, CONTAINERNAME);
        /* If we're recording updates, then define touched list entry for the write . . . */
        if (size > 0) cmTouchEditedValue(theValueHdr);/*touch for updating if necessary*/
}
```

VOID CMInsertValueData(CMValue value, CMPtr buffer, CMCount offset, CMSize size)

The buffer is inserted into the value's data at the specified offset. size bytes are inserted. If the current size of the value data is S (it will be 0 for a new value created by CMNewValue( )), then the offset may be any value from 0 to S. That is, the insertion may be anywhere within the data value or the value extended with new data. The value of S can be obtained using CMGetValueSize( ). Note, no "holes" can be created. An offset cannot be greater than S. Also, an insertion at offset of S is identical to a CMWriteValueData( ) to the same place.

Once data has been written to the container, it may be read using CMReadValueData( ).

From an implementation point of view, continued (i.e., segmented) values are handled by splitting them into one or two new segments. The insertion is always a new segment. The original segment to be inserted to will split into two segments if the insertion is in to its middle. It will remain intact and unsplit if we are inserting into its beginning. The new segment is simply inserted in front of it. For the split case the new segment must be inserted between the split pieces.

VOID CMDeleteValueData(CNValue value, CMCount offset, CMSize size)

Let S be the length of the value data. The bytes from offset to offset+size are deleted from the value, and the value is "closed up". After this operation, the size of the value data is S-size (assuming offset+size is 2 S). If offset is greater than S, no data is deleted. If offset+size is greater than S, all the data from offset to S is deleted. Neither case produces an error.

VOID CMDefineValueData(CMValue value, CMSize offset, CMSize size);

Existing data in the container, which must have been in the container when it was opened, is defined as the data for the value. No data is written to the container. The container must have been opened using CMOpenNewContainer, with the flag kCMConverting set in the useMode.

The designated value is set to reference the indicated data. The offset given is the offset from the beginning of the container. It is an error to give an offset or a size that would result in the value containing bytes outside of the data that was in the container when it was opened. The offset therefore, must be in the range of 0 to N-1, where N is the size of preexisting data at the time the container was opened.

Additional calls to CMDefineValueData( ) for the same value will define additional, i.e. continued, segments when the offset produces noncontiguous data definition. If the size of the last (most recent) value segment is S, and the offset for that segment is such that offset+S equals the offset for the additional segment, then the last segment is simply extended. This follows the same rules as CMWriteValueData( ).

void CMMoveValue(CMValue value, CMObject object, CMProperty property);

Moves the specified value from its original object property to the specified object property. The value is physically deleted from its original object/property as if a CMDeleteValue( ) were done on it. If the value deleted is the only one for the property, the property itself is deleted as in CMDeleteObjectProperty( ).

The value is added to the "to"s object property in the same manner as a CMNewValue( ). The order of the values for both the value's original object property and for the value's new object property may be changed.

Note, that although the effect of a move is logically a combination CMDeleteValue( ) and CMNewvalue( ), the refnum of the value remains valid. Its association is now with the new object property.

This operation may be done at any time. No data need be associated with the value at the time of the move. Only moves within the same container are allowed.

VOID CMGetValueInfo(Cmvalue value, CMcontainer *container, CMObject *object, CMProperty *property, CMGeneration *generation);

The container, object, property, and generation of the designated entry are returned. NULL may be passed for any argument except the first.

| | |
|---|---|
| void | CMSetValueType(CMValue value, CMType type); |
| | The type of the value is set as specified. |
| void | CMSetValueGeneration (CMValue value, CMGeneration generation) |

The generation for the specified value is set. The generation number must be greater than or equal to 1. Normally this routine does not need to be used since the value inherits its generation from its container.

void CMDeleteValue(CMValue value);

The designated value is deleted from its object property. A deleted value will be treated by all Container Manager operations as though it does not exist. For example, it will not be found by CMUseValue, counted by CMCountValues, etc.

If the value deleted is the only one for the property, the property itself is deleted as in CMDeleteObjectProperty. If that property is the only one for the object, the object is also deleted as in CMDeleteObject. Some values are protected from deletion. Protected values include the predefined TOC object values (seed and offset) and any currently open embedded container values.

void CMReleaseValue(CMValue value);

The association between the Value refnum and the entry is destroyed. After this call the refnum is invalid, and may be returned from a subsequent CMUseValue or CMNewValue call to designate another value.

III. DYNAMIC VALUE HANDLERS
A. Sample Session Flow

Before describing some sample dynamic value handlers, it will be useful to have an overview of the session flow which might take place for an application program which uses the Container Manager.

First, the application program would start the session by calling the Container Manager APIs for starting a session. These APIs, among other things, create the session global data block 402 (FIG. 4).

The application program then calls the Container Manager API(s) either to create a new container or to open an existing container. These APIs create the container control block 406 in memory 304 and initialize the TOC 414. If the contianer is an update container, then the Container Manager performs certain functions to prepare the data, described hereinafter.

If the application program then desires to define a type which incorporates data transformation and/or redirection, it would then invoke the Container Manager CMSetMetaHandler( ) routine to associate a desired metahandler with the global name of the type. If the desired type is to be built as a tree of subtypes, then the application program would call CMSetMetaHandler( ) for each of the subtypes on the tree which requires a metahandler. These calls set up the metahandler symbol table 404 (FIG. 4) in the memory 304.

Once all required metahandlers have been associated with their respective type names, the application program registers the desired type with the Container Manager using CMRegisterType( ). This call creates a type object such as that shown in FIG. 7, which merely associates the name of the desired type with a type ID number (the object ID of the type object). Again, if this desired type is to be created using a tree of sub-types, the application program would then call CMAddBaseType( ) to add the base types in the sequence desired. These calls construct the remainder of the type object as shown in FIG. 7, as well as the separate type objects for each of the base types. Note that if a given type is at a leaf of a type tree, its type object would contain only the type's global name (in value 706 of global name property 704 of the type). Only if the given type has one or more base types do value segments such as 708, 710 exist for a base type property 712 of the type object.

Once the desired type tree is set up for a desired type, the application program may create a value in one of its objects for the desired type. This is accomplished by calling CMNewValue( ) and specifying the object, and the property within the object, as well as the desired type. CMNewValue( ) creates a value header such as 506 (FIG. 5) for the new value and places the type ID into that value header. Assuming the type or any of its subtypes has a "new value" handler and a "use value" handler associated with it by one of the metahandlers identified in the metahandler symbol table 404 (FIG. 4), the routine then sets up the entire dynamic value chain (e.g. 518, 520, 522 in FIG. 5) for the new value. Note that if the application program merely wants to use a value which is already defined with the desired type, it would call CMUseValue( ) instead of CMNewValue( ) to set up the dynamic value chain. Neither CMNewvalue( ) nor CMUseValue( ) actually fills any of the dynamic value vectors (e.g. 530, 532, 534 in FIG. 5) at this time.

Once the dynamic value chain is set up, the application program can call any of the value operations of the API as desired. For example, it can call CMWriteValueData( ) to write data to the value, or it can call CMReadValueData( ) to read data from the value.

In order to understand what happens when the application program invokes one of these API calls, let us assume that the value has the type shown in FIG. 1 (compressed file type 102). The dynamic value chain which is set up for this value would therefore look like the three-level chain 518, 520, 522 (FIG. 5), with the top layer 518 having the compressed file type 102, the middle layer 520 having the compression type 106, and the bottom layer 522 having the file access type 104. Since the bottom layer type is a data redirection type, the information in real value data segment 512 indicates how to reach the literal value, rather than the literal value data itself. For example, real value data segment 512 may contain a file name or a file handle.

When the application program calls CMUseValue( ), that routine returns a pointer (called v for the purposes of the description below) to the top layer dynamic value header

518. If the value were not a dynamic value, then CMUseValue( ) would have returned a pointer to the real value header 506 instead.

After obtaining v, the application program can call CMReadValueData(v, destination buffer, offset, size) to perform a read operation on the value data. Note here that the application program need not know that the value is a dynamic value.

CMReadValueData( ) first determines that v is a dynamic value. Therefore, instead of merely returning data (for example, from real value data segment 512), it performs a series of steps to obtain the data dynamically. First, it calls cmGetDynHandlerAddress( ) with v, with a pointer to the dynamic value vector 530 entry which should contain the pointer to the read handler for the "compressed file" type, and with a flag indicating that it is a read handler which is being sought. If cmGetDynHandlerAddress( ) finds a non-NULL pointer in the specified entry of dynamic value vector 530, it merely returns since the read handler address was previously obtained. Otherwise, it invokes the metahandler for the type (the pointer for which metahandler was previously placed in the dynamic value extensions 524 when the dynamic value chain was created), requesting the type's read handler. The metahandler returns a pointer to the same, which cmGetDynHandlerAddress( ) places in the previously specified entry of dynamic value vector 530. After calling cmGetDynHandlerAddress( ), CMReadValueData( ) then invokes the handler now pointed to by the read handler-entry of dynamic value vector 530.

The read handler for the "compressed file" type will be very simple since it does no transformations or redirection. All that work is performed by the base types "compression" and "file access". The read handler for "compressed file" therefore might simply be:

bv=CMGetBaseValue(v);

returnedsize=CMReadValueData(bv, destination buffer, offset, size);

The CMGetBaseValue( ) routine merely checks for errors and then returns the pointer to the supplied value's base value, which was previously stored in the extensions 524. In this case, it will return a pointer to dynamic value header 520. CMGetBaseValue( ) is implemented in the Container Manager as follows:

handler for the "compressed file" type placed in the read handler slot of dynamic value vector 532. cmGetDynHandlerAddress( ) invokes the metahandler for the type of value header 520 (which is "compression" in this example), to obtain that pointer and place it in that slot in dynamic value vector 532. CMReadValueData( ) then invokes the handler.

The read handler for the "compression" type will be more complicated than the read handler for "compressed file", since a transformation must be performed. The basic format for the handler would be as follows, using a combination of C-language code and pseudocode:

bv=CMGetBaseValue(v);

returnedSize=CMReadValueData(bv, temporary buffer, offset, size);

decompress data from temporary buffer into caller's destination buffer;

return

Once again, CMReadValueData( ) has been called recursively, this time with the value pointing to dynamic value header 522 (the base value for dynamic value header 520). In the same manner as previously described, CMReadValueData( ) finds and then invokes the read handler for the "file access" type, which is the type of dynamic value 522. Since the "file access" type is a data redirection type, its read handler might have the following format:

bv=CMGetBasevalue(v);

returnedSize=CMReadValueData(bv, filename, 0, some size number);

obtain data from file designated by file name in filename buffer, using caller's offset and size;

write the data into caller's destination buffer;

return

As with the previous read handlers, this read handler begins by obtaining its base value bv. In the present example, the base value points to real value header 506, although it would make no difference to the read handler if the base value pointed to yet another dynamic value header. The read handler then calls CMReadValueData( ) using the base value, in order to obtain it in a buffer "filename", information which the read handler will interpret as a file name. The read handler then opens the file identified by

---

© 1992 Apple Computer, Inc.
CMValue CM_FIXEDARGS CMGetBaseValue(CMValue value)
{
    TOCValueHdrPtr theValueHdr;
    ContainerPtr     container;
    ExitIfBadValue(value, NULL); /* validate value */
    theValueHdr = (TOCValueHdrPtr)value;
    container   = theValueHdr—>container;
    if (container—>getBaseValueOk <= 0) { /* only callable from a handler */
        ERROR1(CM_err_CantGetBase, CONTAINERNAME);
        return (NULL);
    }
    if (!IsDynamicValue(value)) /* if not dynamic value . . . */
        return (NULL); /* . . . there is no base */
    return ((CMValue)DYNEXTENSIONS(value)—>baseValue);/* return the base value */
}

---

Accordingly, the read handler for the "compressed file" type calls CMReadValueData( ) recursively, this time for dynamic value header 520. CMReadValueData( ) again determines that the value header 520 is a dynamic value header, and therefore again calls cmGetDynHandlerAddress( ) to have a pointer to the read filename, obtains the data from the file, and places the result in the caller's destination buffer.

It can be seen that CMReadValueData has now been called recursively yet a fourth time, but this time the value passed to it is a real value rather than a dynamic value. CMReadValueData( ) determines this and merely returns the data from the real value data segment 512. This is the information which the read handler for the "file access" type interprets as a file name for use in obtaining the actual data. Note that although the data in real value data segment 512 is not the literal data ultimately sought, as used herein, the bottom level read handler is still considered to "operate on" the data in real value data segment 512.

Certain optimizations can be implemented in the latter read handler due to the fact a static storage area (refCon) for the value is available to it. For example, the read handler might be written to follow the above procedure only if this is the first time the read handler has been called with respect to the particular value, and can save the file handle returned by the file open routine in the value's refcon. In all subsequent times that the read handler is called the read handler can simply use the file handle from the value's refCon to read the requested data.

Yet another optimization can be implemented if the read handler knows that it is always the bottom handler on the chain. In this case the value's "use value" or "new value" handler can open the file using the file name in the value's real value segments, and can store the file handle in the value's refCon. Then the read handler could be written to always obtain the file handle from the value's refCon and never call CMReadValueData( ) to obtain a file name.

After placing the result in the caller's destination buffer, the read handler for the bottom level dynamic value header 536 then returns to the CMReadValueData( ) routine which called it, which in turn returns to the read handler for the second level dynamic value header 522. That read handler processes the results as previously described and returns to the CMReadValueData( ) routine which called it. That routine then returns to the read handler for the top dynamic value header 518, which, as previously mentioned, needs to do no further work before returning to the CMReadValueData( ) routine which called it. That routine then returns to the caller, which is the application program. Thus the application program has obtained the data it requested, without ever having to know that the data was obtained from a file rather than from the real value data segment 512, and without ever having to know that the data underwent decompression before being returned.

When the application program finishes its work, it calls the CMCloseContainer( ) API routine to close the container. The routine writes only real value data out to persistent storage; dynamic values, including the entire dynamic value chain, are deleted.

B. Sample Value Handlers

Appendix A of the related DYNAMIC VALUE MECHANISM FOR COMPUTER STORAGE CONTAINER MANAGER patent application is a header file for a sample set of value handlers for a data encryption/decryption type. The handlers themselves are in Appendix B of that patent application. Similarly, Appendix C of that patent application is a header file for a sample set of value handlers for an indirect file access type. The handlers themselves are in Appendix D of that patent application. These appendices are not repeated in the present patent application because they are all incorporated by reference herein.

IV. UPDATING

The algorithms used for handling (incremental) updating will now be described. Updating here refers to a (new) container updating a target container. The target may be appended or a separate container.

In a multi-layer update, the topmost update container bases its changes on the second-layer update container, and so on down to the bottom-layer container. Each container except the topmost is a "target" (or "child") container for one or more respective update or parent containers. Since a target container which is in the middle of a chain in essence incorporates by reference its own descendent containers, the term "target container" is sometimes used herein to refer to not just the information directly in that container, but also all of the information in all of its descendent containers as well.

In persistent storage, all,the changes are recorded as change instructions in the updating container to be applied to its target the next time the updating container is opened. Only the information needed to bring the container back to its updated state the next time it's open are recorded. Change or updating "instructions" take the form of standard TOC entries for new values for the target, and actual internally generated data for all other forms of updates (moves, data edits, and so on).

There are four main areas involved with one container updating another:

The additional in-memory data structures added to the basic data structures needed to keep track of updating during a session.

What criteria are used in considering something "changed" and how the new in-memory data structures record it.

What happens at close time to convert the run-time data structures into change instructions to be applied the next time the container is open.

What open-time processing does to connect an updating container to its target and how it applies the updating instructions.

C-language software to support the algorithms and data structures described herein is attached hereto as Appendix C, with a header file in Appendix B.

A. Updating Algorithm In-Memory Data Structures

Figure 12:
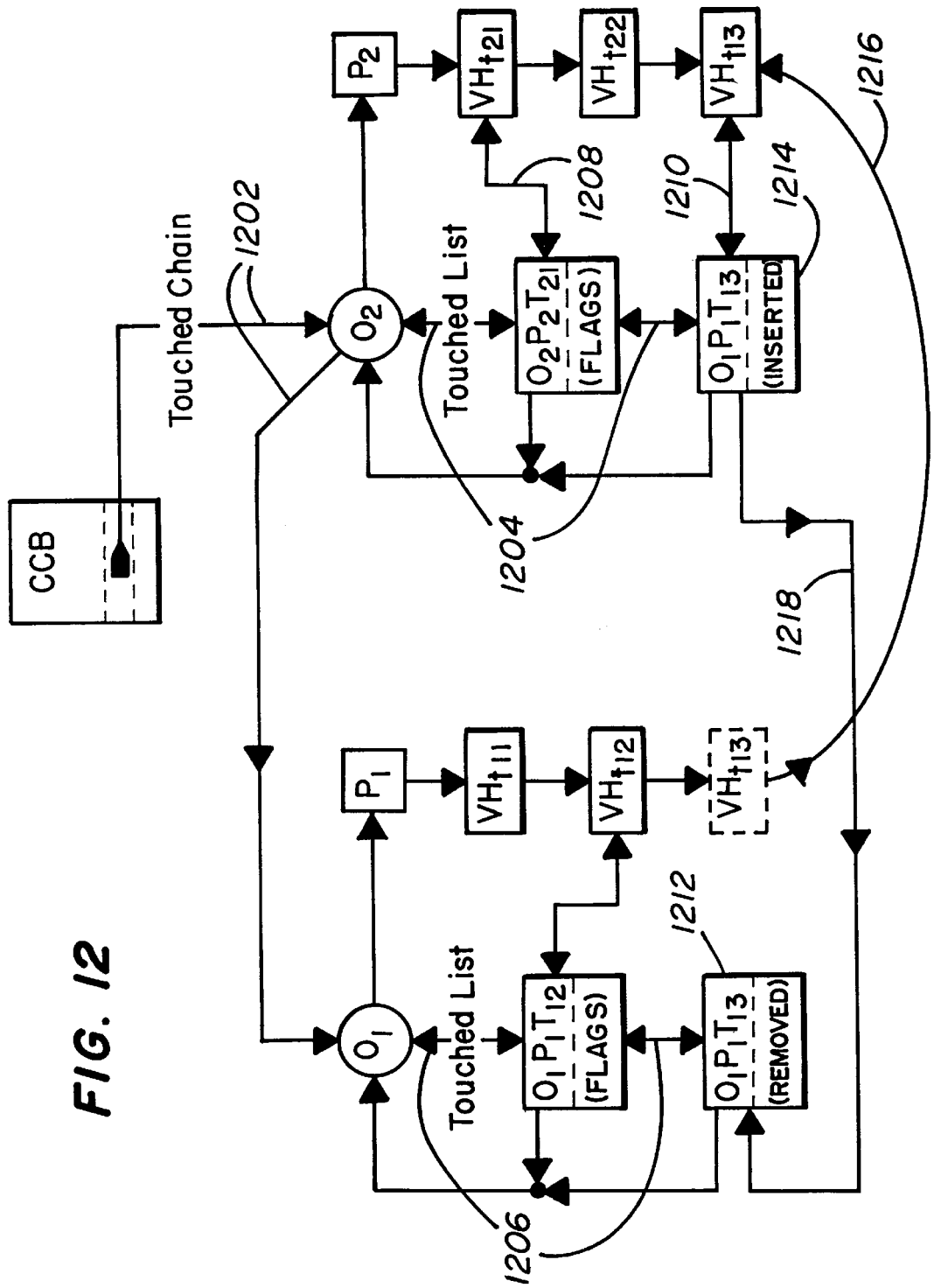

Updating involves extending the basic data structures as illustrated by the heavy lines in the diagram of FIG. 12. This diagram shows the additional data structures added to the basic data structures illustrated in FIG. 4, but without value segments. FIG. 12 illustrates a case of the effect of a CMMoveValue( ) of value $VH_{r13}$ from object $O_1$, property $P_1$ ("$O_1P_1$") to $O_2P_2$. There are value segments attached to the value headers, but they are only of significance in the recording of data editing. That is illustrated separately later. Here only the additional data structures are of interest.

The additional data structures shown in FIG. 12 are as follows:

(1). The Touched Chain 1202.

This is a singly linked chain of all objects (through the TOCObjects) that are "touched" during the updating session. The head of this chain is contained in the Container Control Block. As discussed later, order of updating recording does not matter, so the most convenient way to link this list is backward. Thus, in the diagram, object $O_1$ was touched before $O_2$.

(2). The Touched List 1204 and 1206.

This is a doubly linked list for each object, whose header is in the object (TOCObject). A doubly linked list is used to make it easy to remove or move these entries. List entries are generated for each value updated in the object. There is only one list entry per value no matter how many times the corresponding value is updated. The value header for an updated value points back to its touched list entry, as indicated by arrows 1208 and 1210. This pointer is initially NULL and doubles as a "first touched" switch.

Each touched list entry contains the following:

(a). The original object, property, and type IDs that is referred to collectively as the "OPT address". The OPTs will work their way into the value updating instructions generated at close time for use in addressing the original values at open time. They uniquely address the original value prior to applying any changes to properly apply those changes.

(b). A pointer to the value header that was touched. Thus the touched list entry and its value header point to each other.

(c). A "back pointer" to an initial touched list entry in the case of moved values. The use of this pointer is discussed later. For unmoved touched values, this pointer is NULL.

(d). Flags to indicate special conditions of the touched entry. These conditions are:

"removed" The value has been moved to another object. The touched list entry for the original "from" object's value is created or flagged as "removed".

"inserted" The value has been moved from another or the same object. A touched list entry for the destination object is created and marked as "inserted". If it is the same object and previously touched, the touched list entry is changed to "inserted".

"immediate" The immediate value has been edited and it is still immediate. Immediate values are up to 4 byte long and stored directly in the TOC in place of the offset.

"deleted Value" The value has been deleted.

"deleted Property" The property specified by address "OP" has been deleted.

"edited" The value has been edited, i.e., data has been inserted, deleted, overwritten, or appended.

"base type" A base type has been added or removed from a global name object.

"set-infoed" The value's type or generation number have been changed.

B. Criteria For "Touching"

The following operations are classified as "touching" an object, or an object's value, and hence causing a touched list entry to be generated for it (the first time). They follow the flags just described.

1. Moving values
2. Setting type and generation ("set-infoing")
3. Data editing (comprising inserting, deleting, and overwriting of data)
4. Converting immediate data to non-immediate data
5. Deleting a value
6. Deleting a property
7. Deleting an object
8. Changing base types All of these operations cause appropriate flags to be set in the value headers or objects involved. At close time, the appropriate updating instructions are written out to the update container according to the flags and the touched list. This is discussed later.

Note, only "old" values and objects are involved in touching, i.e., values or objects that already exist in the target container. New values require no special action. Their data, as well as the associated TOC entries, are simply part of the new updating container. Even if they are moved to old objects during the session there is still a new TOC entry. Thus, at a subsequent open-time, the new TOC entries go wherever they are supposed to. This is also discussed in more detail later.

The following sections discuss each "touch" in more detail in terms of how the touch chain and list are maintained. Note, that unless otherwise stated, phrases like "create touch list entry" for a value imply adding the owning object to the touched chain the first time any of that object's values are touched.

Moving Values

Moves are the most involved area in updating. They are the central theme around which all the rest of updating revolve. Values can only be moved through CMMoveValue( ) calls. Touched list entries for the "from" and "to" (source and destination) objects involved in the moved value are defined.

Figures 13, 14:
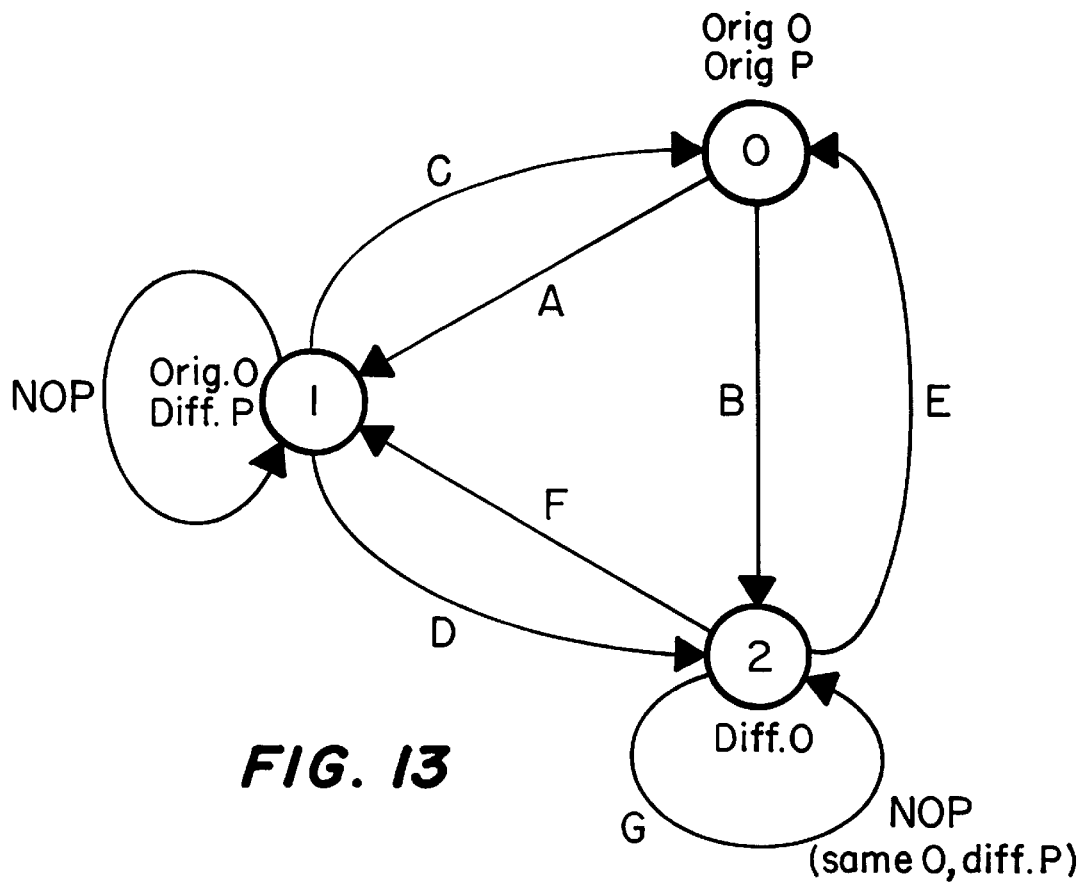
FIG. 13 is a state transition diagram describing a finite state machine.
FIG. 14 is a table defining actions taken and the next state for the finite state machine of FIG. 13.

Note, that a move only moves the value header. The value data segments "go along for the ride". By moving the value header, the user's refNum to it remains valid. The source and destination object's touched lists are modified appropriately. The algorithm is conveniently described using a "finite state machine" (FSM). FIG. 13 is a "state-transition" diagram describing this FSM, and FIG. 14 defines the actions taken and the next state. In the table, read states on the left, conditions across the top. The intersections are in the form "X/s". This says, "execute action X then go to state number s". The special action "NOP" means just go to the indicated state.

Note, in this table, "O" and "P" stand for object and property respectively. Also, "Orig. O" and "Same O" are identical while in states 0 or 1. Here are the actions:

A: if (no "from" touched list entry) create it flag "from" touched list entry as "inserted"

B: if (no "from" touched list entry) create it flag "from" touched list entry as "removed" create "to" touched list entry as "inserted" (set value header to point to this) set back pointer in "to" "inserted" entry to point to "from" "removed" entry C: remove "inserted" flag from "from" touched list entry ("from" == "to" object) if (touched value not edited or set-infoed) delete "from" touched list entry D: move "from" touched list ("inserted") entry to "to" object create "from" touched list entry as "removed" set back pointer in "to" "inserted" entry to point to "from" "removed" entry E: move "from" touched list ("inserted") entry to "to" (original) object delete "removed" entry in "to" touched list remove "inserted" flag from "from" touched list entry if (touched value not edited or set-infoed) delete "from" touched list entry F: move "from" touched list ("inserted") entry to "to" (original) object delete "to" "removed" touched list entry G: move "from" touched ("inserted") list entry to "to" object State 0 occurs when an object has never moved (or was moved back to its original position). This is the initial state. There could still be a touched list entry for the value if it was edited or set-infoed.

State 1 is used when a value is moved to or within the same original object. This can be from another object (moved there from the original object by an earlier move) within the original object, but from a different property (again from an earlier move).

State 2 is entered when a value is moved to a different object from its original.

The general "gist" of this whole thing is to generate a "removed" entry at the original source and an "inserted" at the destination. The "inserted" entry gets a back pointer to the corresponding "removed" entry (used when values are deleted, which is described later). The "removed" entry is suppressed when the "inserted" is for the same original object (i.e., moved to a different property in the original object). Both "removed" and "inserted" are suppressed when a value is moved back to its original object and property.

Note, in the code, an actual state number is not maintained in the touched list entries. Instead the state can be inferred by current conditions.

An example of a single move of a value is illustrated in the diagram of FIG. 12. In the diagram a CMMoveValue( ) of value $VH_{f13}$ has been done from object $0_1P_1$ to $O_2P_2$ as indicated by arrow 1216. There is a "removed" entry 1212 in the source object's touched list and an "inserted" entry 1214 in the destination. The back pointer 1218 is set in the "inserted" to point to the "removed" entry.

"Set-infoing" a Value

When a CMSetValueType( ) or CMSetValueGeneration( ) is done to change the type or generation (i.e., it's "set-infoed"), a touched list entry for the object "owning" the value is created.

Data Editing

This is recorded during editing exactly like "set-infoing"; a touched list entry for the object "owning" the value is created.

Editing here refers basically to insert and delete data operations. Overwriting of existing data can always be reduced to a delete data operation followed by an insert data operation. Appending is viewed as an insert.

In addition to the touched list entry and value header flag, additional information must be maintained in order to determine value data insert/delete edits "after the fact" at close time. First here is that additional information and where it is stored:

(1). The original "logical size" of a value's data. This is the total size of all the value data segments as originally read in. This is saved in the value header.

(2). The original "logical offset" of the start of each value segment. This is the relative offset of the start of each value segment when read in, viewing each segment as the user would, i.e., as contiguous data. This offset has nothing to do with the actual data offset in the container, but, like the data offset, it is stored in the value segments.

Figure 15:
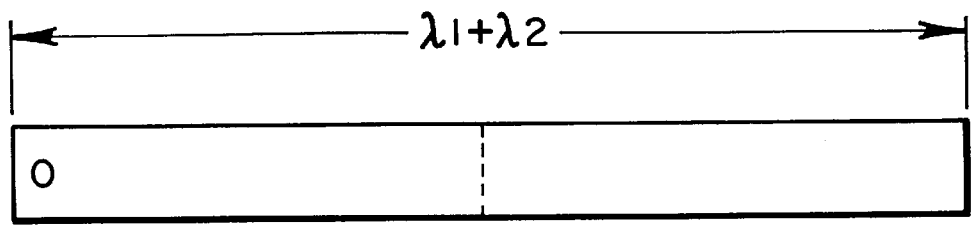
FIG. 15 illustrates a logical view of certain value data.
Figure 16:
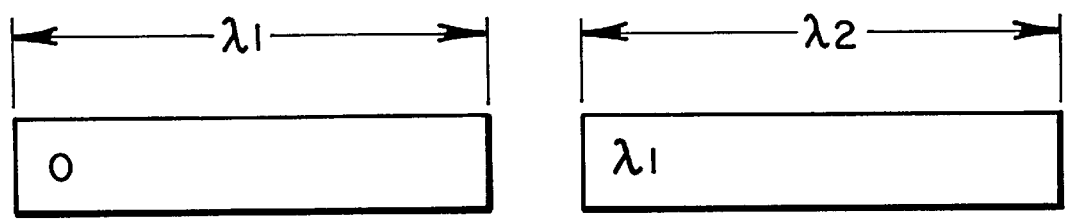
FIG. 16 illustrates a physical view of the value data illustrated in FIG. 15.

FIGS. 15 and 16 point out the difference between the logical and physical views of value data. In the illustrated example, the user has what is s/he views as value data. It starts at offset 0 and has a size $\lambda 1+\lambda 2$. This size is the logical size and the logical offsets extend from 0 to $\lambda 1+\lambda 2-1$. All the API data manipulations procedures, e.g.

CMWriteValueData( ), CMReadValueData( ), CMInsertValueData( ), and CMDeletevalueData( ), take logical offsets.

Internally there is no guarantee that all the data for a value is stored in the container contiguously. It could be represented as two or more value segments. This fact is hidden from the application program, but is pertinent to the description of how data inserts and deletes are determined at close time by using the logical offset and size. So, as an illustration, assume the above data is internally represented as two value data segments. FIG. 16 illustrates this and the notation used in the descriptions to follow.

In FIG. 16, the user's view of the data is represented as two chunks of data, one of length $\lambda 1$, starting at logical offset 0, and a second of length $\lambda 2$, which, by definition, starts at logical offset $0+\lambda 1$, i.e., $\lambda 1$. The logical size is still $\lambda 1+\lambda 2$.

In this notation, the logical offset information placed in the value segments for a value header is shown at the start of each representation of the data itself. Lengths of segments (also offsets into segments) are shown at the top or bottom. Showing the data with the segment information makes it easier to understand the math involved here.

The following is a discussion of delete and insert data operations and how the logical size and offset are defined and used to determine what editing operations have been performed. All descriptions are in terms of the value segments since that, of course, is what the implementation must deal with.

Inserting data

There are three cases that can occur when inserting data. They all involve inserting the new data into a single offset. It must be a single offset since CMInsertValueData( ) takes a single offset for the insertion point. That can map only into a single segment.

Case (1): Inserting into an immediate data segment.

Case (2): Inserting into an arbitrary non-immediate data segment at a segment boundary.

Case (3). Inserting into an arbitrary non-immediate data segment as some offset, $\delta$, from the start of that segment.

Immediate data is a single value segment that was initially created as immediate because the data fit into four bytes. The data is placed directly in the value segment (and hence the TOC) in place of a data offset to the data, which is the case for non-immediate data. Inserting into immediates can be done directly so long as the final result still fits into four bytes. When the insertion would yield a result greater than four bytes, the data is written to the container, and the offset set to point to it. At that point only cases (2) and (3) are possible. These are illustrated in the diagram of FIG. 17. Immediates will be discussed in more detail later during the description of "Converting immediate data to non-immediate data" and how these things are handled when touched.

In both cases of FIG. 17, the new data is inserted at logical offset $\alpha+\delta$. In case (2) $\delta$ is 0 and case (3) it's non-zero. Case (2) simply causes the new data to be inserted as a segment before the old segment. In case (3) the old segment must be split and the new segment inserted between the two old segments. The original logical offsets of the old segments are preserved. This becomes important only for deletions, but since an overwrite is treated as a delete followed by an insert, the original logical offsets must be preserved.

The "new" verses "old" significance is the important point needed to detect insertions at close time. Each value segment contains a pointer to the container (control block) that "owns" it. New value segments and their data must always be placed in the updating container. Hence an insertion can always be detected by seeing if the segment is "owned" by the updating container.

Deleting data

There are four cases that can occur when deleting data. Unlike inserts, multiple segments can be involved. When a CMDeleteValueData( ) is done, a starting offset and size are passed. The size may span from some portion within a segment, through any number of whole segments, and end somewhere in a final segment. Alternatively, the size may specify only a portion of a single segment. However, each of these processes can be viewed separately in terms of a single segment. Thus, for any one segment, the following four cases are possible:

Case (1): Deleting an entire segment.
Case (2): Deleting the left portion of a segment.
Case (3): Deleting the right portion of a segment.
Case (4): Deleting an interior portion of a segment.

As with insertions, the original data segment can be immediate. If it is, it will remain immediate since the result can only be less than four bytes. Thus deletion of immediate data is not listed as one of the possible cases. It cannot, however, be ignored, since it must be taken into account as an updating operation. This is discussed later when converting immediates to non-immediates is described.

Figure 18:
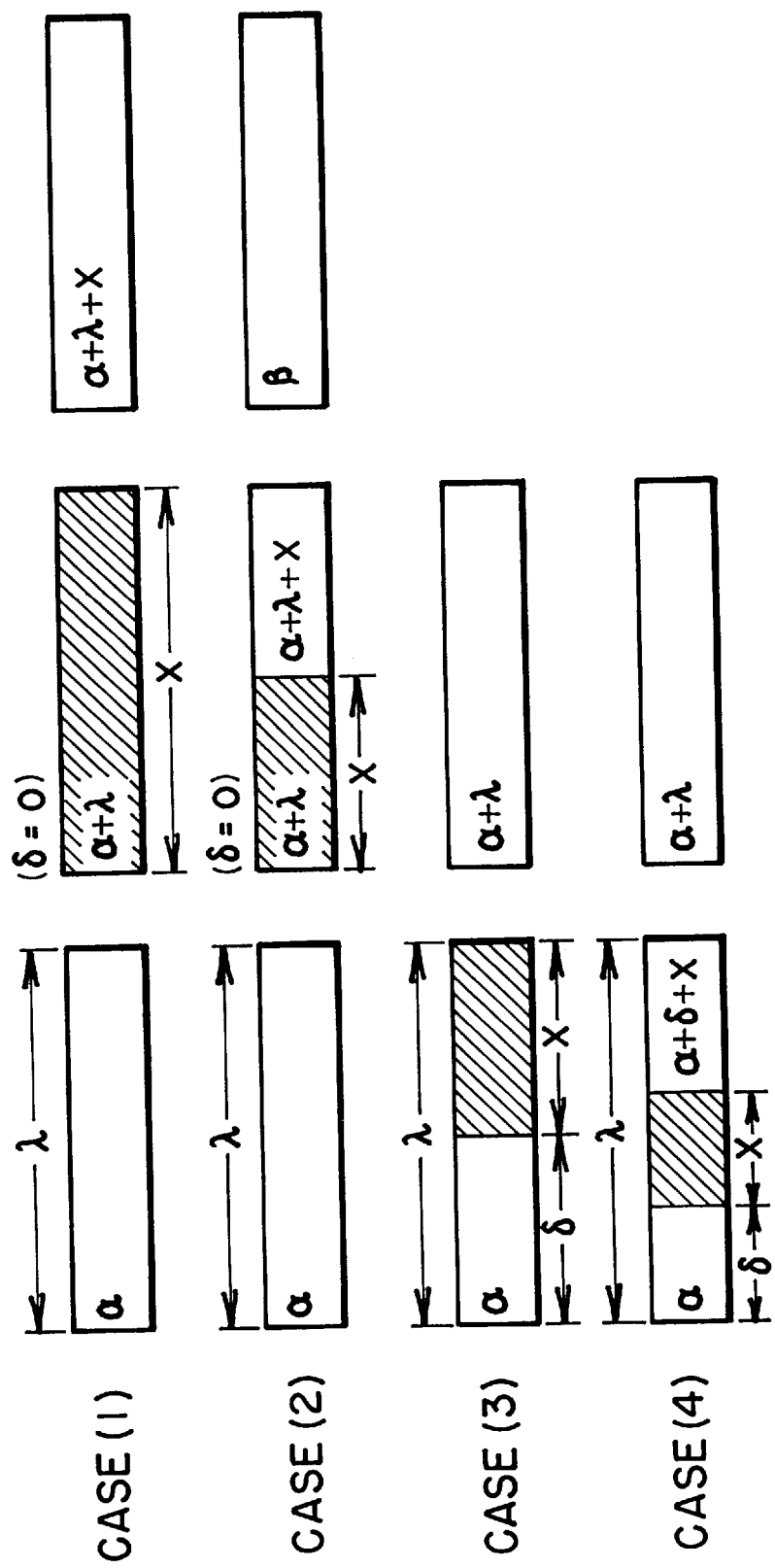

The four delete cases are illustrated in FIG. 18. In all of these cases the preservation of the original logical offsets of the start of the remaining data segments is important. By doing this it can be determined that a deletion has been done and how much based on what is expected as the logical offset of the next segment.

In case (1) an entire segment of length x, starting at $\alpha+\lambda$ has been deleted. The segment to the right of the deleted segment was originally at $\alpha+\lambda+x$. That's its original logical offset and it is not changed. Thus, at close, if a segment starting at $\alpha$ is seen, and the next segment starting at $\alpha+\lambda+x$, when it is expected it to start at $\alpha+\lambda$, then it can be computed that x bytes have been deleted starting at $\alpha+\lambda$ $((\alpha+\lambda+x)-(\alpha+\lambda))$.

In case (2) x bytes of the left portion of a segment have been deleted starting at logical offset $\alpha+\lambda$. The remaining part of the segment therefore starts at $\alpha+\lambda+x$. At close time, the deletion is detected exactly as in case (1). A segment is encountered starting at $\alpha+\lambda+x$ when it is expected to be at $\alpha+\lambda$. Again it can be computed that x bytes have been deleted starting at $\alpha+\lambda$.

In case (3) x bytes of the right portion of a segment have been deleted starting $\delta$ bytes into that segment ($\delta>0$). The segment is now only $\delta$ bytes long. At close time, the next segment is expected to start at $\alpha+\delta$. Instead it starts at $\alpha+\lambda$. Thus it can be determined that $(\alpha+\lambda)-(\alpha+\delta)$ bytes have been deleted starting at $\alpha+\delta$.

Case (4) is a unique case. It cannot occur at the same time as the other cases. However, here too, the situation is similar to the other cases. A segment starting at $\alpha+\delta+x$ is encountered when it was expected to start at $\alpha+\delta$.

In all these cases, the original logical offsets are preserved in the remaining segments or potions of original segments. At close time the expected offset of the next segment is always determined from the previous segment and its length. If the next segment does not start at that value, a deletion has been detected. This algorithm works no matter how many intervening segments were deleted. This is discussed below.

Note, cases (1) and (3) could occur on the last segment of a value. These are the situations where the original logical size in the value header is used. It essentially acts at the expected starting offset of the "next" segment.

Inserting into previously deleted data

Figure 19:
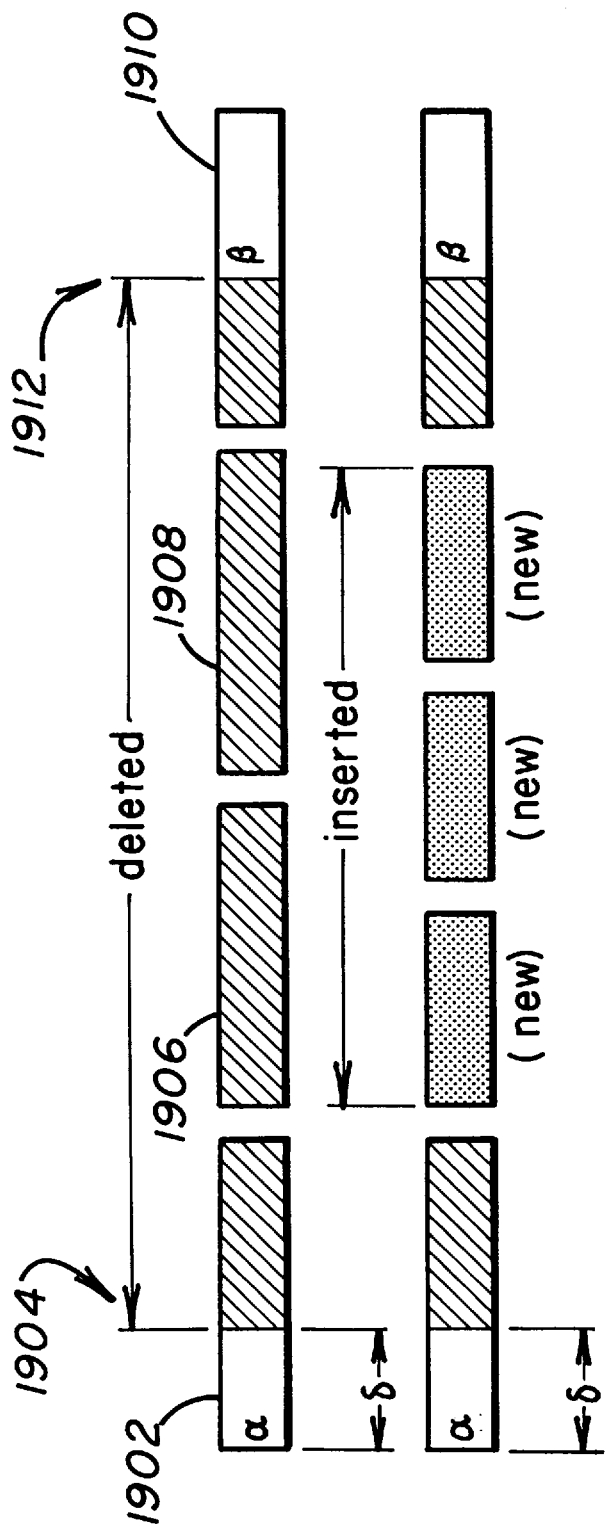

There is nothing prohibiting the user from mixing deletions and insertions. Indeed, the implementation of overwritten data is done as a delete followed by an insert. FIG. 19 illustrates a set of value segments in which a delete is done and then a series of inserts. In the illustrated example, an original data portion of four segments was involved in a delete; the right portion 1902 of a segment 1904 starting at $\alpha+\delta$, two whole segments 1906 and 1908, and the left portion 1910 of a fourth segment 1912. The logical offset of the right portion of the fourth segment has been computed to start at $\beta$. After the deletion, three new segments have been inserted at offset $\alpha+\delta$.

Determining this situation at close time is basically an extension of the previous computations. Remember, that the basic scheme of determining deletion is to see if the "next segment" has the expected logical offset based on the previous segment's logical offset and length. The reason "next segment" is quoted is that it is the key to extending the algorithm to the more general case of combining deletions with insertions. In particular, "next segment" now refers to the next old segment, no matter how many segments away it is.

Note, that the math is still the same for the above case. In the above diagram, the "next segment" is expected to start at $\alpha+\delta$. But it (the next old segment) starts at $\delta$, before or after the insertion.

The insertion is still determined as described previously. New segments are insertions and the insertion point is determined based on the logical offset and size of the preceding segment.

The trick to combining these two events is simple; always apply the rules for deletion before insertion.

Note, it doesn't matter whether the original operations were an insert and then a delete, or a delete and then an insert. It still comes down to new segments sprinkled among the old ones. Since old data must be potentially removed prior to inserting new data in its place, the delete has priority over the insert.

Converting immediates to non-immediates

Immediate data is a single value segment that was initially created as immediate because the data fit into four bytes. The data is placed directly in the value segment (and hence the TOC) in place of a data offset to the data. Any editing operations that cause that data to become greater than four bytes causes a conversion to non-immediate, i.e., a standard data segment that contains an offset to the data. The data is written to the container, and the offset set to point to it. Once converted to a non-immediate it is never converted back.

During updating, editing an immediate is considered as a "touch" just like any other; a touched list entry for the object "owning" the value is created. As just stated, the conversion may or may not take place. If it doesn't, then at close time, the updating instructions for the value consists of just the entire immediate value itself. It doesn't matter what was inserted or deleted. Only the final result is important. When read in, the updating instruction will be to replace the old immediate with the new updated value.

If, however, the data is converted to a non-immediate, then that data will be written to the updating container. It is then considered as a new value data. At close time, what is seen is a value, all of whose segments (all one of them), have been replaced by a new value. It looks exactly as if a delete was done on all the data and then replaced, or equivalently, as if an overwrite was done of all the data (which also is done as a delete/insert sequence). That being the case, no special action needs to be taken for a converted immediate. The delete/insert updating instructions will be appropriately generated at close time. At open time, it is unnecessary to know that the delete/insert updating instructions actually resulted from the conversion of an immediate value to a non-immediate value.

Deleting a value

Deleting a value involves freeing all the value segment memory. The value header itself is moved to a "deleted values" list and never freed. This is done to make sure the user does not try to reuse a value refNum for a deleted value. Value headers on the "deleted values" list are all flagged as "deleted" so that this check can be done.

In addition, for updating, when a value (header) is deleted . . .

(1). If the value has not been moved, create or modify the value's touched list entry to "deleted value".

(2). If the value has been moved in from another object, use the back pointer in the "inserted" touched list to modify the "removed" entry to "deleted value" and delete the "inserted" entry. If there is no "removed" entry (the value was moved back to or within its original object), just change the "inserted" entry to "deleted value".

Thus, when a value is deleted, the touch list entry of its original location (i.e., prior to any moves) is marked as "deleted" and there are no other touched list entries for the value. The value is moved to the "deleted values" list and is no longer part of the object. But the pointers connecting the touch list entry and its corresponding value header (they point to each other) are still valid.

Deleting a property

Properties can be deleted in two possible ways; (1) implicitly by deleting all the values for a property, and (2) explicitly doing a CMDeleteObjectProperty( ). For updating purposes, only the explicit case need be considered. The implicit deletion will happen as a byproduct of value deletions.

In addition, for updating, when a value (header) is deleted . . .

(1). Create a "deleted property" touched list entry.

(2). All the value headers for property are moved to the "deleted values" list and marked deleted. Any corresponding touched list entries for these values are freed. As an example, if only the values for one property were touched in an object, all that would remain in the object's touched list would be a single "deleted property" entry.

Explicit property deletion touches are different from touches of explicitly deleted values in that no single value is involved explicitly in the property delete. The values are, however, implicitly involved to the degree that all values are deleted from the property (and the value headers put on the "deleted values" list).

Implicit value deletion is essentially a subset of the explicit deletion case. The difference between deleting an individual value, and deleting a value when its property is going to be deleted, is that a "deleted value" entry is created in the individual delete case, while the touched list entry is always freed in the property value delete case. What both have in common, however, is that "removed" entries in other objects for values that were moved into the property being deleted are set to "deleted value".

Thus all the touched list entries for the values belonging to the property are deleted from the touch list. Any values moved into this object from other objects also have a "removed" touched list entry in their original object. Deleting such values for the property has exactly the same effect as explicit value deletion, i.e., the "removed" entry is changed to a "deleted value" entry in the original object. The "inserted" entry is, of course, removed.

Note, that values previously moved out of the object containing the property being deleted have "removed" touched list entries of their own in this object. Thus, there still could be "dangling" "removed" entries on this object's touched list; dangling, because no value header of the property being deleted points to it—the value header has been moved out! These must remain in the normal course of move handling. However, they are handled appropriately when the entire object is deleted.

Deleting an object

Deleting an object means all its values and properties are deleted. Objects can only be explicitly deleted using CMDeleteObject( ). Deleted objects are placed on the "deleted objects" list and marked deleted to prevent the user from further use of them.

When the object is moved to the "deleted objects" list, it carries its touched list along with it, but the list is modified as follows . . .

(1). The entire touched list is removed except for "removed" entries for values previously moved out of this object.

(2). If there was no touched list, then the object was never touched, so make sure it is on the touched chain.

The "removed" entries are kept because there are references to these entries from "inserted" entries from the other objects (touched list) to where the values were moved. If a moved value is itself deleted after the object it came from is deleted, then the back pointer in its "inserted" entry must be kept valid so that the "removed" entry it points to can be changed to a "deleted value". Although this "deleted value" is on a touched list of a deleted object, it won't cause harm, since the final walks of the touched chain know to expect this.

Deleted objects are moved to the deleted objects list and flagged as deleted. This is done to protect against the user reusing the refNum after the delete. Thus an object on the touched chain, but flagged as deleted, is enough to indicated to close-time processing what is going on. The remaining touched list "goes along for the ride".

Changing Base Types

Base types for dynamic values are recorded as an "array" of base type object IDs. The array is stored as immediate value data segments for a special "base type" property of the parent global name object. Being immediates, they are treated for updating purposes much like a standard immediate case; a touched list entry for the (global name) object "owning" the base type value is created.

The reason these are treated specially at all is that updating of base types, like immediates, implies recording the entire base type array just like a single immediate is recorded. But these are not normal immediates. They are an array of value segments, and thus must be uniquely treated.

Given the above, it is useful to define certain terminology for the present patent application. As used herein a thing (e.g. a container, an object in the container, a property of an object, a value of a property, or value data) is "modified" when the contents of the thing, or the contents of something that the thing refers to, is changed. For example, the "modification" of a container can involve one or more of the following: insertion of an object into the container, deletion of an object from the container, modification of an object in the container, and so on. "Modification" of an object can include one or more of the following: insertion of a property into the object,. deletion of a property from the object, or modification of a property of the object, and so on. "Modification" of a property can include insertion of a value into the property, deletion of a value from the property, modification of a value (header) of the property, and so on. "Modification" of a value (header) can include moving the value, setting the value type, changing the value base type, modifying the value data, and so on. "Modification" of value data can include insertion of new value data, deletion of existing value data, overwriting existing value data with new data, converting immediate value data to non-immediate value data, and so on. The term "updating" as used herein has the same meaning as "modifying", except that the term "updating" lacks any implication that the changes are made to the thing itself. For example, update containers in persistent storage identify changes to be made to information in their respective target containers when the update container is opened. The update container in persistent storage does not contain the actual information in the target container, as modified, but merely contains instructions on what modifications to perform to bring the information as represented in the target container up to the state represented by the update container. In temporary storage, on the other hand, as an application program changes information represented in an open container, those changes may actually be made in the temporary version of that information. Thus in the presently described embodiment, updates are represented in persistent storage as a series of change instructions, whereas they are represented in temporary storage as actual modifications.

C. Close-time Processing

At close time the following items are written to the container in persistent storage and in the order of the steps listed:

(1). The global names "private" to the updating container.

These are global names generated prior to connecting a new updating container to its target. They are known only to the updating container and kept in a separate TOC. Opening updating containers and connecting them to their targets is discussed later.

Global names are maintained in memory while a container is open and not written out until now. They go out as normal data to the container and their in-memory TOC entries set to point to them. At this point these objects look like any other.

(2). New global names.

These are new global names generated during this updating session. Again they become normal data in the container.

(3). The "update" list.

These are the updating instructions that open-time processing will need to bring the old objects to the state they have at the time of this close. The instructions are generated by walking the touched chain of objects and the touched list entries for each object. Further, as each object's touched list is processed, a new "updating property" is created for that object. It is set to contain a single value whose data is the updating instructions for all the values of that object.

The following updating instructions are generated (i.e., written to the container) for each touched object:

removed value touched list entry created from a move of a value inserted value touched list entry created from a move of a value set-infoed value touched value header flagged as changed type and/or generation data delete touched value header flagged as being edited data insert touched value header flagged as being edited replaced immediate touched value header flagged as edited and immediate replaced base types touched list entry created from updating base type(s)

delete value touched list entry created from a delete value

Note, that all the above updating instructions only deal with values. The touched list entries for deleted properties as well as deleted objects on the touched chain are not generated during this initial walk of the touched chain and lists. The deleted objects and properties are generated as separate updating instructions after all value updating has been done (in step (4)). This is because, at open time, such deletions are processed separately. Thus they are grouped separately.

The reason object and property deletions cannot be mixed is that all the above updating instructions refer to the original OPT "address" of these values. If an object or property is deleted, all touched list entries for the values involved are deleted. For deleted objects, there is no touched list. For deleted properties, there is only the "deleted property" touched list entry for that property. If a value is going to be deleted there is no sense doing anything else to it. But, if a value is moved and then its original source location (property or object) deleted, all the updates to that value better have been done before it is moved. Thus object and property deletions are delayed at open time until after the value updates. This becomes the next step (4).

Before discussing that step, it must be pointed out that no order dependence is imposed on the value updates. In particular, it does not matter which order the source or destination of a moved value are processed.

As mentioned above, each object has its own updating lists for all the values of that object in the special updating property value. When the object is accessed at open time, all such updates will be applied. This is done to allow for the possibility of other implementations of the Container Manager API using random access techniques directly to the container rather than an all in-memory TOC implementation described here.

Remember that when an old value is moved, a "removed" touched list entry is created at the original source, and an "inserted" entry at the destination. Thus a random access implementation could see the source and destination in either order. If the "removed" is seen first, it can do that. The "insert" simply accesses the old value from the container when the destination object is processed. Conversely, if the "insert" is seen first, it can do that. Then when the "remove" is seen the value is just not added to the object.

In the present implementation, where the entire TOC is loaded into memory, the "removed" entries are ignored. At open time the "insert" is treated as a move operation.

(4). The "deleted objects and properties" list.

As each touched object is visited on the touched chain (step (3) above), all touched list entries dealing with the values are deleted from their touched lists (the memory for the touched list items has to be freed anyway). If there are no more touched list entries after all the value entries were processed, the object is removed from the touched chain.

Thus, after an object's touched list is processed for values in step (3), all that will remain on the touched chain are deleted objects, and non-deleted objects with "deleted property" touched list entries. All that needs to be done is to walk the chain again.

During this walk, all the deleted objects and deleted property touched list entries generate appropriate delete updating instructions. The processed touched list entries are removed. All deleted objects and touched chains will become empty are therefore removed from the touched chain. Thus, at the end of this second walk, the touched chain ceases to exist and all the touched list memory is freed.

The delete update instructions are generated as data just like the value updating instructions. But this time the data is for a special property of the private TOC #1 object (the "private" TOC is discussed in the open-time processing description). When the updating TOC is open to apply the updates, the open-time processing will know how to get at the deleted objects and property instructions.

(5). The private TOC.

The TOC for the updating container is generated in this step. This TOC is kept separate from the target TOC that contains all the updates generated during the session. As discussed in open-time processing below, the updating container must keep its TOC separate from the updates since there is the potential for duplicate object IDs.

(6). TOC for new values for old objects and new values for new objects.

In this step the entire (non-private) TOC is walked. All new values cause a TOC entry to be generated. Since all old objects have IDs less than the "min seed", they will come out first. Then the new objects will follow. Both of these can be done in a single TOC walk. All these TOC entries will merge with the target TOC at open time to put back these new values.

(7). The container label.

The container label is written last as a mechanism for achieving atomicity of the update. Before the container label is written, a container in persistent storage will not be recognized as a valid Container Manager container. Only after the label is written is the container considered valid.

This mechanism operates also where the update container is appended to its target container rather than being in a separate file. In this situation, the Container Manager begins writing the update container information only after the label for the target container. Thus until the update container label is written, the last label in the file is that belonging to the target container (which, of course, might itself be a prior update container to its own prior target container). Should a failure occur before the Container Manager writes the label for the update container, then the next time the file is opened, the Container Manager will find only the target container label. If any of the update container information was actually written to persistent storage prior to the failure, it is ignored in this subsequent invocation since it is not terminated by a valid label.

D. Updating Container Layout in Persistent Storage

Figure 20:
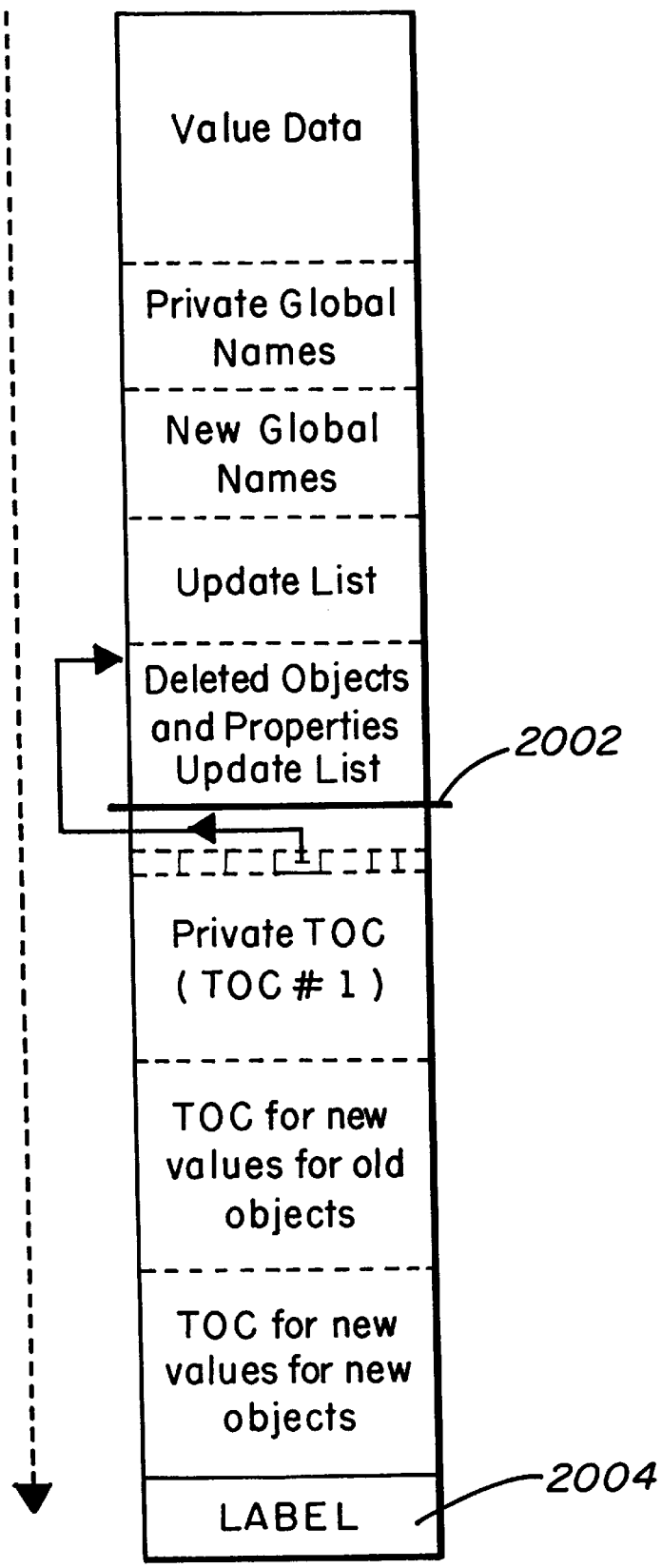
FIG. 20 illustrates major structures of an update container in persistent storage.

Given the above sequence of events ate close time, FIG. 20 illustrates the general organization of an updating container in persistent storage. All the information above the heavy line 2002 is just data accessed via TOC entries. All the information below the line are the TOC entries with the label 2004 at the end of the container.

Note, it does not matter whether this is a separate container updating its target or an appended container updating a target. In the appended case, there may be other "containers" contiguously above this one. As discussed later, TOC #1 has a special "pointing value" that allows access to the target be it appended or separate. The arrow in the diagram is meant to suggest this.

E. Updating Instructions

Close time processing generates two separate groups of updating instructions: those updating all the values for a single object and those for deleting objects and properties.

Instructions updating all the values for a single object. In other words, each object that is to be updated has its own special "updating property" created for that object. It is set to contain a single value whose data is the updating instructions for all the values needing updating in that object.

The value updating instructions are generated using the following sequences:

<new prop>P T <v>[params . . . ]

$$\left[\left\{\begin{array}{l}\text{<new } prop \text{> } PT \text{ <v> } [params \ldots ]\\ \text{<new type> } T \text{ <v> } [params \ldots ]\end{array}\right\}\right] \ldots$$

<end> where <new prop>=NewProperty control byte

P, T=property and type IDs (4 bytes each)

<V>=value update control byte (see below)

params . . . =parameters as a function of <v>(see below)

<new type>=NewType control byte

<end>=EndUpdates control byte to mark the end of the updating sequence

Figure 21:
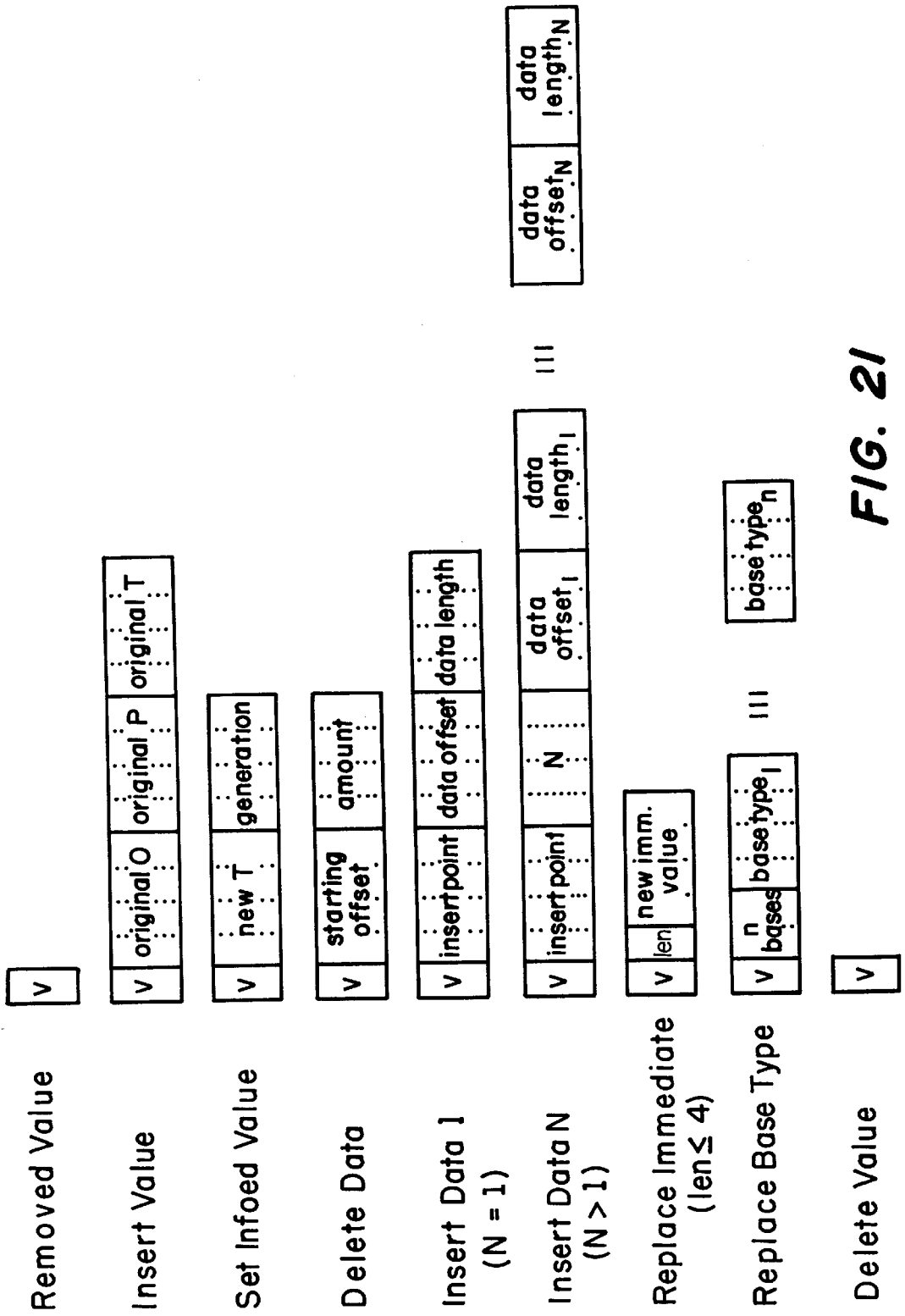
FIG. 21 describes the structure of value updating instructions.

<v>[params . . . ]=specific value update sequences with the descriptions set forth in FIG. 21.

Brackets mean optional, ". . . " means repeating sequences of the preceding, and braces mean alternatives.

In FIG. 21, <v>is the control byte defined by the name at the left, and is the code in the first byte of the layouts, whose following bytes correspond to the <params> . . . . Each small division represents one byte in the value sequences.

What the sequence does is generate "<v>[params . . . ]" for every value update. However, only the P is generated as new properties are encountered in the touch list for the current object. The object need not be specified since this set of instructions is just the instructions dealing with one object. Remember, the instructions are value data for a value belonging to the special "updating" property of the object.

All this encoding is done to minimize generated data space for this stuff but still make it easy to interpret at open time. Thus NewProperty implies a PT immediately follows. NewType implies only a T follows. This can happen when sequences of touches for an object all refer to the same property. This is not the absolute minimum generation, however, since touch list entries are not sorted by property.

The way to view a complete value update sequence, i.e., "<new prop>P T <v> [params . . . ]" or "<new type> T <v>[params . . . ]" is that the "<v>[params . . . ]" act upon their receiver, i.e., the "owning" object. It's sort of like a postfix notation.

Note also that more that one sequence may be generated for a specific value. Thus the [params . . . ] definition is recursive, and can be followed by "<v>[params . . .]" sequences. Indeed, the only two cases that can't be combined are "removed" and "deleted" values.

Instructions to delete objects and properties accessed as value data from a special property of TOC #1. These instructions are generated in the following general sequences:

$$\left\{\begin{array}{l}\text{<del obj> O}\\ \text{<del prop1> O P [<del prop2> P]} \ldots\end{array}\right\} \ldots \text{<end>}$$

where <del obj> = DeleteObject control byte
O, P = object and property IDs (4 bytes)
<del prop1>= DeleteProperty1 control byte
(property for another object)
<del prop2>= DeleteProperty2 control byte
(property for the same object)
<end> = EndUpdates control byte to mark the end of the updating sequence What this sequence does is generate "delete object" or "delete property" for a new (<del prop1>) or the same (<del prop2>) object.

F. Updating Instruction Handlers

The handlers for writing and reading the above update instructions are the same handlers used for TOC I/O. These handlers don't actually do any I/O. They only format and extract 1, 2, and 4 byte data. The above layouts represent a compromise between efficiency, space, and to make it reasonably easy to write handlers while hiding the specifics of the layout from the handler writer. The handlers, of course, are needed because internal data (bytes, words, and longs) must be read and written from and to the container. To be portable, a handler must be provided to potentially convert 1, 2, and 4-byte entities.

The handlers have the following definitions:

void extractData_Handler(CMRefCon refcon,
  CMDataBuffer buffer, CMSize size,
  CMPrivateData data);

void formatData_Handler(CMRefCon refcon,
  CMDataBuffer buffer, CMSize size,
  CMPrivateData data);

These handlers are used to extract or format internal container data. 1, 2, or 4 bytes (8-bit bytes) "chunks" of data are expected to be copied between a buffer and the data. Pointers to the data and the buffer are passed. The buffer can always be assumed large enough for the data. The pointer to the data can be assumed to point to a CM_UCHAR if size is 1, CM_USHORT if size is 2, and CM_ULONG is size if 4.

The 1, 2, or 4 bytes are, of course, stored within the CM_UCHAR, CM_USHORT, or CM_ULONG as a function of the architecture. These may be a different size than what is expected to be written to the container.

Repeated calls to these handlers are done to manipulate the updating instructions. It's not the most efficient mechanism, but as previously stated, it's a compromise. To aid in the efficiency, buffered I/O is done. Note that updating instructions are all value data for a single value: a value for the special updating property of an object to be updated, or a value for the special TOC #1 property. The data is actually read or written using the standard API calls to CMReadValueData( ) and CMWriteValueData( ). Thus the updating code controls the buffer, its size, and the starting offset; the parameters to the CMReadValueData( ) and CMWriteValueData( ).

The handlers are defined only to move data to and from a buffer location (not by accident). Thus the code buffers the updating information and calls CMReadValueData( ) or CMWriteValueData( ) only when needed. The buffer size is defined in a header file as UpdateBufSize.

Note that this same buffered I/O is supported for TOC I/O as well. In that case the I/O is done directly through the I/O handlers instead of API calls to CMReadValueData( ) and CMWriteValueData( ), but the buffering algorithms are the same. The moving of data between the buffer and the container (TOC fields in this case) utilize the same handlers described above.

Unlike updating buffering, TOC buffering is optional. This is because buffering may be performed by the I/O handlers. A header file controls this by defining the input and output TOC buffer sizes (TOCInputBufSize and TOCOutputBufSize, respectively). Defining either or both of these as 0 turns off the corresponding TOC buffering through routines supplied with the Container Manager.

G. Open-time Processinq

The following lists the steps involved in opening a new container for updating a target. These steps are performed when an application program calls CMOpenNewContainer with flag kCMUpdateTarget or kCMUpdateByAppend. Opening an existing updating container for reading (using CMOpenContainer) is almost the same, but where opening creates things, reading just uses it.

(1). Allocate a Container Control block (the "CCB") for the new updating container.

A new container can be opened for appending or as a separate updater. Opening for append is basically the same as opening a data file for converting from raw data to Container Manager format. In both cases, the intent is to append a TOC to the end of the "data". For converting, the data is generally truly data, with the TOC generated by the API user calling CMDefineValueData( ). For updating, the target container is viewed as "raw" data too. It's just the TOC will be built a different way.

The TOC that is created for the CCB is referred to as the "private TOC". That is because it will contain objects known only to the updating container. Also, these objects may have object IDs that are the same as the target's and must be kept distinct. TOC #1, for example, is the same object ID.

New updates, for new or old values, must be written to the updating container using its handlers. Editing can cause new and old values segments to mix. The owning CCB pointer is the way the new segments are distinguished from the old ones. Also, if an entire new value is created, the new value header is given the pointer to the updating CCB. This is the way new and old values are detected (new objects have IDs greater than the "min seed"). Essentially, each value header and segment is "branded" with its owning container.

As discussed later, updating may involve multiple layers of containers. This means that the TOC will have various values (segments and headers) "branded" with their respective containers (there is only one TOC in use as discussed in step (4)). As previously mentioned, this allows the proper handlers to be used to access the associated value. But, with multiple layers, or even when there is a single updater updating a target, there must be some way to get at the updating container (control block—the only one opened for writing and whose refNum is returned to the user) no matter which container the "branding" happens to point to.

The CCB field to do this is the "updatingContainer". It will always point to the first (top-most) updating container (control block), which when opening a new updater, will be that container, the only one opened for writing, and whose refNum is returned to the user. The updatingcontainer is initialized to point to its own container. When a target is opened, which is what's being described here, the updatingcontainer field is "pulled down" from its parent (its updater). As each updater opens its target, the net effect will be to set all the updatingcontainer fields of all the target containers to point to the initial (top-most) updater.

(2). Create the "pointing value".

This is a value for a special property of private TOC #1 that points to the target container. For a separate updater, this will be a dynamic value. For appended, it is much like an embedded container value. In either case, the "pointing value" is used to "get at" the target container. The end result of this step is to produce two CCBs and two TOCs; one for the updater and one for the target.

Note, that in the separate container case, the mechanisms for the normal creation of a dynamic value are used. This means types and any other objects may be created in the process of creating the dynamic value. However, there's a "chicken-and-egg" problem here with respect to object IDs. The dynamic value needs to be created along with all its associated objects to get at the target, but the initial ID seed, from which we would normally want to start assigning new object IDs for these objects, can't be determined until that target is opened.

The initial seed, called the "min seed", is that starting ID value that is used to assign object IDs to new objects. It is the next available ID from the target. But that can't be known until the dynamic value is created and the target opened. It is too hard to go back and change every object (and only those objects) involved with the dynamic value creation. Hence the concept of the "private TOC" and non-private TOC.

(3). Open the target container.

For a separate updater, the target container is opened "normally" for reading using the type associated with a special handler package (TargetContainerHandlers.[ch]) that does all its I/O through the dynamic value. Actually, the handler package only supports reading, since targets are only opened for reading. With the dynamic value, the separate target is read indirectly using the dynamic value's handlers. Following opening the target, it must be "connected" to the updating container. This is step (4).

For an appended container, the target container must also be opened. But being the same container as its updater, it is effectively being opened again, but this time only for reading. As with the dynamic value case, the target is opened with a type associated with the same special handler package used for dynamic values. Since that handler package does all its operations in terms of the pointing value, in this appended case, it will work its way to the handlers associated with the updating container itself. With both CCBs created, the two are ready to be "connected".

As part of opening, only the private TOC of the target container is read. This only has meaning if the target is itself an updating container. If it is not, and it won't be if it is the lowest-level target, all of its TOC gets loaded. Multi-layered updates are discussed later, after the description of the basic mechanism involving just two containers. What's important here is that an updating container TOC generally consists of a private part and non-private part, with the non-private part being new values to be added to the target. It is that portion that is not yet read when the target is itself an updating container.

(4). Connect the target to its updater.

In this step the updating container must be prepared for using the TOC and global name table of the target. Up to this point the updating container has basically been opened "normally" like any other. It has its own TOC and global name table. But the CCB refNum that will eventually be returned to the user will be the one for the updating container, so the target's TOC and global name table must be inherited by the updating CCB.

The way the updating container gets to use the target's TOC and global name table is simply to copy the target's TOC and global name table pointers into the updating container CCB. But the pointers to the tables already there can't simply be clobbered. They must be preserved as the private TOC and global name table pointers.

Thus each CCB has two pairs of pointers; the "normal" TOC and global name table pointers used by everyone, and the "private" pair mainly used by close-time processing.

One other pointer is inherited. That is a pointer referred to as the "target container pointer" (targetContainer). It is a CCB pointer copied from the target. It is always initialized to point to its own CCB. Thus if "A" updates "B", both "A" and "B"s targetcontainer will point to "B". This pointer is used for container refNum validity checks in the various API routines. It is the opposite of the updatingcontainer pointer mentioned in step (1). updatingContainer points to the top-most container, and targetcontainer the bottom-most (final or ultimate target).

(5). Load in updater's non-private TOC

If this is a previously existing updating container opened for reading, then it is at this point all the updates from the updating container are applied to the target. The non-private portion of the updating container's TOC was loaded first in step (3). Since the normal TOC is now the target's (connection has been made in step (4)), the remainder of the updater's TOC (the non-private part) is read. This contains the new values for old object and new values for new objects. They are simply added to the (now common) TOC.

During loading of this non-private updating TOC, the special "updating" list properties for the objects they update will be encountered. As discussed for close-time processing, these will be value operations (set-infos, data edits, moves, etc.). The value data for such a property are all the updating instructions needed to bring all the values the associated object "up to date". These instructions cannot be applied until the non-private TOC is fully read in because there could potentially be forward reference to other objects (e.g., for moves). So, if the special "updating" property is encountered for any object during loading, that object is placed on the touched chain, whose real use is for remembering who got touched during new updating. But that's after all opening is completed, so it can overloaded and used here.

(6). Apply the value updates.

A touched chain was built in step (5) of all objects containing the special "updating" property. The mechanism used to build the chain is identical to that used when recording new updates. The head of the chain is in the updating CCB. After reading in the non-private TOC, the touched chain will represent all objects needing updating.

The touched chain can now be walked much like close-time processing to process the updating instructions associated with the "updating" property of each object on the chain. Also like close-time processing, objects on the touched chain are removed from the chain after each updating list is processed. The object's "updating" property is also removed. Thus after the chain is walked, the chain is empty and the updating properties no longer exist. This puts the in-memory TOC back to its initial state ready to record new updates.

Note, that while loading the TOC entries into memory, the logical size and offsets are generated for the value headers and segments. Applying updates at this time changes the logical sizes and offsets. Thus, after each value's updates are completed, if the updates involved data editing, the value must be "re-logicalized".

It should also be pointed out that during this time, recording of updates is suppressed. It stays suppressed until the end of all open processing. This has to be done because the applying of the value updates can utilize API calls to move and edit values. Referring to the update instruction layouts described earlier, it can be seen that these instructions have parameters that can be directly used in many of the corresponding API calls. If update recording wasn't suppressed, a loop condition would result, with objects being added to the touched chain as fast as they are processed.

(7). Apply object and property deletions.

After the TOC is loaded and value updates applied, the remaining delete object and property updating instructions can be processed using the special TOC #1 property of the container's private TOC.

At this point the target and the updating container have been opened. The updater's CCB pointer is returned to the user as the container refNum. The diagram of FIG. 22 illustrates the pertinent data structures discussed above. In the example of FIG. 22, "A" is updating "B". CCB "A" 2202 has its private TOC and global name table pointers 2204 and 2206. The normal TOC and global name table pointers are pointing at the target's. Both sets (2212, 2214, 2216 and 2218) for the target point to the same tables.

Since "A" is opened first, then "B", the close-time processing reverses this by closing "B" then "A". In order to prevent the closing of "B" from "pulling the rug out" from under "A", since it is using "B"s tables, use counts are maintained for the TOC and global name tables. This prevents premature release of the data.

H. Open-time Processing for Multi-layered Updaters

The previous discussion was mainly limited to one container updating another. It is fairly simple extension to the algorithm to allow for multiple updaters. Multiple updaters arise if a new container is opened for updating a target in multiple sessions.

For example, the above situation was "A" updating "B". When closed, "A" contains the updates to "B". If reopened for reading, those updates will be applied and the state is the same as when "A" was originally closed. On the other hand, there is nothing preventing another new updating container from being opened, say "X", and using "A" as its target; "X" updating "A " updating B"—a multi-layered case.

The process is the same, except for one variation in step (3) of the open-time processing; opening of the target container. Basically, as part of standard open-time processing, a check is always made to see if TOC #1 has a "pointing value". This only exists in updating container TOCs and allows access to the proper target, be it separate or appended.

If the pointing value is there, it is used to open that target. The process repeats, recursing "down" until the original target is found, i.e., one with no pointing value. As the recursion "unwinds" in step (3), each updater is connected to its target. The net result is all the private TOC and global name pointers are "squirreled" away in the respective updating TOCs and all the standard TOC and global name table pointers point to the final (deepest) target.

After CMOpenNewContainer or CMOpenContainer return to the application program, a TOC is present in memory that is indistinguishable from that of an ordinary, non-update container, except that some of the values refer to data actually present in other containers. Each of the containers in the update chain remain open so that value operations can reach the data.

I. Other Routines

Appendix D, not printed is a C-language header file for routines which read and write the container TOC. Appendix E, not printed sets forth the routines themselves. Appendix F not printed, is a C-language header file for a set of basic container handlers, and their metahandler, used by the Container Manager when doing update operations on a target container. Appendix G, not printed sets forth the handlers themselves.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. As one example, an embodiment may permit an update container to be an update of two or more target containers concurrently. As another example, an implementation of the routines may construct only those aspects of the TOC in-memory which are needed for a particular operation after an update container is opened. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

We claim:

1. A method for updating information from a first persistently stored information state to a second persistently stored information state, said information being represented in said first information state by a target container containing a plurality of objects, comprising the steps of:
   determining container changes sufficient to modify said first information state to said second information state;
   committing said second information state by, at least in part, persistently storing, in a structure logically separate from said target container, an update container including objects identifying all of said container changes, such that said first information state remains readable without requiring application of change records relative to said second information state; and
   including a table of contents (TOC) in said update container that includes information about every object in the update container.

2. A method according to claim 1, wherein said step of persistently storing comprises the step of persistently storing change instructions in said update container.

3. A method according to claim 1, wherein said container changes include insertion of a new object, and wherein said step of persistently storing comprises the step of persistently storing said new object in said update container.

4. A method according to claim 1, wherein said container changes include deletion of a particular object from said target container, and wherein said step of persistently storing comprises the step of persistently storing in said update container an object identifier persistently associated with said particular object.

5. A method according to claim 1, wherein said container changes include a plurality of deletions of particular objects from said target container, and wherein said step of persistently storing comprises the step of persistently storing in said update container a list of object identifiers persistently associated with said particular objects.

6. A method according to claim 1, wherein said container changes include modification of a particular object in said target container from a first object state being its state in said first information state, to a second object state being its state in said second information state, and wherein said step of persistently storing comprises the step of:
   persistently storing in said update container an object identifier persistently associated with said particular object; and
   persistently storing in said update container in correspondence with said object identifier, an identification of object changes which would be sufficient to update said particular object from said first object state to said second object state.

7. A method according to claim 6, wherein said particular object in said first object state includes at least one value identifying value data, wherein said object changes include modification of said value data from a first value data state being its state in said first object state, to a second value data state being its state in said second object state, and wherein said step of persistently storing an identification of object changes comprises the step of:
   persistently storing in said update container in correspondence with said object identifier, an identification of said value data in said particular object, and an identification of value data changes which would be sufficient to update said value data from said first value data state to said second value data state.

8. A method according to claim 6, wherein each of said objects in said target container includes at least one value header designating value data, and wherein said step of persistently storing an identification of object changes comprises the steps of:
   writing to said update container as new value data, change instructions sufficient to modify the value data of said particular object from a first value data state to a second value data state; and
   writing to said update container a change instruction calling for said new value data to be inserted into said particular object.

9. A method according to claim 1, wherein said container changes stored in said step of persistently storing include no changes which are in excess of those sufficient to update said information state to said second information state.

10. A method according to claim 1, wherein said target container is stored in a first file, and wherein said step of persistently storing an update container comprises the step of storing said update container in a second file distinct from said first file.

11. A method according to claim 1, wherein said target container is stored in a first file, and wherein said step of persistently storing an update container comprises the step of appending said update container to said first file.

12. A method according to claim 1, wherein said step of determining container changes comprises the steps of:

representing said first information state in non-persistent storage;

manipulating said information in non-persistent storage using at least orne change steps said second information state being defined by the state of said information after said step of manipulating; and subsequently to said step of representing, recording at least all non-superfluous ones of said change steps, said container changes beina the change steps recorded in said step of recording.

13. A method according to claim 12, wherein said target container comprises a prior target container and a prior update container, said prior target container representing said information in a prior information state, and wherein said step of representing said first information state in non-persistent storage comprises the steps of:

using said prior target container to represent in non-persistent storage said prior information state; and manipulating said information in non-persistent storage in response to change steps identified in said prior update container.

14. A method according to claim 1, wherein said step of persistently storing comprises the steps of:

writing change instructions to said update container; and subsequently writing to said update container an indication that said update container is valid.

15. A method according to claim 14, wherein said change instructions include a first change instruction to be executed, and wherein said step of subsequently writing comprises the step of writing to said update container a label identifying said first change instruction.

16. A method according to claim 1, wherein said step of determining container changes sufficient to modify said first information state to said second information state comprises the steps of:

producing a temporary representation of said information in said first information state in unstable storage in dependence upon said target container;

modifying said temporary representation of said information in said first information state to produce a temporary representation of said information in said second information state in unstable storage;

determining said container changes from said temporary representation of said information in said second information state in unstable storage.

17. A method according to claim 1, further comprising the steps of:

determining second container changes sufficient to modify said first information state to a third information state; and committing said third information state by, at least in part, persistently storing, in a structure logically separate from said target container and from said update container, a second update container identifying all of said second container changes, such that said first information state remains readable without requiring application of change records relative to said second or third information state, and such that said second information state remains readable without requiring application of change records from said second update container.

18. A method according to claim 1, wherein:

said target container is persistently stored on a first medium; and said step of persistently storing an update container comprises the step of persistently storing said update container on a second medium different from said first medium.

19. A method according to claim 18, wherein said first medium is a read-only medium, and wherein said second medium is a read/write medium.

20. The method according to claim 1, wherein:

said TOC is maintained logically separate from said container changes; and all format information about every object stored in said update container is maintained in said TOC.

21. The method according to claim 20, wherein the format of each object stored in said update container is different.

22. A method according to claim 20, wherein said container changes include modification of a particular object in said target container from a first object state being its state in said first information state, to a second object state being its state in said second information state, and wherein said step of persistently storing comprises the step of:

persistently storing in said update container an object identifier persistently associated with said particular object; and persistently storing in said update container in correspondence with said object identifier, an identification of object changes which would be sufficient to update said particular object from said first object state to said second object state.

23. A method according to claim 20, wherein said step of determining container changes sufficient to modify said first information state to said second information state comprises the steps of:

producing a temporary representation of said information in said first information state in unstable storage in dependence upon said target container;

modifying said temporary representation of said information in said first information state to produce a temporary representation of said information in said second information state in unstable storage;

determining said container changes from said temporary representation of said information in said second information state in unstable storage.

24. A method for preparing information from persistent storage for further processing in temporary storage, said information being represented in said persistent storage in both a first information state and a second information state, comprising the steps of:

accessing a persistently stored target container representing a plurality of objects which identify said information in said first information state;

producing a first temporary representation of said information in said first information state in dependence upon said target container;

accessing a persistently stored update container identifying container changes which are sufficient to modify said information from said first information state to said second information state, including the substeps of, accessing a table of contents (TOC) containing format information of the container changes, and utilizing the format information to determine said container changes;

applying said container changes to said first temporary representation of said information to form a temporary representation of said information in said second information state; and producing a second temporary representation of said information in said first information state in dependence upon said target container, said second temporary representation of said first information state existing simultaneously with said temporary representation of said second information state.

25. A method according to claim 24, wherein said step of accessing a persistently stored target container comprises the steps of:
    accessing said persistently stored update container to obtain a reference to said target container; and
    accessing said target container in response to said reference.

26. A method according to claim 24, wherein said step of producing a first temporary representation in dependence upon said target container comprises the steps of:
    accessing a persistently stored prior target container representing a plurality of objects which identify said information in a prior information state;
    producing a prior temporary representation of said information in said prior information state in dependence upon said prior target container;
    accessing a persistently stored prior update container identifying prior container changes which are sufficient to update said information from said prior information state to said first information state; and
    applying said prior container changes to said prior temporary representation of said information.

27. A method according to claim 24, further comprising the steps of:
    modifying said information in temporary storage to produce a third information state for said information; and
    persistently storing a second update container identifying container changes which would be sufficient to update said information from said second information state to said third information state.

28. A method according to claim 24, wherein said information is represented in persistent storage also in a third information state, further comprising the steps of:
    accessing a persistently stored second update container identifying second container changes which are sufficient to modify said information from said first information state to said third information state; and
    applying said second container changes to said second temporary representation of said information to form a temporary representation of said information in said third information state.

29. A method according to claim 28, wherein said temporary representation of said third information state exists simultaneously with said temporary representation of said second information state.

30. A method according to claim 24, wherein:
    said step of accessing a persistently stored target container comprises the step of accessing said target container from a first medium; and
    said step of accessing a persistently stored update container comprises the step of accessing said update container from a second medium different from said first medium.

31. A method according to claim 30, wherein said first medium is a read-only medium and wherein said second medium is a read/write medium.

32. A method for manipulating information, said information being represented in a first information state by a persistently stored target container containing a plurality of objects, comprising the steps of:
    determining container changes sufficient to modify said first information state to a second information state;
    committing said second information state by, at least in part, persistently storing, in a structure logically separate from said target container, an update container including objects identifying said container changes such that said first information state remains readable without requiring application of change records relative to said second information state;
    including a table of contents (TOC) in the update container that includes information about every object in the update container;
    subsequently accessing said target container;
    producing a temporary representation of said information in said first information state in dependence upon said subsequently accessed target container;
    accessing said update container; and
    applying said container changes persistently stored in said update container to said temporary representation of said information.

33. A method according to claim 32, further comprising the steps of:
    manipulating said temporary representation of said information using at least one subsequent change step; and
    persistently storing a second update container identifying said at least one subsequent change step.

34. A storage medium carrying a collection of software procedures for updating information from a first persistently stored information state to a second persistently stored information state, said information being represented in said first information state by a target container containing a plurality of objects, said procedures including:
    first computer instructions which determine container changes sufficient to modify said first information state to said second information state;
    second computer instructions which commit said second information state by, at least in part, persistently store, in a structure logically separate from said target container, an update container including objects identifying said container changes, such that said first information state remains readable without requiring application of change records relative to said second information state; and
    including a table of contents (TOC) in said update container that includes information about every object in the update container.

35. A storage medium according to claim 34, wherein said second computer instructions comprise computer instructions which persistently store change instructions in said update container.

36. A storage medium according to claim 34, wherein said container changes include insertion of a new object, and wherein said second computer instructions comprise computer instructions which persistently store said new object in said update container.

37. A storage medium according to claim 34, wherein said container changes include deletion of a particular object from said target container, and wherein said second computer instructions comprise computer instructions which persistently store in said update container an object identifier persistently associated with said particular object.

38. A storage medium according to claim 34, wherein said container changes include a plurality of deletions of particular objects from said target container, and wherein said second computer instructions comprise computer instructions which persistently store in said update container a list of object identifiers persistently associated with said particular objects.

39. A storage medium according to claim 34, wherein said container changes include modification of a particular object in said target container from a first object state being its state in said first information state, to a second object state being its state in said second information state, and wherein said second computer instructions comprise:
   third computer instructions which persistently store in said update container an object identifier persistently associated with said particular object; and
   fourth computer instructions which persistently store in said update container in correspondence with said object identifier, an identification of object changes which would be sufficient to update said particular object from said first object state to said second object state.

40. A storage medium according to claim 39, wherein said particular object in said first object state includes at least one value identifying value data, wherein said object changes include modification of said value data from a first value data state being its state in said first object state, to a second value data state being its state in said second object state, and wherein said fourth computer instructions comprise computer instructions which persistently store in said update container in correspondence with said object identifier, an identification of said value data in said particular object, and an identification of value data changes which would be sufficient to update said value data from said first value data state to said second value data state.

41. A storage medium according to claim 39, wherein each of said objects in said target container includes at least one value header designating value data, and wherein said fourth computer instructions comprise:
   computer instructions which write to said update container as new value data, change instructions sufficient to modify the value data of said particular object from a first value data state to a second value data state; and
   computer instructions which write to said update container a change instruction calling for said new value data to be inserted into said particular object.

42. A storage medium according to claim 34, wherein said container changes stored by said second computer instructions include no changes which are in excess of those sufficient to update said information state to said second information state.

43. A storage medium according to claim 34, wherein said target container is stored in a first file, and wherein said second computer instructions comprise computer instructions which store said update container in a second file distinct from said first file.

44. A storage medium according to claim 34, wherein said target container is stored in a first file, and wherein said second computer instructions comprise computer instructions which append said update container to said first file.

45. A storage medium according to claim 34, wherein said first computer instructions comprise:
   third computer instructions which represent said first information state in non-persistent storage;
   fourth computer instructions which manipulate said information in non-persistent storage using at least one change step, said second information state being defined by the state of said information after execution of said sixth computer instructions; and
   fifth computer instructions which record at least all non-superfluous ones of said change steps, execution of said third computer instructions preceding execution of said fifth computer instructions,
   said container changes being the change steps recorded by said fifth computer instructions.

46. A storage medium according to claim 24, wherein said target container comprises a prior target container and a prior update container, said prior target container representing said information in a prior information state, and wherein said third computer instructions comprise:
   computer instructions which use said prior target container to represent in non-persistent storage said prior information state; and
   computer instructions which manipulate said information in non-persistent storage in response to change steps identified in said prior update container.

47. A storage mediunm according to claim 34, wherein said second computer instructions comprise:
   third computer instructions which write change instructions to said update container; and
   fourth computer instructions which, after execution of said third computer instructions, write to said update container an indication that said update container is valid.

48. A storage medium according to claim 47, wherein said change instructions include a first change instruction to be executed, and wherein said fourth computer instructions comprise computer instructions which write to said update container a label identifying said first change instruction.

49. A new storage medium according to claim 34, wherein said first computer instructions include:
   computer instructions which produce a temporary representation of said information in said first information state in unstable storage in dependence upon said target container;
   computer instructions which modify said temporary representation of said information in said first information state to produce a temporary representation of said information in said second information state in unstable storage; and
   computer instruction which determine said container changes from said temporay representation of said information in said second information state in unstable storage.

50. A storage medium according to claim 34, further comprising:
   computer instructions which determine second container changes sufficient to modify said first information state to a third information state; and
   computer instructions which commit said third information state by, at least in part, persistently storing, in a structure logically separate from said target container and from said update container, a second update container identifying all of said second container changes, such that said first information state remains readable without requiring application of change records relative to said second or third information state, and such that said second information state remains readable without requiring application of change records from said second update container.

51. A storage medium according to claim 34, wherein:
   said target container is persistently stored on a first medium; and
   said second computer instructions include computer instructions which persistently store said update container on a second medium different from said first medium.

52. A storage medium according to claim 51, wherein said first medium is a read-only medium, and wherein said second medium is a read/write medium.

53. A storage medium carrying a collection of software procedures for retrieving information from persistent storage for further processing in temporary storage, comprising:

first computer instructions which access a persistently stored target container representing a plurality of objects which identify said information in a first information state;

second computer instructions which produce a first temporary representation of said information in said first information state in dependence upon said target container;

third computer instructions which access a persistently stored update container identifying container changes which are sufficient to modify said information from said first information state to a second information state, which include instructions for, accessing a table of contents (TOC) containing format information of the container changes, and utilizing the format information to determine said container changes;

fourth computer instructions which apply said container changes to said first temporary representation of said information; and computer instructions which produce a second temporary representation of said information in said first information state in dependence upon said target container, said second temporary representation of said first information state existing simultaneously with said temporary representation of said second information state.

54. A storage medium according to claim 53, wherein said first computer instructions comprise:

computer instructions which access said persistently stored update container to obtain a reference to said target container; and computer instructions which access said target container in response to said reference.

55. A storage medium according to claim 53, wherein said second computer instructions comprise:

computer instructions which access a persistently stored prior target container representing a plurality of objects which identify said information in a prior information state;

computer instructions which produce a prior temporary representation of said information in said prior information state in dependence upon said prior target container;

computer instructions which access a persistently stored prior update container identifying prior container changes which are sufficient to update said information from said prior information state to said first information state; and computer instructions which apply said prior container changes to said prior temporary representation of said information.

56. A storage medium according to claim 53, further comprising:

computer instructions which modify said information in temporary storage to produce a third information state for said information; and computer instructions which persistently store a second update container identifying container changes which would be sufficient to update said information from said second information state to said third information state.

57. A storage medium according to claim 53, wherein said information is represented in persistent storage also in a third information state, further comprising:

computer instructions which access a persistently stored second update container identifying second container changes which are sufficient to modify said information from said first information state to said third information state; and computer instructions which apply said second container changes to said second temporary representation of said information to form a temporary representation of said information in said third information state.

58. A storage medium according to claim 57, wherein said temporary representation of said third information state exists simultaneously with said temporary representation of said second information state.

59. A storage medium according to claim 53, wherein said persistently stored target container is stored on a first medium, and wherein said persistently stored update container is stored on a second medium different from said first medium.

60. A storage medium according to claim 59, wherein said first medium is a read-only medium and wherein said second medium is a read/write medium.

61. A storage medium carrying a collection of software procedures for manipulating information, said information being represented in a first information state by a persistently stored target container containing a plurality of objects, comprising:

first computer instructions which determine container changes sufficient to modify said first information state to a second information state;

second computer instructions which commit said second information state by, at least in part, persistently storing, in a structure logically separate from said target container, an update container identifying said container changes such that said first information state remains readable without requiring application of change records relative to said second information state, and a table of contents (TOC) in said update container that includes information about every object in the update container;

third computer instructions which, after execution of said second computer instructions, access said target container;

fourth computer instructions which produce a temporary representation of said information in said first information state in dependence upon said subsequently accessed target container;

fifth computer instructions which access said update container; and sixth computer instructions which apply said container changes persistently stored in said update container to said temporary representation of said information.

62. A storage medium according to claim 61, further comprising:

computer instructions which manipulate said temporary representation of said information using at least one subsequent change step; and computer instructions which persistenly store a second update container identifying said at least one subsequent change step.

63. A computer implemented persistent storage having:
- a first chain of at least two sequentially associated containers including a top container and a bottom container, wherein,
- each of said containers in said chain except said top container being a prior container to a respective next container in said chain,
- each of said containers in said chain except said bottom container containing a reference to the respective prior container in said chain and each of said containers representing information in a respective state, and
- said bottom container having a first information state stored therein, and
- at least one of said containers representing said information as a plurality of objects, including a table of contents (TOC) that includes information about every object in the container, each given one of said containers except said bottom container identifying, container changes sufficient to update said information from the state represented by the prior container to the state represented by the given container.

64. Storage according to claim 63, further comprising a branch chain of at least two sequentially associated branch containers, said branch chain including a top branch container not being in said first chain and a bottom branch container being one of said containers in said first chain, each of said containers in said branch chain except said bottom branch container containing a reference to a respective prior container in said branch chain.

65. Storage according to claim 63, wherein at least two of said containers are stored in different files.

66. Storage according to claim 65, wherein said different files are stored on different media.

67. Storage according to claim 63, wherein at least two sequentially associated ones of said containers are stored in a single file.

68. Storage according to claim 63, wherein said bottom container represents said information as objects, and wherein said container changes in said given container are identified at least in part by a change instruction identifying a change selected from the group consisting of deletion of a specified object and modification of a specified object.

69. Storage according to claim 68, wherein each of said objects has associated therewith at least one property, and each property has associated therewith at least one value, and wherein said change instruction identifies a change which comprises modification of a specified object,
- wherein said modification is selected from the group consisting of:
  - (a) deletion of a specified property of said specified object, and all values associated therewith;
  - (b) insertion of a specified new value in association with a specified property of said specified object; and
  - (c) a combined insertion of a specified new property in association with said specified object and insertion of a specified new value in association with said new property.

70. Storage according to claim 69, wherein said modification includes said combined insertion modification, and wherein said specified new value includes at least one value change instruction identifying a modification to be made to said at least one value of said specified object.

* * * * *

UNITED STATES PATENT AND TRADEMARK OFFICE
CERTIFICATE OF CORRECTION

PATENT NO. : 5,873,097
DATED : February 16, 1999
INVENTOR(S) : Jared M. Harris; Ira L. Ruben It is certified that error appears in the above-identified patent and that said Letters Patent is hereby corrected as shown below:

Claim 47, Column 108, Line 16: After "A storage" correct the spelling of the word "medium," incorrectly spelled "mediunm."

Claim 49, Column 108, Line 29: After "A" delete the word "new."

Claim 49, Column 108, Line 41: After "container changes from said" correct the spelling of the word "temporary," incorrectly spelled "temporay."

Signed and Sealed this

Twenty-second Day of May, 2001

Attest:

NICHOLAS P. GODICI

Attesting Officer

Acting Director of the United States Patent and Trademark Office